(12) United States Patent
Fung

(10) Patent No.: US 11,465,014 B2
(45) Date of Patent: Oct. 11, 2022

(54) BODY JOYSTICK FOR INTERACTING WITH VIRTUAL REALITY OR MIXED REALITY MACHINES OR SOFTWARE APPLICATIONS WITH BRAINWAVE ENTRAINMENT

(71) Applicant: Blue Goji LLC, Austin, TX (US)

(72) Inventor: Coleman Fung, Austin, TX (US)

(73) Assignee: BLUE GOJI LLC, Austin, TX (US)

(*) Notice: Subject to any disclaimer, the term of this patent is extended or adjusted under 35 U.S.C. 154(b) by 0 days.

(21) Appl. No.: 17/592,802

(22) Filed: Feb. 4, 2022

(65) Prior Publication Data
US 2022/0152452 A1 May 19, 2022

Related U.S. Application Data

(63) Continuation-in-part of application No. 17/574,540, filed on Jan. 12, 2022, and a continuation-in-part of
(Continued)

(51) Int. Cl.
| A63B 24/00 | (2006.01) |
| A63B 22/02 | (2006.01) |
| A63B 22/00 | (2006.01) |
| A63B 23/04 | (2006.01) |
| G06T 19/00 | (2011.01) |
| G06F 1/16 | (2006.01) |
(Continued)

(52) U.S. Cl.
CPC ...... *A63B 24/0003* (2013.01); *A63B 22/0046* (2013.01); *A63B 22/0285* (2013.01); *A63B 22/0292* (2015.10); *A63B 22/06* (2013.01); *A63B 23/04* (2013.01); *A63F 13/212* (2014.09); *A63F 13/214* (2014.09); *A63F 13/40* (2014.09); *A63F 13/65* (2014.09); *G06F 1/163* (2013.01); *G06F 3/011* (2013.01); *G06F 3/016* (2013.01); *G06T 19/006* (2013.01); *H04W 84/18* (2013.01)

(58) Field of Classification Search
CPC ............ A63B 24/0003; A63B 22/0046; A63B 22/0285; A63B 22/0292; A63B 22/06; A63B 23/04; A63F 13/212; A63F 13/214; A63F 13/40; A63F 13/65; G06F 1/163; G06F 3/011; G06F 3/016; G06T 19/006; H04W 84/18
See application file for complete search history.

(56) References Cited

U.S. PATENT DOCUMENTS 4,660,828 A * 4/1987 Weiss .................... G06F 3/0338
 482/901
4,817,950 A * 4/1989 Goo ....................... A63F 13/245
 482/901
(Continued)

*Primary Examiner* — Sundhara M Ganesan
(74) *Attorney, Agent, or Firm* — Galvin Patent Law LLC; Brian R. Galvin

(57) ABSTRACT

A system and method for integration of body movement computer gaming control and brainwave entrainment comprising an attachment device configured to be attached to a portion of a user's body, a sensor attached to or integrated into the attachment device for detecting movement, a stimulation transducer for providing brainwave entrainment therapy, and a tether and actuator for providing feedback to the user about interactions with the virtual or mixed-reality machines or software applications.

12 Claims, 37 Drawing Sheets

Related U.S. Application Data application No. 16/781,663, filed on Feb. 4, 2020, now Pat. No. 11,191,996, which is a continuation-in-part of application No. 16/354,374, filed on Mar. 15, 2019, now Pat. No. 10,549,153, which is a continuation-in-part of application No. 16/176,511, filed on Oct. 31, 2018, now Pat. No. 10,960,264, which is a continuation-in-part of application No. 16/011,394, filed on Jun. 18, 2018, now Pat. No. 10,155,133, which is a continuation-in-part of application No. 15/853,746, filed on Dec. 23, 2017, now Pat. No. 10,265,578, which is a continuation of application No. 15/219,115, filed on Jul. 25, 2016, now Pat. No. 9,849,333, which is a continuation-in-part of application No. 15/193,112, filed on Jun. 27, 2016, now abandoned, which is a continuation-in-part of application No. 15/187,787, filed on Jun. 21, 2016, now Pat. No. 10,124,255, which is a continuation-in-part of application No. 15/175,043, filed on Jun. 7, 2016, now Pat. No. 9,766,696, and a continuation-in-part of application No. 14/846,966, filed on Sep. 7, 2015, now Pat. No. 10,080,958, and a continuation-in-part of application No. 14/012,879, filed on Aug. 28, 2013, now Pat. No. 10,737,175.

(60) Provisional application No. 62/330,602, filed on May 2, 2016, provisional application No. 62/330,642, filed on May 2, 2016, provisional application No. 62/310,568, filed on Mar. 18, 2016, provisional application No. 61/696,068, filed on Aug. 31, 2012.

(51) Int. Cl.
*A63F 13/65* (2014.01)
*A63F 13/212* (2014.01)
*A63F 13/214* (2014.01)
*A63F 13/40* (2014.01)
*A63B 22/06* (2006.01)
*G06F 3/01* (2006.01)
*H04W 84/18* (2009.01)

(56) References Cited

U.S. PATENT DOCUMENTS

| | | | | |
|---|---|---|---|---|
| 4,925,189 A * | 5/1990 | Braeunig | | A63F 13/06 345/157 |
| 5,070,816 A * | 12/1991 | Wehrell | | A63B 21/00192 482/901 |
| 6,007,338 A * | 12/1999 | DiNunzio | | A63G 31/16 463/31 |
| 6,070,269 A * | 6/2000 | Tardif | | G06F 3/011 2/912 |
| 6,135,928 A * | 10/2000 | Butterfield | | G06F 3/011 482/69 |
| 6,225,977 B1 * | 5/2001 | Li | | G06F 3/0334 463/36 |
| 6,227,121 B1 * | 5/2001 | Mares | | A63G 1/00 104/53 |
| 6,270,414 B2 * | 8/2001 | Roelofs | | G06F 3/011 345/157 |
| 6,624,802 B1 * | 9/2003 | Klein | | A63F 13/06 463/31 |
| 7,121,982 B2 * | 10/2006 | Feldman | | A63B 24/00 482/8 |
| 7,727,117 B2 * | 6/2010 | Feldman | | A63B 24/00 482/902 |
| 8,012,107 B2 * | 9/2011 | Einav | | A61H 1/0296 601/5 |
| 9,056,240 B2 * | 6/2015 | Carrell | | A63C 17/1436 |
| 9,081,436 B1 * | 7/2015 | Berme | | G06F 3/013 |
| 9,669,321 B2 * | 6/2017 | Reveley | | A63G 31/02 |
| 10,639,510 B2 | 5/2020 | Agrawal et al. | | |
| 2003/0120183 A1 * | 6/2003 | Simmons | | A61F 4/00 600/595 |
| 2006/0063645 A1 * | 3/2006 | Chiang | | A63B 24/0084 482/8 |
| 2006/0139317 A1 * | 6/2006 | Leu | | G06F 3/016 345/156 |
| 2006/0258458 A1 * | 11/2006 | Addington | | A63F 13/22 463/36 |
| 2006/0260395 A1 * | 11/2006 | Feldman | | A63B 21/0023 73/379.01 |
| 2007/0042868 A1 * | 2/2007 | Fisher | | G16H 20/30 482/902 |
| 2007/0093360 A1 * | 4/2007 | Neff | | A63B 22/0605 482/8 |
| 2007/0123390 A1 * | 5/2007 | Mathis | | A63B 22/0605 482/8 |
| 2008/0153592 A1 * | 6/2008 | James-Herbert | | G06F 3/011 463/36 |
| 2009/0135133 A1 * | 5/2009 | Kunzler | | G06F 3/011 345/156 |
| 2009/0256800 A1 * | 10/2009 | Kaufman | | G06F 3/011 715/700 |
| 2011/0009241 A1 * | 1/2011 | Lane | | G06F 3/011 482/8 |
| 2011/0143839 A1 * | 6/2011 | McLaughlin | | A63B 21/00047 463/37 |
| 2011/0269601 A1 * | 11/2011 | Nelson | | A63B 23/0222 482/8 |
| 2014/0274567 A1 * | 9/2014 | McCready | | A63F 13/213 482/8 |
| 2015/0190713 A1 * | 7/2015 | Goetgeluk | | A63B 69/0064 345/156 |
| 2016/0139666 A1 * | 5/2016 | Rubin | | G06T 19/006 345/633 |
| 2016/0166930 A1 * | 6/2016 | Brav | | G08B 21/02 463/30 |
| 2016/0187974 A1 * | 6/2016 | Mallinson | | G06F 1/163 463/32 |
| 2019/0247662 A1 | 8/2019 | Poltroak | | |

* cited by examiner

BODY JOYSTICK FOR INTERACTING WITH VIRTUAL REALITY OR MIXED REALITY MACHINES OR SOFTWARE APPLICATIONS WITH BRAINWAVE ENTRAINMENT

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/781,663
Ser. No. 16/354,374
Ser. No. 16/176,511
Ser. No. 16/011,394
Ser. No. 15/853,746
Ser. No. 15/219,115
62/330,642
Ser. No. 15/193,112
62/330,602
Ser. No. 15/175,043
62/310,568
Ser. No. 15/187,787
Ser. No. 14/846,966
Ser. No. 14/012,879
61/696,068

BACKGROUND OF THE INVENTION

Field of the Art

The disclosure relates to the field of exercise equipment, and more particularly to the field of devices for controlling or interacting with virtual reality or mixed-reality machines and software applications.

Discussion of the State of the Art

Users often interact with fitness devices such as treadmills, stationary bicycles, or elliptical exercise trainers while using a smart device such as their smartphone or tablet, generally for consuming media. Generally, the interactions with the fitness device and smart device are separate, with media playback occurring independently of the user's operation of an exercise machine. For example, while exercising on an elliptical exercise trainer a user may choose to view a static screen displaying a television show. The elements in a television show are static, in that the elements do not change behavior based on the user's interactions with the television show, but instead perform predetermined actions. An example of a dynamic screen is that of a video game. The user interacts with a remote and influences the activity of the elements in the video game. At most, the user may interact with the screen performing an activity independent of actions related to interacting with the fitness device.

Furthermore, with the rapidly-expanding virtual reality industry, new interaction methods are being explored including a variety of controllers for gaming, wands, and motion-based input devices including gloves and camera-based hand tracking. However, these devices all focus on interacting with a user's hands and head movements, and ignore other parts of the body that could be used to improve interaction and immersion particularly while a user is within a known defined environment such as an exercise machine, while also expanding the possibilities for data collection.

It has been shown that exposing individuals to periodic signal, such as a light blinking at a frequency between 30 Hz and 50 Hz (preferably 40 Hz) can induce gamma waves in the brain which can have beneficial effects on the cognitive and neurological functions of the individual exposed to the signal by reducing the amount of harmful Tau proteins that are "built up" in the brain. Neurodegenerative conditions and diseases, such as Alzheimer's or Parkinson's, and the effects produced by these conditions and diseases may be minimized and in some cases improved through brainwave therapy. Because exercise machines are often used for a prolonged period of time by a user (e.g., a cardio workout is generally in the range of 20 to 30 minutes), they are perfectly positioned to also provide brainwave entrainment therapy to the user via periodic signals produced in a plurality of ways.

What is needed, is a body joystick that may be used to interact with virtual reality or mixed-reality machines and software applications that senses body movements and provides feedback to the user about interactions with the virtual reality or mixed-reality environment while also providing brainwave entrainment therapy.

SUMMARY OF THE INVENTION

Accordingly, the inventor has conceived, and reduced to practice, a system and method for integration of body movement computer gaming control and brainwave entrainment comprising an attachment device configured to be attached to a portion of a user's body, a sensor attached to or integrated into the attachment device for detecting movement, a stimulation transducer for providing brainwave entrainment therapy, and a tether and actuator for providing feedback to the user about interactions with the virtual or mixed-reality machines or software applications.

According to a preferred embodiment, a system for integration of body movement computer gaming control and brainwave entrainment is disclosed, comprising: an attachment device configured to be attached to a portion of a user's body; a sensor attached to, or integrated into, the attachment device, and configured to detect movement of at least a portion of a user's body during use; one or more tethers attached to, or integrated into, the attachment device, and configured to resist a movement of the user during use, each of the one or more tethers being attached to an actuator configured to draw in or let out the corresponding tether; a stimulation transducer configured to provide stimulation to the user; a computing device comprising a memory and a processor; a brainwave entrainment manager comprising a first plurality of programming instructions stored in the memory which, when operating on the processor, causes the computing device to: receive movement data from the sensor of the attachment device; select a brainwave entrainment therapy for application based on the received movement data, the therapy comprising a stimulation frequency; operate the stimulation transducer at a stimulation frequency; transmit the movement data to a virtual reality or mixed reality machine or software application; receive data back from the virtual reality or mixed reality machine or software application based on the user's interactions within the virtual reality or mixed reality environment; and direct the operation of the actuator based on the received data.

According to a preferred embodiment, a method for integration of body movement computer gaming control and brainwave entrainment is disclosed, comprising the steps of: measuring the movement of a user using a body joystick attached to the user's body, the body joystick comprising: an attachment device configured to be attached to a portion of a user's body; a sensor attached to, or integrated into, the attachment device, and configured to detect movement of at least a portion of the user's body during use; one or more tethers attached to, or integrated into, the attachment device, and configured to resist a movement of the user during use, each of the one or more tethers being attached to an actuator configured to draw in or let out the corresponding tether; and a stimulation transducer configured to provide stimulation to the user; receiving movement data from the sensor of the attachment device; selecting a brainwave entrainment therapy for application based on the received movement data, the therapy comprising a stimulation frequency; operating the stimulation transducer at a stimulation frequency; According to an aspect of an embodiment, the attachment device comprises a strap, belt, vest, waist harness, or other device wearable on the human body.

According to an aspect of an embodiment, the tether is a flexible, metal cable.

According to an aspect of an embodiment, the actuator is a motor with a reel configured to reel in or let out the tether.

According to an aspect of an embodiment, the stimulation transducer is a transducer configured to provide either visual, auditory, vibratory, or electrical stimulation.

According to an aspect of an embodiment, the brainwave entrainment therapy comprises operating the stimulation transducer to provide either visual, auditory, vibratory, or electrical stimulation at a stimulation frequency between 0.5 Hz and 100 Hz.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
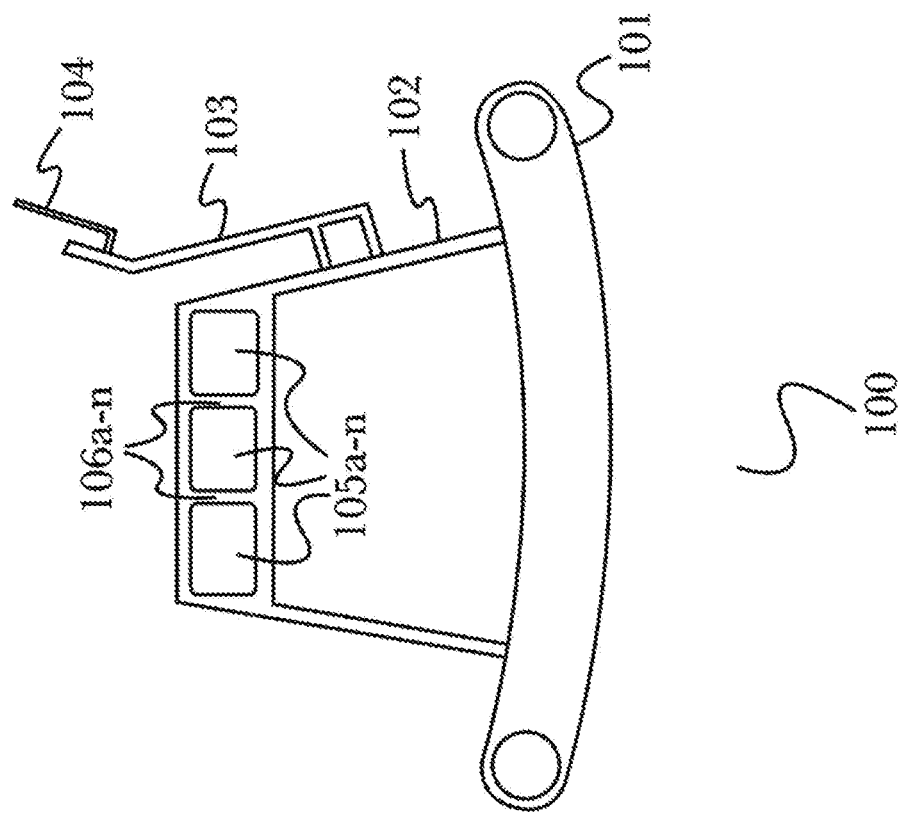
FIG. 1 is a side view of an exemplary variable-resistance exercise machine with wireless communication for smart device control and interactive software applications, according to an embodiment of the invention.

The inventor has conceived, and reduced to practice, a system and method for integration of body movement computer gaming control and brainwave entrainment comprising an attachment device configured to be attached to a portion of a user's body, a sensor attached to or integrated into the attachment device for detecting movement, a stimulation transducer for providing brainwave entrainment therapy, and a tether and actuator for providing feedback to the user about interactions with the virtual or mixed-reality machines or software applications.

The targeted brainwave entrainment therapy may be enhanced by selecting multiple treatment modalities (e.g., light, sound, vibration, electrical stimulation) applied either simultaneously or sequentially, by varying the frequency or frequencies of brainwave entrainment (e.g., from about 0.5 Hz to about 100 Hz), and by varying the intensity and/or scale of the treatment (e.g., from subtle, localized vibrational or electrical stimulation to area-wide, intense stimulation such as high-intensity room lighting and sound).

There are many promising uses of brainwave entrainment. One promising use of brainwave entrainment is to treat and/or prevent epilepsy. There is some evidence that epileptic seizures occur when the brain falls into theta wave activity (approximately 4 Hz to 8 Hz) during normal waking consciousness. Normal waking consciousness is typically associated with beta wave brain activity (12 Hz to 38 Hz). Performing brainwave entrainment at beta wave frequencies on persons with epilepsy may help prevent them from falling into theta wave brain activity, thus preventing seizures.

Another possible use for brainwave entrainment is to reduce agitation by performing brainwave entrainment at alpha wave frequencies (approximately 8 Hz to 12 Hz). Alpha wave frequencies are those brain wave frequencies between theta wave activity (typically associated with dreaming) and beta wave activity (typically associated with concentration and learning). Alpha wave frequencies are associated with relaxation and calmness. Therefore, brainwave entrainment at alpha wave frequencies may help induce relaxation and calmness.

Many different wave forms and/or pulse widths may be used in delivering entrainment at the selected frequency or frequencies, regardless of the modality (light, sound, etc.) of the stimulation. Wave forms may include, but are not limited to, rectangular wave forms, sine wave forms, triangular wave forms, and sawtooth wave forms. Pulse widths or duty cycles at any given frequency may be varied across the entire range of the frequency period. For example, at a given frequency, the duty cycle of each period of the frequency can be varied from nearly 0% on-time/100% off-time to nearly 100% on-time/0% off-time. Thus, for a given frequency, the stimulator (e.g., light) can be on and off for an equal amount of time in each period (a 50% duty cycle), mostly on during each period (e.g., a 75% duty cycle), or mostly off during each period (e.g., a 25% duty cycle). In these cases, the frequency of the stimulation is the same, but the amount of on-time of the stimulation in each period of the frequency is different.

Different pulse widths or duty cycles may be useful, depending on the circumstances. For example, when engaged in a mental task (e.g., viewing media on a smart device, watching a coach's, trainer's, or physical therapist's instructions, etc.) that requires visual acuity, a very low or very high duty cycle may be used to flash a light stimulator at a pulse width that can be captured by the human eye, but is not consciously recognizable. The human eye can capture flashes of light as short as $1/200^{th}$ of a second (equivalent to a frequency of 200 Hz), possibly shorter, but because of persistence of vision, cannot distinguish between repeated flashes of light at that frequency. Television and computer monitor frame refresh rates are typically 60 Hz or above, as this is a frequency at which persistence of vision makes it difficult to distinguish between frames. Thus, for example, the flicker of light stimulation at a frequency of 40 Hz and a 50% duty cycle would be easily perceivable by most human beings as each "on" pulse is $1/80^{th}$ of a second long and separated by another "off" time of another $1/80^{th}$ of a second. However, the flicker of light stimulation at the same frequency, but at an 80% duty cycle would likely not be consciously perceptible, as the "on" time of each period would last about $1/50^{th}$ of a second and the "off" time of each period would last about $1/200^{th}$ of a second. Thus, the "off" time of each period is within the limits of capture by the human eye (200 Hz), but would likely not be consciously perceptible because it is above the average frequency resolution (60 Hz) of the human eye, and the light would appear to the conscious mind to be on all the time.

In a similar manner, pulse widths or duty cycles may be adjusted to be perceptible to certain cells in the eye but not others. The human eye has two different types of light receptors: cones and rods. Cones are the dominant light receptors used under daylight conditions, and reception of light by cones is called photopic vision. Cones are able to distinguish colors, but are less sensitive to lower light intensity and the persistence of vision of cones is greater (meaning that the frequency of pulses that can be distinguished by cones is less than for rods). Rods are the dominant light receptors used at night and under low-light conditions, and reception of light by rods is called scotopic vision. Rods are not able to distinguish colors, but are more sensitive to lower light intensity and the persistence of vision of rods is less (meaning that the frequency of pulses that can be distinguished by rods is greater than for cones). Cones are greatly concentrated in the center of vision (where the person is directly looking) while rods are considerably more dominant in the periphery of vision. This difference in the type of light receptors in the eye can be used to advantage when selecting either a frequency of stimulation or a pulse width/duty cycle of that frequency. Again using the example above where visual acuity is required for a mental task, the pulse width or duty cycle of each period of a brainwave entrainment frequency of light can be selected to be perceptible to rods but not to cones, thus allowing the brainwave entrainment frequency of light to be perceived by the brain (through the rods in the periphery of vision which have a greater frequency resolution), but not consciously perceptible to the person (who is primarily focused on the light received by the cones (in the center of vision and with a lesser frequency resolution).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a side view of a variable-resistance exercise machine with wireless communication for smart device control and interactive software applications 100, according to an embodiment of the invention. According to the embodiment, an exercise machine 100 may have a stable base 101 to provide a platform for a user to safely stand or move about upon. Additional safety may be provided through the use of a plurality of integrally-formed or detachable side rails 102, for example having safety rails on the left and right sides (with respect to a user's point of view) of exercise machine 100 to provide a stable surface for a user to grasp as needed. Additionally, side rails 102 may comprise a plurality of open regions 105*a-n* formed to provide additional locations for a user to grasp or for the attachment of additional equipment such as a user's smart device (not shown) through the use of a mountable or clamping case or mount. Formed or removable supports 106*a-n* may be used for additional grip or mounting locations, for example to affix a plurality of tethers (not shown) for use in interaction with software applications while a user is using exercise machine 100 (as described below, referring to FIG. 3).

Exercise machine 100 may further comprise a rigid handlebar 103 affixed or integrally-formed on one end of exercise machine 100, for a user to hold onto while facing forward during use. Handlebar 103 may further comprise a stand or mount 104 for a user's smart device such as (for example) a smartphone or tablet computer, so they may safely support and stow the device during use while keeping it readily accessible for interaction (for example, to configure or interact with a software application they are using, or to select different applications, or to control media playback during use, or other various uses). Handlebar 103 may be used to provide a stable handle for a user to hold onto during use for safety or stability, as well as providing a rigid point for the user to "push off" during use as needed, for example to begin using a moving treadmill surface (described below in FIG. 2). During use, a user may also face away from handlebar 103, using exercise machine 100 in the reverse without their view or range of motion being obscured or obstructed by handlebar 103 (for example, for use with a virtual reality game that requires a wide degree of movement from the user's hands for interaction).

As illustrated, the base 101 of exercise machine 100 may be formed with a mild, symmetrical curvature, to better approximate the natural range of movement of a user's body during use. Common exercise machines such as treadmills generally employ a flat surface, which can be uncomfortably during prolonged or vigorous use, and may cause complications with multi-directional movement or interaction while a user's view is obscured, as with a headset (described below in FIG. 3). By incorporating a gradual curvature, a user's movements may feel more natural and require less reorientation or accommodation to become fluid and proficient, and stress to the body may be reduced.

Figure 3:
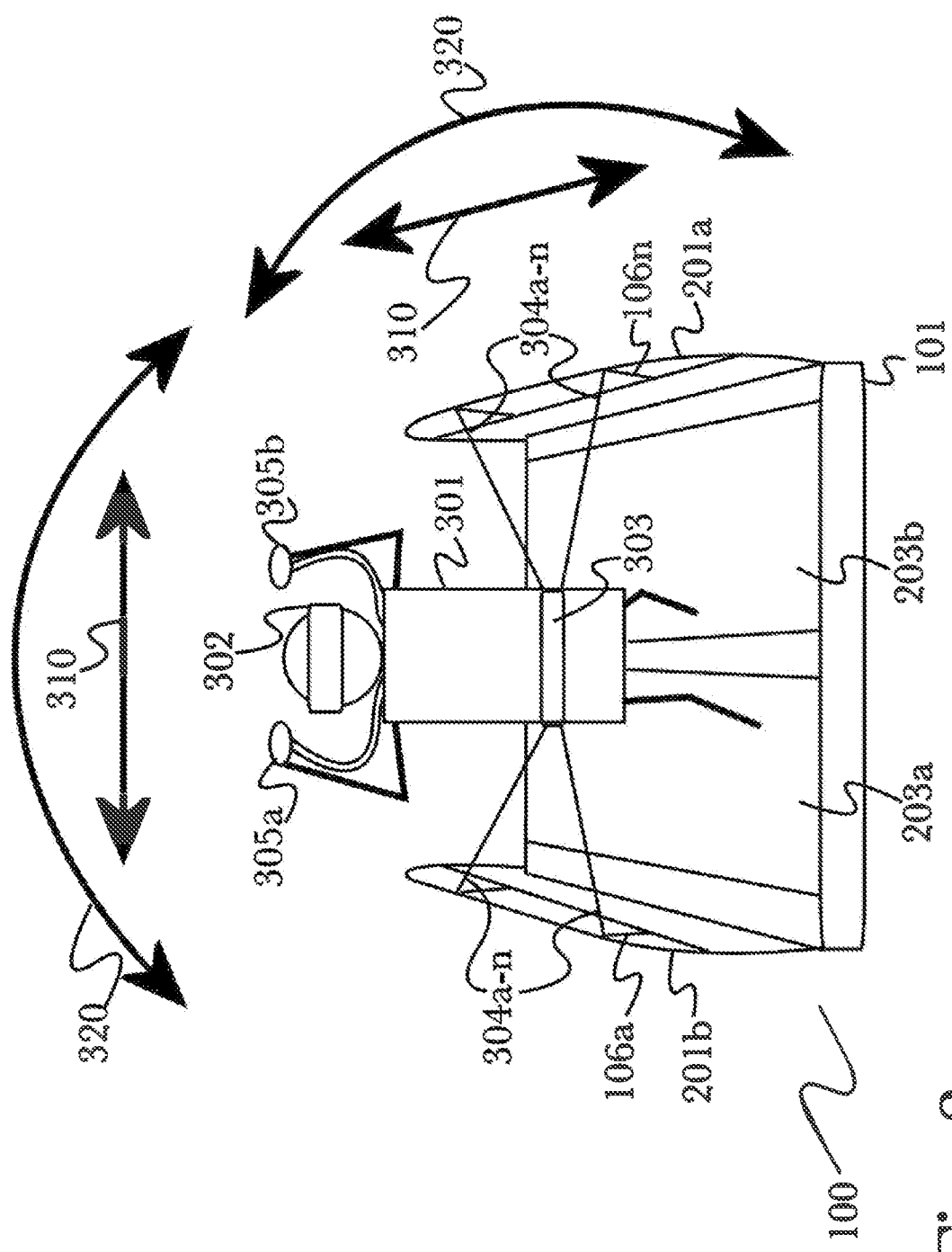
FIG. 3 is a diagram illustrating an exemplary system for a virtual reality or mixed reality enhanced exercise machine, illustrating the use of a plurality of connected smart devices and tethers, and showing interaction via the user's body as a control stick.

FIG. 3 is a diagram illustrating an exemplary system for a virtual reality or mixed reality enhanced exercise machine 100 with wireless communication for smart device control and interactive software applications using a smart device, illustrating the use of a plurality of connected smart devices and tethers, and showing interaction via the user's body as a control stick. According to the embodiment, a user 301 may be standing, walking, or running on a variable-resistance exercise machine 100 with wireless communication for smart device control and virtual reality applications with a stable base 101 and two separate moveable surfaces 203a, 203b for separate movement of the user's legs. Exercise machine 100 may have fixed handlebars with affixed or integrally-formed controllers 305a, 305b for use as connected smart devices for interaction, and support rails 201a, 201b for a user to hold onto or affix tethers for safety or interaction when needed. User 301 may interact with software applications using a variety of means, including manual interaction via controller devices 305a, 305b that may be held in the hand for example to use as motion-input control devices or (as illustrated) may be affixed or integrally-formed into exercise machine 100. This may provide a user with traditional means of interacting with software applications while using exercise machine 100. Additionally, a user's body position or movement may be tracked and used as input, for example via a plurality of tethers 304a-n affixed to handlebars 201a, 201b and a belt, harness or saddle 303 worn by user 301, or using a headset device 302 that may track the position or movement of a user's head as well as provide video (and optionally audio) output to the user, such as a virtual reality headset that displays images while blocking the user's view of the outside world, or an augmented reality or mixed reality headset that combines presented information with the user's view using transparent or semitransparent displays (for example, using transparent OLED displays, hologram displays, projected displays, or other various forms of overlaying a display within a user's normal field of vision without obstructing the user's view). Body tracking may be used to recognize additional input data from user 301 (in addition to manual input via controllers 305a, 305b), by tracking the position and movement of user 301 during use. For example, motion tracking within a headset device 302 may be used to recognize a variety of translational 310 or rotational 320 movement of user's 301 head, such as leaning to the side, or looking over the shoulder. Tethers 304a-n may recognize a variety of movement of user's 301 torso, such as leaning, crouching, side-stepping, or other body movement. This body tracking may then be utilized either as feedback to rehab programs (for example, to track a user's posture for physical therapy coaching or exercises such as holding yoga poses) or input similar to a control stick or joystick in manual controller arrangements, for example by interpreting the user's entire body as the "stick" and processing their body movements as if they were stick movements done manually (such as to control in-game character posture or movement, or to direct movement in certain applications such as vehicle simulations that may turn or accelerate in response to stick movements).

For example, a user 301 on exercise machine 100 may be playing a virtual reality skiing game or rehab program wherein they are given audio and video output via a headset 302 to immerse them in a virtual ski resort. When user 301 is not skiing, they may be able to use manual controls 305a, 305b for such operations as selecting from an on-screen menu, or typing text input such as to input their name or to chat with other players using text. When they begin skiing within the game, user 301 may be instructed in proper ski posture or technique, and may then use their body to control various aspects of their virtual skiing, such as leaning to the side 320 to alter their course and avoid trees or other skiers, or jumping 310 to clear rocks or gaps. Movement of their head may be detected by a headset 302 and used to control their view independently of their body as it is tracked by tethers 304a-n, allowing user 301 to look around freely without interfering with their other controls. In this manner, the user's entire body may serve as an input control device for the game, allowing and encouraging them to use natural body movements to control their gameplay in an immersive manner while still retaining the option to use more familiar manual control means as needed. Alternatively, specific body functions such as hip twisting are used as user feedback for rehabilitating programs, including rehab games.

Figure 12:
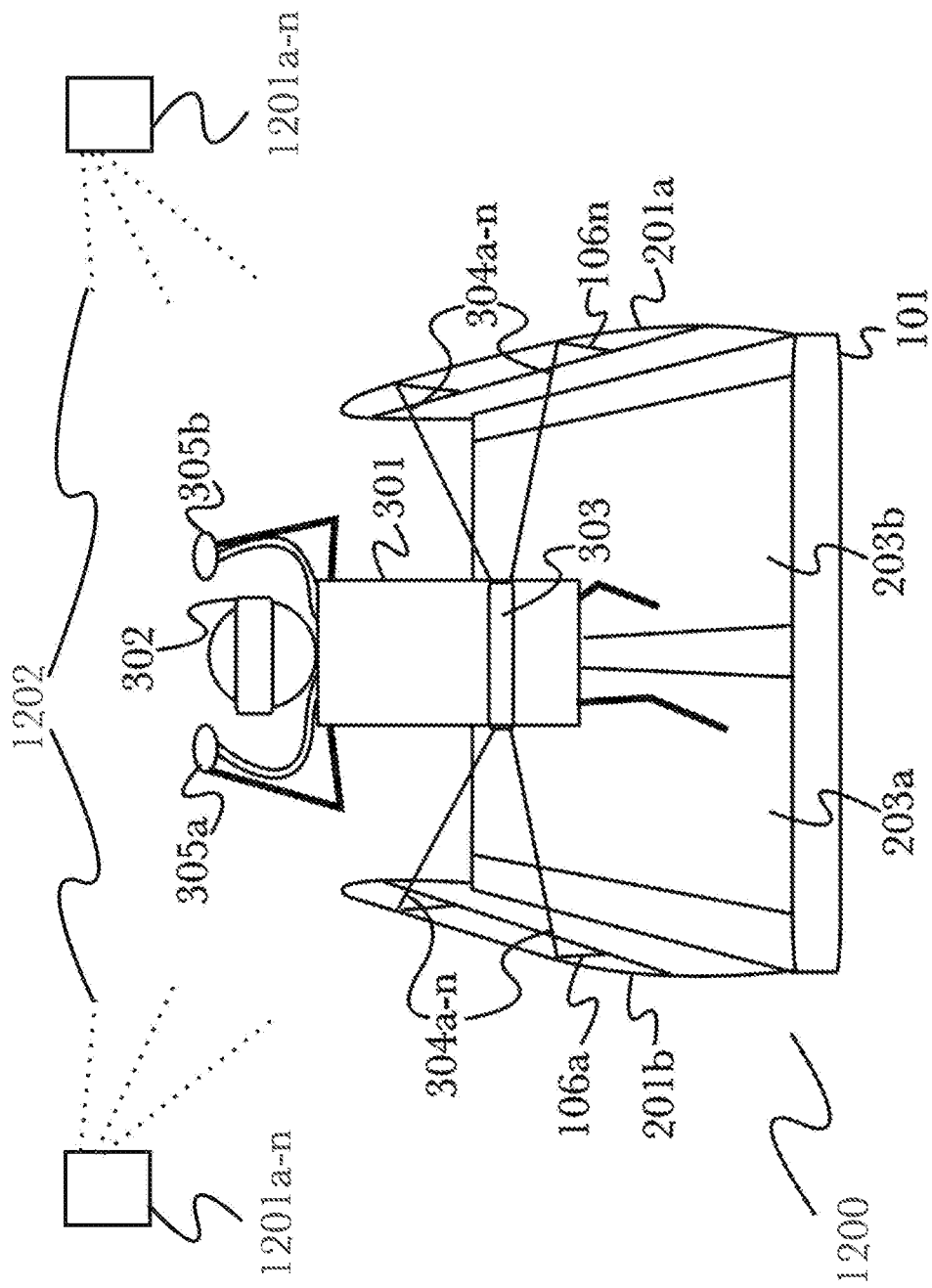
FIG. 12 is a diagram illustrating an exemplary virtual reality or mixed reality enhanced exercise machine, illustrating the use of a plurality of optical sensors to detect body movement of a user during use of an exercise machine.

FIG. 12 is a diagram illustrating an exemplary system 1200 for a virtual reality or mixed reality enhanced exercise machine 100, illustrating the use of a plurality of optical sensors to detect body movement of a user during use of an exercise machine. As above (with reference to FIG. 3), a user 301 may be standing, walking or running, sitting, or otherwise physically active during use of an exercise machine 100. During use, the user's position, posture, movement, cadence, technique, or any other movement or position-related information may be detected, observed, or measured using a plurality of body movement sensors such as (for example, including but not limited to) tethers 304a-n that may optionally be affixed to handlebars 201a-b or other features of an exercise machine 100, hardware sensors integrated into controllers 305a-b or a headset 302 the user may be using during exercise for virtual reality or mixed reality applications, or using a plurality of optical sensors 1201*a-n* that may be affixed to an exercise machine 100 or adjacent equipment, or that may be affixed to or positioned within an environment around exercise machine 100 to observe the user 301 during use. Optical sensors 1201*a-n* may be used in a variety of configurations or arrangements, such as using a single wide-angle sensor positioned to observe a user's movement or posture from a particular angle (which may be useful for coaching or physical therapy applications), or using more than one sensor placed about a user to observe their movement in three-dimensional space. A variety of hardware may be utilized in optical sensors 1201*a-n*, for example including (but not limited to) an infrared or other optical camera that may directly observe the user's movement, a structured-light emitter that projects a structured-light grid 1202 or other arrangement onto the user, exercise machine, or environment (and corresponding scanner or receiver that may observe the user's movement through detected changes in the structured-light projection), or a light-field sensor that detects or measures depth to observe a user's movement in three-dimensions. It should also be appreciated that various combination of optical sensors 1201*a-n* may be utilized to achieve a desired effect, for example using both structured light and a light-field sensor to observe a user's movement in precise detail in three dimensions. Additionally, some or all optical sensors 1201*a-n* utilized in some arrangements may be integrated into a user's headset 302 or an exercise machine 100 to provide "inside-out" tracking where tracking sensors are associated with the user rather than the environment, or they may be external devices as illustrated that may be introduced to enhance an existing exercise machine or environment.

Utilizing an exercise machine 100 in this manner allows for a variety of novel forms of user interaction within virtual reality or mixed reality applications. For example, a user's body movement during exercise may be tracked in three dimensions and along or around various axes to record movement with six degrees of freedom (6DOF) comprising both translation along, and rotation about, each of three spatial axes. This may be used with torso tracking as described above (referring to FIGS. 3-7) to produce a 6DOF "torso joystick" virtual device that directs movement or other inputs within a software application. This may be used in a number of ways, for example including but not limited to aiding exercise through interactive coaching (either with a human coach or using software to simulate a coach by providing feedback to detected user movements), providing physical therapy, interacting with games or other applications during exercise, or using exercise combined with software interaction for an immersive virtual reality or mixed reality experience. For example, a user may control movement or expression of a virtual avatar or other user representation within a software application, such as using their own body movements to direct movement of a virtual character. Physical therapy or fitness coaching may utilize detected movements to assist a user with improving their abilities or technique, or to measure progress. Social interaction applications may utilize body movements during exercise, for example a chat or voice call application may utilize body movement as a form of nonverbal expression similar to emoji or other icons. Safety may also be enhanced by controlling the operation of software in response to detected user movements, for example displaying caution information or pausing an application if a user is detected to move outside a configured safety parameter (such as stepping off a running treadmill, for example).

Figure 8:
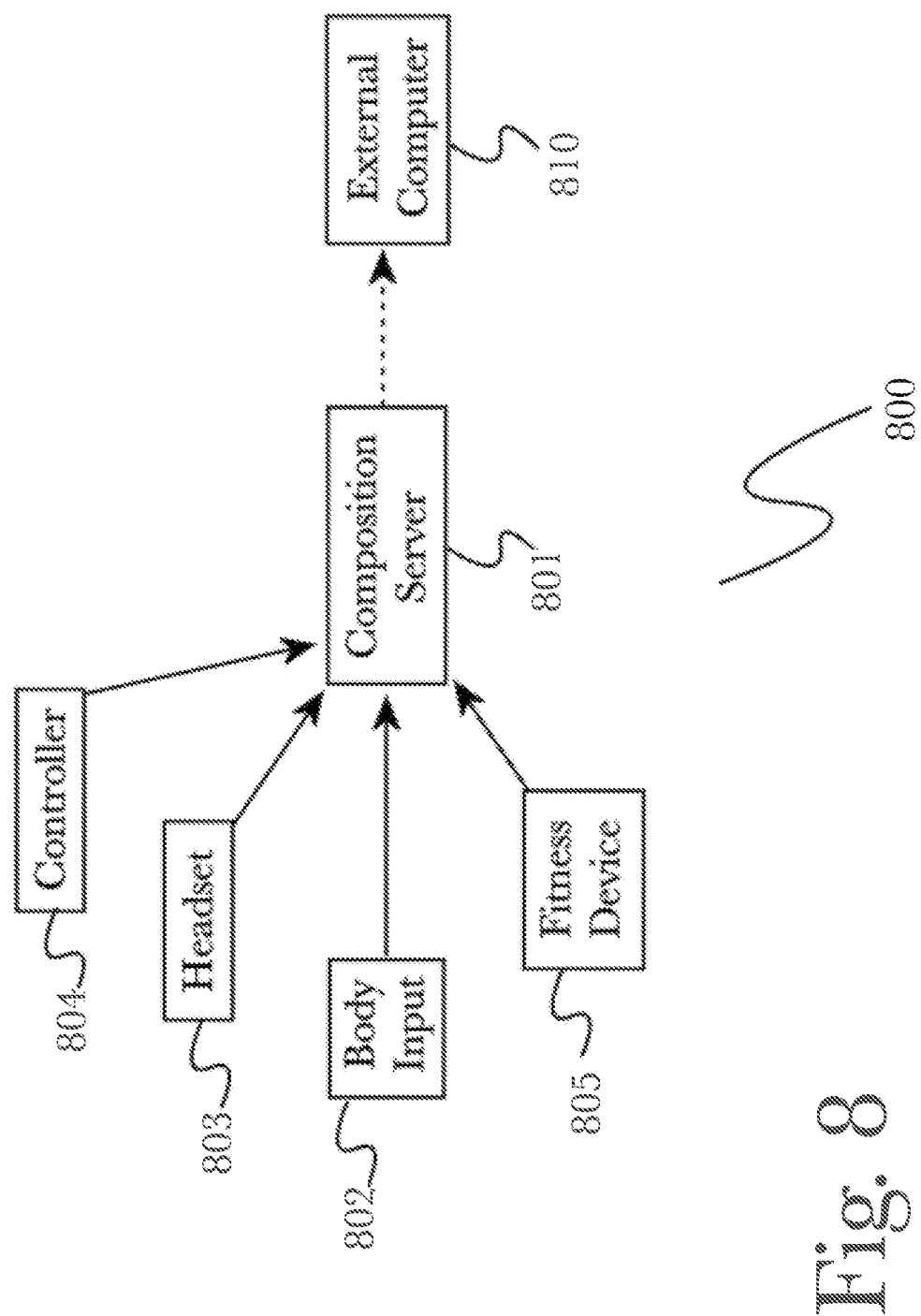
FIG. 8 is a block diagram of an exemplary system architecture for natural body interaction for mixed or virtual reality applications.

FIG. 8 is a block diagram of an exemplary system architecture 800 for natural body interaction for mixed or virtual reality applications, according to an embodiment of the invention. According to the embodiment, a composition server 801 comprising programming instructions stored in a memory 11 and operating on a processor 12 of a computing device 10 (as described below, with reference to FIG. 13), may be configured to receive a plurality of input data from various connected devices. Such input devices may include (but are not limited to) a variety of hardware controller devices 804 (such as a gaming controller [such as GOJI PLAY™ controllers], motion tracking controller, or traditional computer input devices such as a keyboard or mouse), a headset device 803 such as an augmented reality or mixed or virtual reality headset (for example, OCULUS RIFT™, HTC VIVE™, SAMSUNG GEAR VR™, MICROSOFT MIXED REALITY™, or other headset devices), a brainwave entrainment device (as described below with reference to FIG. 27 and FIG. 35), one or more transducers 2820, 2830, and 2840 (as described below with reference to FIG. 28), a variety of fitness devices 805 (for example, fitness tracking wearable devices such as FITBIT™, MICROSOFT BAND™, APPLE WATCH™, or other wearable devices), or a variety of body input 802 tracking devices or arrangements, such as using a plurality of tethers attached to the environment and a harness worn by a user, configured to track movement and position of the user's body.

Various input devices may be connected to composition server 801 interchangeably as desired for a particular arrangement or use case, for example a user may wish to use a controller 804 in each hand and a headset 803, but omit the use of fitness devices 805 altogether. During operation, composition server 801 may identify connected devices and load any stored configuration corresponding to a particular device or device type, for example using preconfigured parameters for use as a default configuration for a new controller, or using historical configuration for a headset based on previous configuration or use. For example, a user may be prompted (or may volunteer) to provide configuration data for a particular device, such as by selecting from a list of options (for example, "choose which type of device this is", or "where are you wearing/holding this device", or other multiple-choice type selection), or composition server 801 may employ machine learning to automatically determine or update device configuration as needed. For example, during use, input values may be received that are determined to be "out of bounds", for example an erroneous sensor reading that might indicate that a user has dramatically shifted position in a way that should be impossible (for example, an erroneous reading that appears to indicate the user has moved across the room and back again within a fraction of a second, or has fallen through the floor, or other data anomalies). These data values may be discarded, and configuration updated to reduce the frequency of such errors in the future, increasing the reliability of input data through use.

According to some embodiments, brainwave entrainment devices 2700, 3500 and/or transducers 2820, 2830, 2840 may be connected to composition server 801 in order to provide one or more various forms of brainwave entrainment therapy via a plurality of stimulation configurations. Some types of stimulation that may be produced by connected brainwave entrainment devices and/or transducers can include, but are not limited to, visual, auditory, vibratory, and electrical to name a few. In some embodiments, during operation, composition server 801 may identify connected brainwave entrainment hardware (e.g., devices and/ or transducers, etc.) and load any stored brainwave entrainment therapy configuration corresponding to a particular brainwave entrainment session. For example, a user of an exercise machine may select, via her smart device (or, optionally, using a computer display 2510 or brainwave entrainment device 2700), to receive brainwave entrainment to treat neurodegenerative conditions and/or to improve basic cognitive functions while also using the exercise machine to exercise (e.g., walking or running on a treadmill, using an elliptical or stationary bike, climbing a stair machine, etc.). In this example, composition server 801 may receive the user input from the smart device and load a preconfigured brainwave entrainment session or routine and then execute the session or routine by sending instructions and/or signals to brainwave entrainment device and/or transducers to output stimulation appropriate for session or routine. In the example above, selection to improve basic cognitive functions may be associated with a preconfigured brainwave entrainment session that, when executed by composition server 801, causes brainwave entrainment device 2700 to output one or more stimulations such as flashing lights or images on the display screen at about 40 Hz in order to stimulate gamma wave oscillations in the brain to reduce the effect of harmful Tau proteins that can influence neurodegenerative conditions and cognitive ability.

In some embodiments, a brainwave entrainment device and/or transducers are not necessary in order to provide brainwave entrainment therapy. In these embodiments, headset 803 may be configured to produce visual, vibrational, and/or auditory stimulations when input is received from composition server 801. Furthermore, in these embodiments stimulation may be provided via headset 803 simultaneously with other media being displayed on headset 803. For example, headset 803 may be displaying a virtual reality or mixed reality environment while also providing stimulation such as a blinking light between 30 Hz and 50 Hz (preferably 40 Hz) on the periphery of the display screen in a non-invasive manner such that headset 803 user's attention is focused on the virtual or mixed reality environment around them.

According to some embodiments, composition server 801 may receive movement data from one or more sensors and responsive to the movement data, composition server 801 may identify and load a preconfigured brainwave entrainment therapy session or routine. Movement data may be used to identify a current position (e.g., standing, leaning, squatting, jumping, face and/or body direction, spinning, walking, running, etc.) of an exercise machine user and then composition server 801 can use this data to operate brainwave entrainment devices and/or transducers 2820, 2830, 2840 such that brainwave entrainment therapy stimulations may be directed toward the user in an appropriate way. For example, a user of a body joystick controller may be facing forward and receiving visual stimulus in the form of blinking lights at a stimulation frequency (e.g., between 0.5 Hz and 100 Hz), but then the user changes position such that they are facing away from the visual stimulations, the movement data associated with the user's change of position may be received and processed by composition server 801 which in turn operates an transducer (e.g., speaker(s)) to produce auditory stimulation at the same stimulation frequency as the visual stimulation. In this way, composition server 801 may leverage movement data in order to operate one or more transducers for applying brainwave entrainment therapy.

According to some embodiments, composition server 801 may further comprise or integrate with a gait comparator 3309 (as described below with reference to FIG. 33) configured to receive a plurality of movement data and produce a user gait profile based on analysis of the movement data. A user gait profile may be used by composition server 801 to select an appropriate brainwave entrainment therapy associated with conditions, functions, discrepancies, etc., identified in the user gait profile based on analysis of user movement data. In this embodiment, composition server 801 may comprise or be communicatively coupled with neurological function database 3302 and/or gamma entrainment database 3303 (as described below with reference to FIG. 30) such that a user gait profile may be compared against neurological functions in order to identify a brainwave entrainment therapy appropriate for the user.

Composition server 801 may receive a wide variety of input data from various connected devices, and by comparing against configuration data may discard undesirable or erroneous readings as well as analyze received input data to determine more complex or fine-grained measurements. For example, combining input from motion-sensing controllers 804 with a motion-sensing headset 803 may reveal information about how a user is moving their arms relative to their head or face, such as covering their face to shield against a bright light or an attack (within a game, for example), which might otherwise be impossible to determine with any reliability using only the controllers themselves (as it may be observed that a user is raising their hands easily enough, but there is no reference for the position or movement of their head). These derived input values may then be combined into a single composite input data stream for use by various software applications, such as augmented reality or mixed or virtual reality productivity applications (for example, applications that assist a user in performing manual tasks by presenting virtual information overlays onto their field of vision, or by playing audio directions to instruct them while observing their behavior through input devices, or other such applications), or mixed or virtual reality applications or games, such as simulation games that translate a user's movement or position into in-game interaction, for example by moving a user's in-game character or avatar based on their physical movements as received from input devices. In some arrangements, composition server 801 may operate such software applications in a standalone manner, functioning as a computer or gaming console as needed. In other arrangements, composition server 801 may provide the composite data for use by an external computer 810, such as a connected gaming console, mixed or virtual reality device, personal computer, or a server operating via a network in the cloud (such as for online gaming arrangements, for example). In this manner, the composite data functions of the embodiment may be utilized with existing hardware if desired, or may be provided in a standalone package such as for demonstrations or public use, or for convenient setup using a single device to provide the full interaction experience (in a manner similar to a household gaming console, wherein all the functions of computer components may be prepackaged and setup to minimize difficulty for a new user).

It should be appreciated that while reference is made to virtual reality applications, a wide variety of use cases may be possible according to the embodiment. For example, torso tracking may be used for fitness and health applications, to monitor a user's posture or gait while walking, without the use of additional virtual reality equipment or software. In some arrangements, some or all interaction between a user and a software application may be nonvisual, and in some arrangements no display device may be present.

In such an arrangement, a user may interact with software entirely using feedback and movement of a worn harness 420 or tethers 304a-n, using resistance or software-guided actuation of tethers 304a-n (as described below, with reference to FIGS. 4-7) or other elements. In other arrangements, various combinations of display devices and other electronic devices may be used for a mixed-reality setup, for example where a user's movement and interaction may be used by software to incorporate elements of the physical world into a digital representation of the user or environment. For example, a user may interact with games or fitness applications, participate in social media such as chat, calls, online discussion boards, social network postings, or other social content, or they may use body tracking to navigate user interface elements of software such as a web browser or media player. Software used in this manner may not need to be specially-configured to utilize body tracking, for example to navigate a web browser a user's body movements or reactions to feedback may be processed by a composition server 801 and mapped to generic inputs such as keystrokes or mouse clicks, for use in any standard software application without the need for special configuration.

It should be further appreciated that while reference is made to a treadmill-type exercise machine 100, such an exercise machine is exemplary and any of a number of exercise machines may be utilized according to the aspects disclosed herein, for example including (but not limited to) a treadmill, a stationary bicycle, an elliptical machine, a rowing machine, or even non-electronic exercise equipment such as a pull-up bar or weight machine. Traditional exercise equipment may be outfitted with additional components to facilitate virtual reality or mixed reality interaction according to the aspects disclosed herein, for example by affixing a plurality of tethers 304a-n to a weight machine so that a user's movement during exercise may be used as interaction as described below (with reference to FIGS. 3-7).

Figure 36:
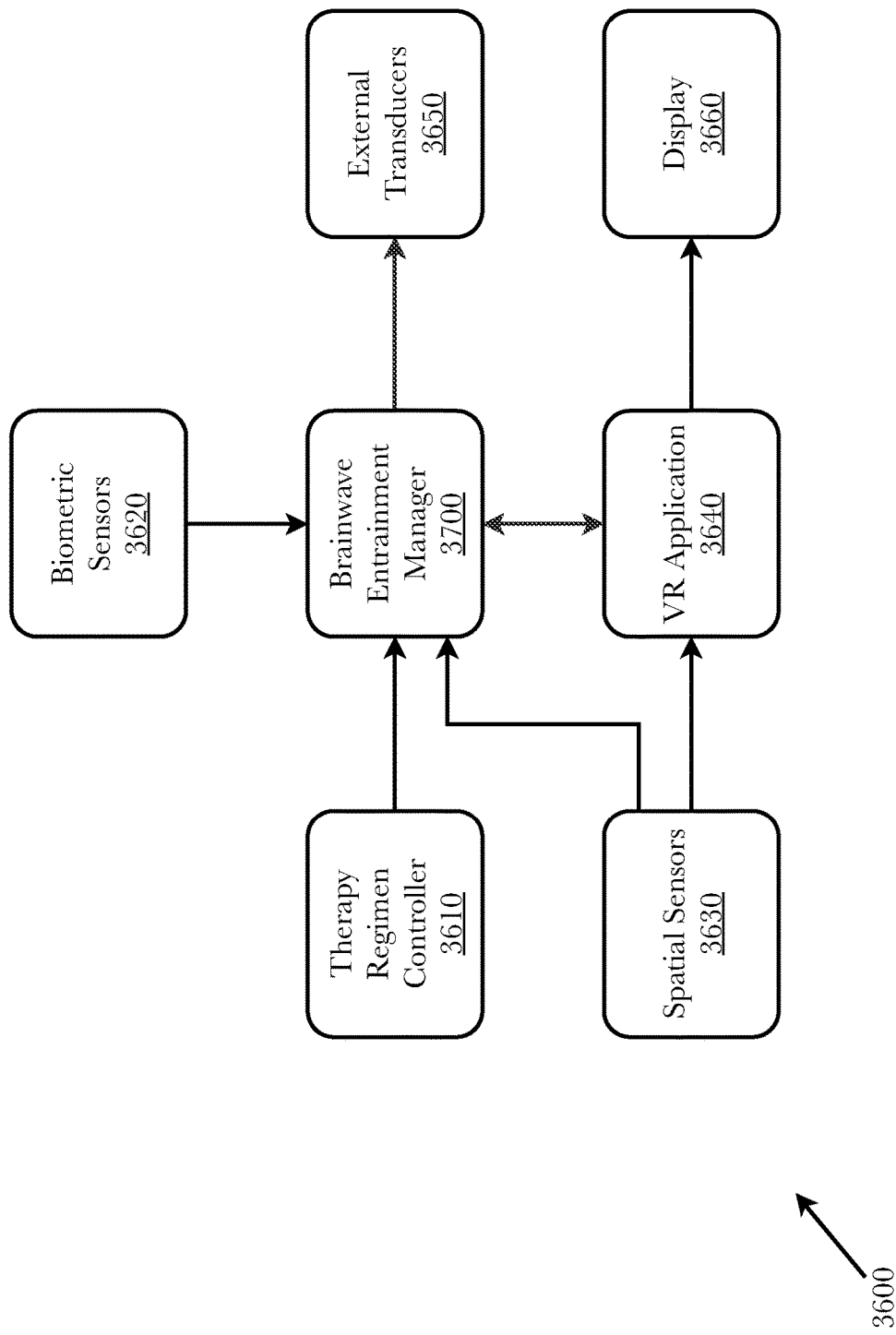
FIG. 36 is a diagram showing an exemplary overall system architecture for a brainwave entrainment system using virtual objects and environments as visual, stimulation transducers.

FIG. 36 is a diagram showing an exemplary overall system architecture 3600 for a brainwave entrainment system using virtual objects and environments as visual stimulation transducers. In this embodiment, the system comprises a brainwave entrainment manager 3700, a virtual reality (VR) application 3640, a therapy regimen controller 3610, one or more spatial sensors 3630, one or more biometric sensors 3620, and one or more external transducers, and a display 3660.

The brainwave entrainment manager 3700 is the core of the system, and manages inputs from, and outputs to, other components of the system. It is responsible for selection of entrainment routines, evaluation of the user's attention, and activation of both virtual and physical stimulation transducers.

The therapy regimen controller 3610 is an administrative interface that allows an administrator (e.g., a physician, therapist, masseuse, or other service provider) to select therapy regimens for application to the user (who may be a patient, client, etc., of the administrator). The therapy regimen controller 3610 may be used, for example, to select a regimen for brainwave entrainment that emphasizes alpha wave stimulation to induce relaxation in an overstimulated user.

The biometric sensors 3620 are sensors that measure a physical or physiological characteristic of the user, such as heart rate, temperature, sweat production, brain activity (using an electroencephalograph, or EEG), etc. Biometric sensors 3620 are used to provide feedback to the brainwave entrainment manager 3700 as to the physical or physiological state of the user, which may be used to infer the user's mental state. For example, a biometric sensor 3620 that measures the user's heart rate may be used to infer the user's level of relaxation (or lack thereof), thus providing feedback as to the effectiveness of alpha brainwave entrainment intended to induce relaxation.

Spatial sensors 3630 are sensors that measure a user's physical location in space or a location at which the user is focusing his or her attention. For two dimensional screens, eye movement may be tracked and the location of the user's gaze may be calculated. In the case of virtual reality (VR), the user's body may be tracked, or if the user is wearing a VR headset, the orientation of the headset can be used to detect the user's head movements. Spatial sensors 3630 are used to detect the user's engagement with virtual objects and virtual environments, such that brainwave entrainment using those objects and environments can be adjusted, accordingly.

The VR application 3640 is used for gamification of brainwave entrainment. While a VR application 3640 is shown here, in principle any computer game, puzzle, display, or animation can be used, whether interactive or not, and whether three-dimensional or two-dimensional. The VR application 3640 can be a specially-designed program intended for use with the system, or can be an off-the-shelf game or application adapted for use with the system. In either case, the VR application 3640 will either have an interface with the brainwave entrainment manager 3700, or will have a brainwave entrainment manager 3700 integrated into it, whereby the brainwave entrainment manager 3700 is used to control brainwave entrainment using the virtual objects in the VR application 3640.

The external transducers 3650 are physical stimulation transducers that may be used to complement brainwave entrainment using virtual objects. A non-limiting list of external transducers 3650 includes lights or LEDs, speakers or other audio-producing devices, vibratory or other pressure-producing devices, and electrical stimulators. As an example, while brainwave entrainment is being applied visually using virtual objects on a screen, the brainwave entrainment may be supplemented or complemented by audible brainwave entrainment using speakers.

The display 3660 may be any type of display producing an output visible to a user of the system. A non-limiting list of displays 3660 includes computer and tablet screens, VR headsets, and projectors. The display 3660 is the means by which visual brainwave entrainment may be applied using virtual objects.

Figure 37:
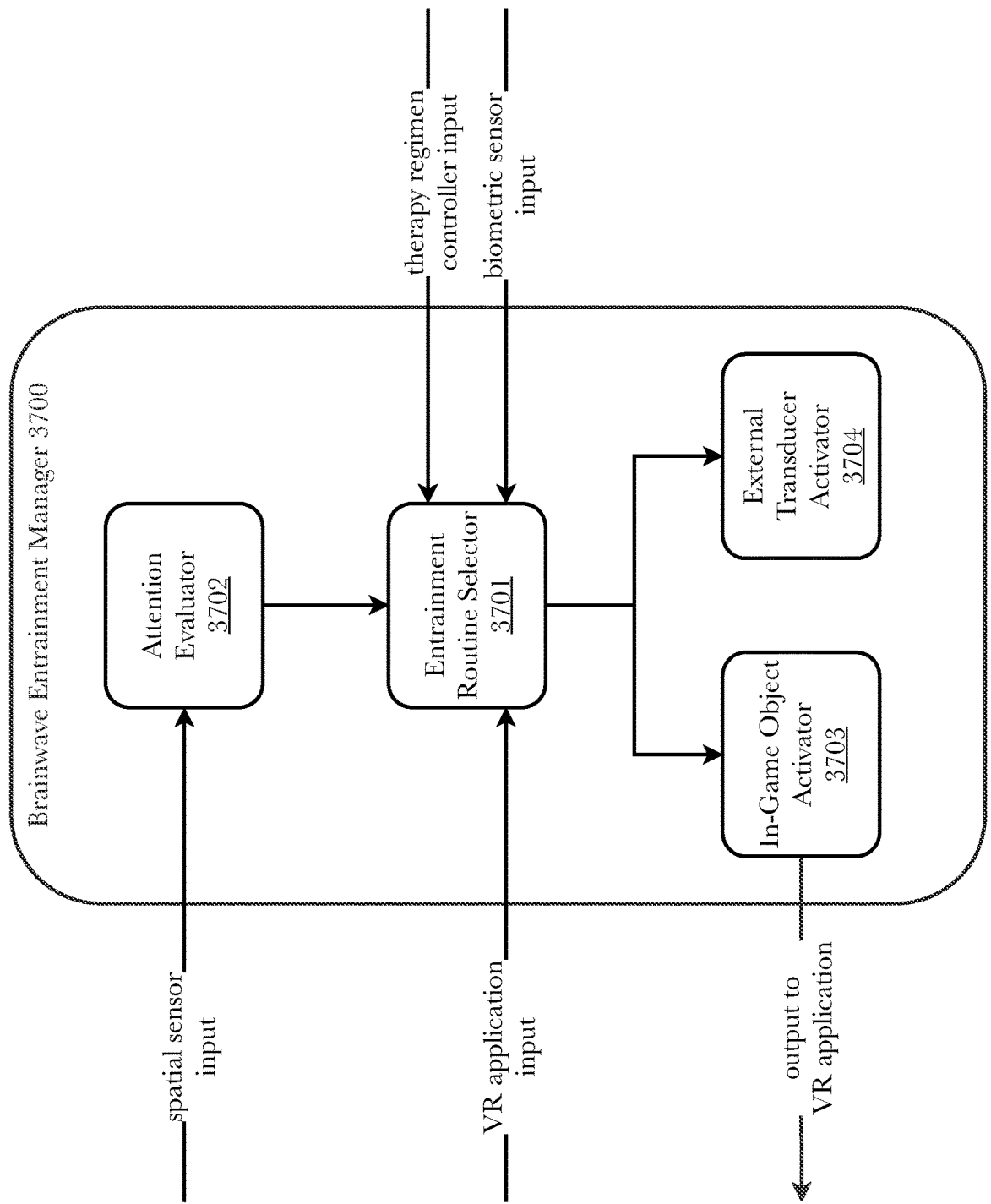
FIG. 37 is a diagram showing an exemplary architecture for the brainwave entrainment manager aspect of the brainwave entrainment using virtual objects and environments as visual, stimulation transducers.

FIG. 37 is a diagram showing an exemplary architecture for the brainwave entrainment manager aspect of the brainwave entrainment using virtual objects and environments as visual stimulation transducers. In this embodiment, the brainwave entrainment manager 3700 comprises an entrainment routine selector 3701, an attention evaluator 3702, an in-game object activator 3703, and an external transducer activator 3704. The entrainment routine selector 3701 receives input VR application input, therapy regimen controller input, and biometric sensor input, and input from the attention evaluator 3702. Based on those inputs, the entrainment routine selector 3701 chooses and/or modifies a brainwave routine appropriate for the circumstances. For example, if the therapy regimen controller input specifies that the overall brainwave entrainment goal is relaxation, the entrainment routine selector 3701 may select alpha wave entrainment as the primary entrainment therapy and may choose to apply alpha wave entrainment to a background virtual object, as flashing of background objects will be less intrusive (and possibly more relaxing) to the user than flashing of objects to which the user's attention is directed. To determine which objects are not the subject of the user's attention, the attention evaluator 3702 receives input from a spatial sensor (e.g., a camera used to track eye movements) to determine where the user is looking on the screen at a given moment. The entrainment routine selector 3701 then modifies the entrainment routine to flash an object or objects at which the user is not looking using an in-game object activator 3703 which interfaces with the VR application to identify which objects should be flashed.

The user's attention need not be tracked via a camera, and may be tracked through other means. For example, the user's attention may be tracked by monitoring the user's interaction with the virtual objects or virtual environment in the form of mouse clicks, keyboard activity, orientation of the user's head or body (e.g., when a virtual reality headset is being used), orientation and/or movement of hand-held trackable devices such as game controllers with integrated accelerometers, gyroscopes, etc. In some embodiments, the user's attention may be tracked not in terms of visual direction or attention, but in the more general sense of focus, consistency, ability to concentrate, level of interest, response times, or other factors not necessarily associated with the direction of the user's vision. All of these things may be incorporated into decisions by the entrainment routine selector 3701 as to changes to be made to the entrainment routine.

Simultaneously, the entrainment routine selector 3701 may activate one or more external transducers 3704 using an external transducer activator 3704, where the entrainment routine selector 3701 determines that external transducers may supplement or complement the brainwave entrainment using virtual objects. The entrainment routine selector 3701 may further use feedback to determine whether the selected entrainment routine is having the desired effect. As an example, the entrainment routine selector 3701 may use biometric feedback such as a user's heart rate (e.g., a lowering heart rate may be used to infer relaxation) to change the entrainment routine. For example, a lowering heart rate during alpha wave entrainment would likely indicate relaxation, in which case the entrainment routine would remain unmodified, but a rising heart rate would likely indicate irritation, in which case the entrainment routine might be modified by reducing the entrainment to theta wave entrainment to further induce relaxation.

Many other types and implementations of feedback are possible including, but not limited to, changing of entrainment routines based on user reactions to, or interactions with, virtual objects and virtual environments; user attention attributes such as the location, intensity, focus, and consistency of user attention to virtual objects and virtual environments; game scores and other gaming metrics; physical biofeedback such as monitoring heart rate, perspiration, respiration; cognitive biofeedback such as monitoring changes in an EEG; exercise equipment feedback such as treadmill speed, cycling cadence and/or power, rowing strokes per minute and/or power. Further, entrainment routines can be changed to use different types of stimulation (e.g., if the feedback indicates that visual stimulation is less effective at certain points in a game, it can be supplemented with auditory or haptic feedback). Multiple stimulation devices can be used to augment or supplement the visual stimulation including, but not limited to, haptic headbands or vest, speakers or headphones, and other stimulation devices. In this way, the system can be programmed to automatically adapt to users based on a variety of feedback sources.

DETAILED DESCRIPTION OF EXEMPLARY EMBODIMENTS

Figure 2:
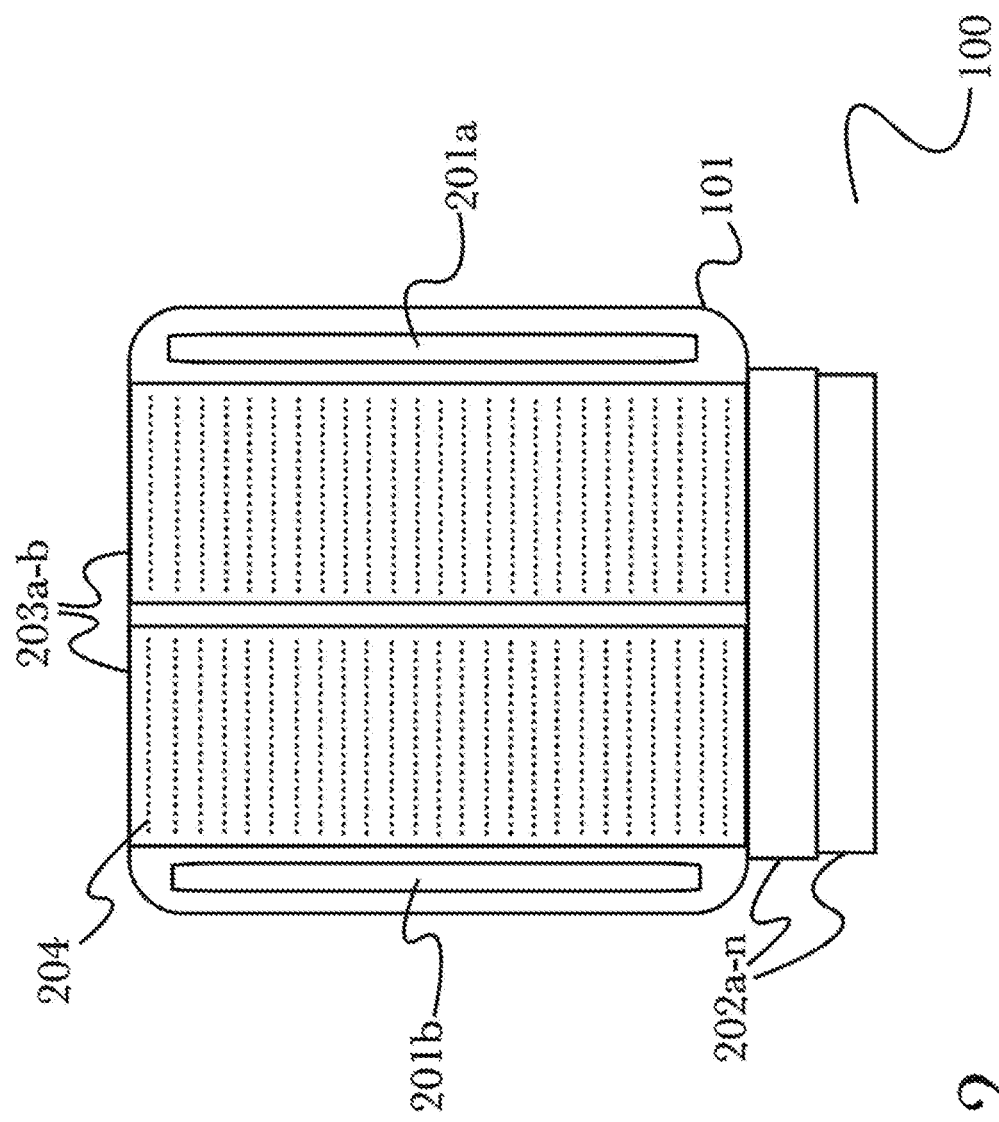
FIG. 2 is a top-down view of an exemplary variable-resistance exercise machine with wireless communication for smart device control and interactive software applications, according to an embodiment of the invention.

FIG. 2 is a top-down view of a variable-resistance exercise machine 100 with wireless communication for smart device control and interactive software applications, according to an embodiment of the invention. According to the embodiment, exercise machine 100 may comprise a stable base 101 to provide a platform for a user to safely stand or move about upon. Exercise machine 100 may further comprise right 201a and left 201b handrails for a user to brace against or grip during use, to provide a stable support for safety as well as a mounting point for external devices such as a plurality of tethers, as described below with reference to FIG. 3. A plurality of steps 202a-n may be used to provide a user with a safe and easy means to approach or dismount exercise machine 100, as well as a nonmoving "staging area" where a user may stand while they configure operation or wait for exercise machine 100 to start operation. Unlike traditional treadmill machines common in the art, exercise machine 100 may be made with greater width to accommodate a wider range of free movement of a user's entire body (whereas traditional treadmills are designed to best accommodate only a jogging or running posture, with minimal lateral motion), and a plurality of separate moving surfaces 203a-b may be utilized to provide multiple separate surfaces that may move and be controlled independently of one another during use. For example, a user may move each of their legs independently without resistance applied, with separate moving surfaces 203a-b moving freely underfoot as a user applies pressure during their movement. This may provide the illusion of movement to a user while in reality they remain stationary with respect to their surroundings. Another use may be multiple separate moving surfaces 203a-b, with separate speeds of movement or degrees of resistance, so that as a user moves about during use they may experience physical feedback in the form of changing speed or resistance, indicating where they are standing or in what direction they are moving (for example, to orient a user wearing a virtual reality headset, as described below with reference to FIG. 3). Moving surfaces 203a-b may be formed with a texture 204 to increase traction, which may improve user safety and stability during use as well as improve the operation of moving surfaces 203a-b for use in multidirectional movement (as the user's foot is less likely to slide across a surface rather than taking purchase and applying directional pressure to produce movement). Use of multiple, multidirectional moving surfaces 203a-b may also be used in various therapeutic or rehabilitation roles, for example to aid a user in developing balance or range of motion. For example, a user who is recovering from an injury or surgery (such as a joint repair or replacement surgery) may require regular physical therapy during recovery. Use of multidirectional moving surfaces 203a-b along with appropriate guidance from a rehabilitation specialist or physical therapist (or optionally a virtual or remote coach using a software application) may make regular therapy more convenient and accessible to the user, rather than requiring in-home care or regular visits to a clinic. For example, by enabling a therapist or coach to manually vary the movement and resistance of the moving surfaces 203a-b, they can examine a user's ability to overcome resistance to different movements such as at odd angles or across varying range of motion, to examine the user's physical health or ability. By further varying the resistance it becomes possible to assist the user with rehabilitation by providing targeted resistance training to specific movements, positions, or muscle groups to assist in recovery and development of the user's abilities.

Exercise machine 100 may be designed without a control interface commonly utilized by exercise machines in the art, instead being configured with any of a variety of wireless network interfaces such as Wi-Fi or BLUETOOTH™ for connection to a user's smart device, such as a smartphone or tablet computer. When connected, a user may use a software application on their device to configure or direct the operation of exercise machine 100, for example by manually configuring a variety of operation settings such as speed or resistance, or by interacting with a software application that automatically directs the operation of exercise machine 100 without exposing the particular details of operation to a user. Additionally, communication may be bi-directional, with a smart device directing the operation of exercise machine 100 and with exercise machine 100 providing input to a smart device based at least in part on a user's activity or interaction. For example, a user may interact with a game on their smart device, which directs the operation of exercise machine 100 during play as a form of interaction with, and feedback to, the user. For example, in a racing game, exercise machine 100 may alter the resistance of moving surfaces 203a-b as a user's speed changes within the game. In another example, a user may be moving about on moving surfaces 203a-b while playing a simulation or roleplaying game, and their movement may be provided to the connected smart device for use in controlling an in-game character's movement. Another example may be two-way interactive media control, wherein a user may select media such as music for listening on their smart device, and then while using exercise machine 100 their level of exertion (for example, the speed at which they run or jog) may be used to provide input to their smart device for controlling the playback of media. For example, if the user slows down music may be played slowly, distorting the audio unless the user increases their pace. In this manner, exercise machine 100 may be used interchangeably as a control and feedback device or both simultaneously, providing an immersive environment for a wide variety of software applications such as virtual reality, video games, fitness and health applications, or interactive media consumption.

Figure 4:
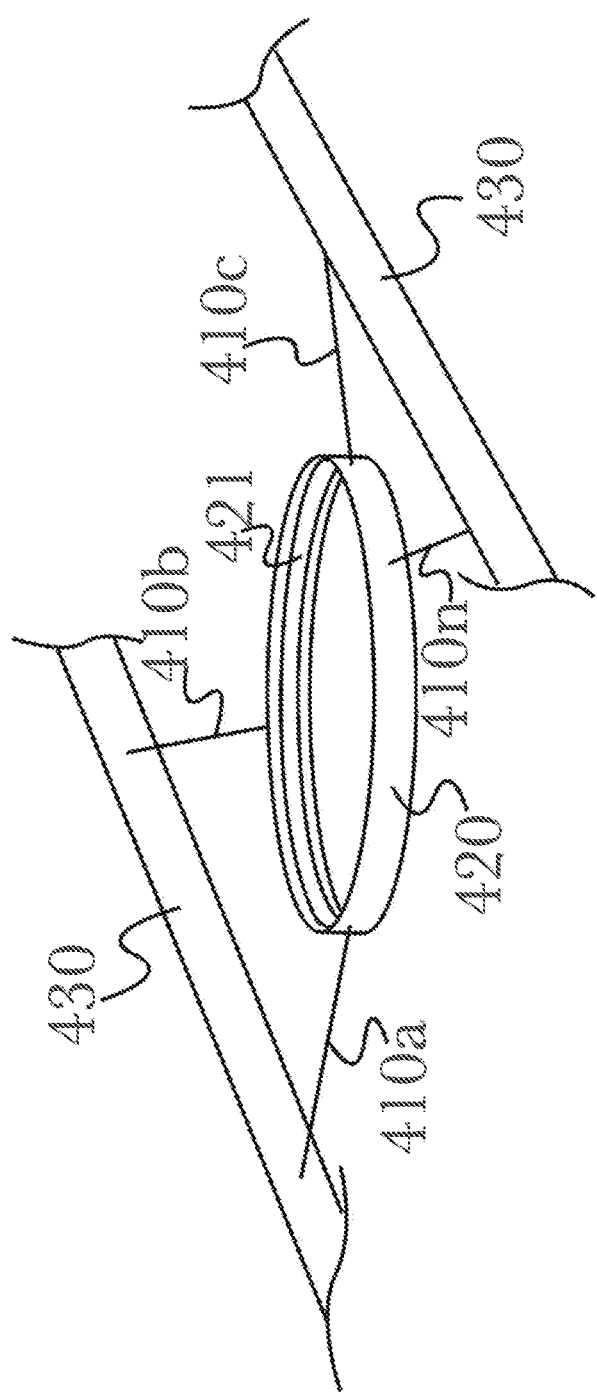
FIG. 4 is a diagram of an exemplary apparatus for natural torso tracking and feedback for electronic interaction, illustrating the use of multiple tethers and a movable torso harness.

FIG. 4 is a diagram of an exemplary hardware arrangement 400 for natural torso tracking and feedback for electronic interaction according to an embodiment of the invention, illustrating the use of multiple tethers 410a-n and a movable torso harness 420. According to the embodiment, a plurality of tethers 410a-n may be affixed or integrally-formed as part of a handle or railing 430, such as handlebars found on exercise equipment such as a treadmill, elliptical trainer, stair-climbing machine, or the like. In alternate arrangements, specifically-designed equipment with integral tethers 410a-n may be used, but it may be appreciated that a modular design with tethers 410a-n that may be affixed and removed freely may be desirable for facilitating use with a variety of fitness equipment or structural elements of a building, according to a user's particular use case or circumstance. Tethers 410a-n may then be affixed or integrally-formed to a torso harness 420, as illustrated in the form of a belt, that may be worn by a user such that movement of their body affects tethers 410a-n and applies stress to them in a variety of manners. It should be appreciated that while a belt design for a torso harness 420 is shown for clarity, a variety of physical arrangements may be used such as including (but not limited to) a vest, a series of harness-like straps similar to climbing or rappelling equipment, a backpack, straps designed to be worn on a user's body underneath or in place of clothing (for example, for use in medical settings for collecting precise data) or a plurality of specially-formed clips or attachment points that may be readily affixed to a user's clothing. Additionally, a torso harness 420 may be constructed with movable parts, for example having an inner belt 421 that permits a user some degree of motion within the harness 420 without restricting their movement. Movement of inner belt 421 (or other movable portions) may be measured in a variety of ways, such as using accelerometers, gyroscopes, or optical sensors, and this data may be used as interaction with software applications in addition to data collected from tethers 410a-n as described below. In some embodiments, a saddle-like surface on which a user may sit may be used, with motion of the saddle-like surface measured as described generally herein.

As a user moves, his or her body naturally shifts position and orientation. These shifts may be detected and measured via tethers 410a-n, for example by detecting patterns of tension or strain on tethers 410a-n to indicate body orientation, or by measuring small changes in strain on tethers 410a-n to determine more precise movements such as body posture while a user is speaking, or specific characteristics of a user's stride or gait. Additionally, through varying the quantity and arrangement of tethers 410a-n, more precise or specialized forms of movement may be detected and measured (such as, for example, using a specific arrangement of multiple tethers connected to a particular area of a user's body to detect extremely small movements for medical diagnosis or fitness coaching). This data may be used as interaction with software applications, such as for virtual reality applications as input for a user to control a character in a game. In such an arrangement, when a user moves, this movement may be translated to an in-game character or avatar to convey a more natural sense of interaction and presence. For example, in a multiplayer roleplaying game, this may be used to facilitate nonverbal communication and recognition between players, as their distinct mannerisms and gestures may be conveyed in the game through detection of natural torso position and movement. In fitness or health applications, this data may be used to track and monitor a user's posture or ergonomic qualities, or to assist in coaching them for specific fitness activities such as holding a pose for yoga, stretching, or proper running form during use with a treadmill. In medical applications, this data may be used to assist in diagnosing injuries or deficiencies that may require attention, such as by detecting anomalies in movement or physiological adaptations to an unrecognized injury (such as when a user subconsciously shifts their weight off an injured foot or knee, without consciously realizing an issue is present).

Through various arrangements of tethers 410a-n and tether sensors (as described below, referring to FIGS. 5-7), it may be possible to enable a variety of immersive ways for a user to interact with software applications, as well as to receive haptic feedback from applications. For example, by detecting rotation, tension, stress, or angle of tethers a user may interact with applications such as virtual reality games or simulations, by using natural body movements and positioning such as leaning, jumping, crouching, kneeling, turning, or shifting their weight in various directions to trigger actions within a software application configured to accept torso tracking input. By applying haptic feedback of varying form and intensity (as is described in greater detail below, referring to FIG. 5), applications may provide physical indication to a user of software events, such as applying tension to resist movement, pulling or tugging on a tether to move or "jerk" a user in a direction, or varying feedback to multiple tethers such as tugging and releasing in varying order or sequence to simulate more complex effects such as (for example, in a gaming use case) explosions, riding in a vehicle, or walking through foliage.

Figure 5:
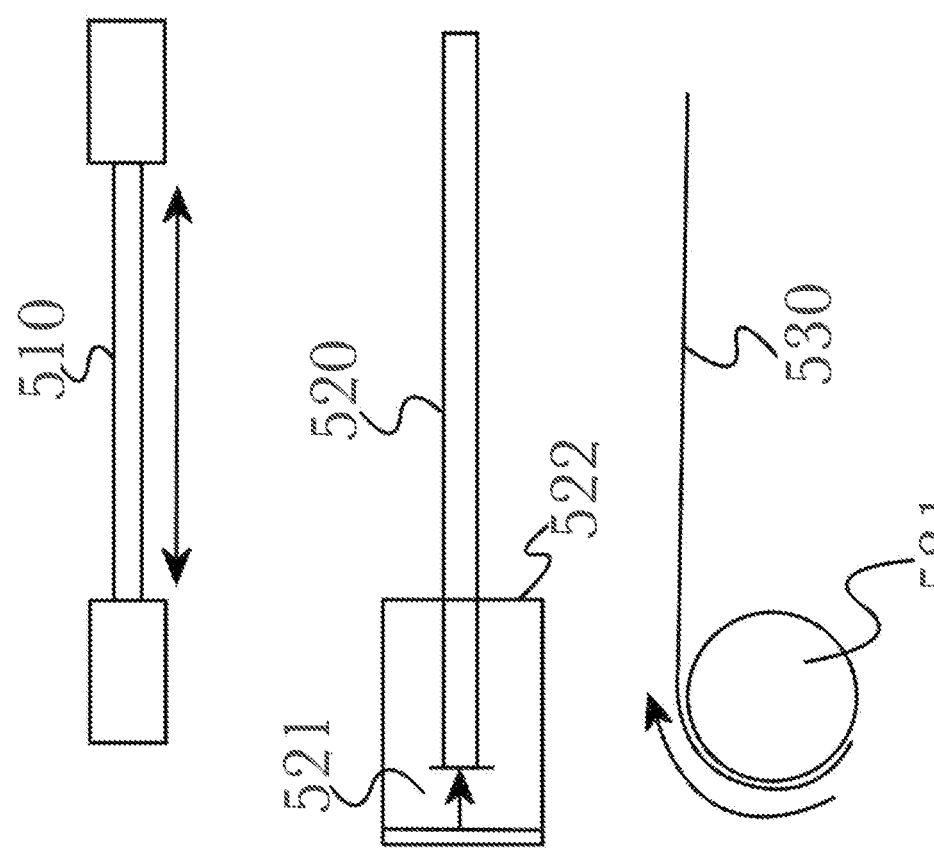
FIG. 5 is a diagram illustrating a variety of alternate tether arrangements.

FIG. 5 is a diagram illustrating a variety of alternate tether arrangements. According to various use cases and hardware arrangements, tethers 410a-n may utilize a variety of purpose-driven designs as illustrated. For example, a "stretchable" tether 510 may be used to measure strain during a user's movement, as the tether 510 is stretched or compressed (for example, using piezoelectric materials and measuring electrical changes). Such an arrangement may be suitable for precise measurements, but may lack the mechanical strength or durability for gross movement detection or prolonged use. An alternate construction may utilize a non-deforming tether 520 such as a steel cable or similar non-stretching material. Instead of measuring strain on the tether 520, instead tether 520 may be permitted a degree of movement within an enclosure 522 (for example, an attachment point on a torso harness 420 or handlebar 430), and the position or movement 521 of the tether 520 may be measured such as via optical sensors. In a third exemplary arrangement, a tether 530 may be wound about an axle or pulley 531, and may be let out when force is applied during a user's movement. Rotation of the pulley 531 may be measured, or alternately a tension device such as a coil spring may be utilized (not shown) and the tension or strain on that device may be measured as tether 530 is extended or retracted. In this manner, it may be appreciated that a variety of mechanical means may be used to facilitate tethers and attachments for use in detecting and measuring natural torso position and movement, and it should be appreciated that a variety of additional or alternate hardware arrangements may be utilized according to the embodiments disclosed herein.

Additionally, through the use of various hardware construction it becomes possible to utilize both "passive" tethers that merely measure movement or strain, as well as "active" tethers that may apply resistance or movement to provide haptic feedback to a user. For example, in an arrangement utilizing a coiled spring or pulley 531, the spring or pulley 531 may be wound to retract a tether and direct or impede a user's movement as desired. In this manner, various new forms of feedback-based interaction become possible, and in virtual reality use cases user engagement and immersion are increased through more natural physical feedback during their interaction.

By applying various forms and intensities of feedback using various tether arrangements, a variety of feedback types may be used to provide haptic output to a user in response to software events. For example, tension on a tether may be used to simulate restrained movement such as wading through water or dense foliage, walking up an inclined surface, magnetic or gravitational forces, or other forms of physical resistance or impedance that may be simulated through directional or non-directional tension. Tugging, retracting, or pulling on a tether may be used to simulate sudden forces such as recoil from gunfire, explosions, being grabbed or struck by a software entity such as an object or character, deploying a parachute, bungee jumping, sliding or falling, or other momentary forces or events that may be conveyed with a tugging or pulling sensation. By utilizing various patterns of haptic feedback, more complex events may be communicated to a user, such as riding on horseback or in a vehicle, standing on the deck of a ship at sea, turbulence in an aircraft, weather, or other virtual events that may be represented using haptic feedback. In this manner, virtual environments and events may be made more immersive and tangible for a user, both by enabling a user to interact using natural body movements and positioning, as well as by providing haptic feedback in a manner that feels natural and expected to the user. For example, if a user is controlling a character in a gaming application through a first-person viewpoint, it would seem natural that when their character is struck there would be a physical sensation corresponding to the event; however, this is not possible with traditional interaction devices, detracting from any sense of immersion or realism for the user. By providing this physical sensation alongside the virtual event, the experience becomes more engaging and users are encouraged to interact more naturally as their actions results in natural and believable feedback, meeting their subconscious expectations and avoiding excessive "immersion-breaking" moments, which in turn reduces the likelihood of users adopting unusual behaviors or unhealthy posture as a result of adapting to limited interaction schema.

Haptic feedback may be provided to notify a user of non-gaming events, such as for desktop notifications for email or application updates, or to provide feedback on their posture for use in fitness or health coaching. For example, a user may be encouraged to maintain a particular stance, pose, or posture while working or for a set length of time (for example, for a yoga exercise application), and if their posture deviates from an acceptable range, feedback is provided to remind them to adjust their posture. This may be used in sports, fitness, health, or ergonomic applications that need not utilize other aspects of virtual reality and may operate as traditional software applications on nonspecialized computing hardware. For example, a user at their desk may use an ergonomic training application that monitors their body posture throughout the workday and provides haptic reminders to correct poor posture as it is detected, helping the user to maintain a healthy working posture to reduce fatigue or injuries due to poor posture (for example, repetitive-stress injuries that may be linked to poor posture while working at a computer).

Figure 6:
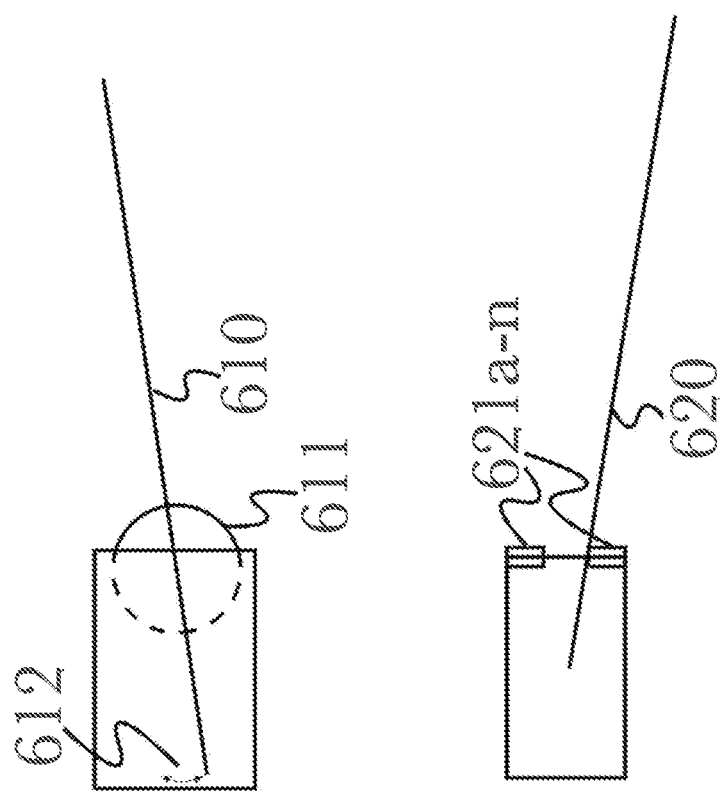
FIG. 6 is a diagram of an additional exemplary apparatus for natural torso tracking and feedback for electronic interaction, illustrating the use of angle sensors to detect angled movement of tethers.

FIG. 6 is a diagram of an additional exemplary hardware arrangement 600 for natural torso tracking and feedback for electronic interaction according to an embodiment of the invention, illustrating the use of angle sensors 612, 621a-n to detect angled movement of a tether 620. According to one exemplary arrangement, a tether 610 may be affixed to or passed through a rotating joint such as a ball bearing 611 or similar, to permit free angular movement. During movement, the angular movement or deflection 612 of a protruding bar, rod, or tether segment 613 may be measured (for example, using optical, magnetic, or other sensors) to determine the corresponding angle of tether 610. In this manner, precise angle measurements may be collected without impeding range of motion or introducing unnecessary mechanical complexity.

In an alternate hardware arrangement, the use of angle sensors 621a-n enables tracking of a vertical angle of a tether 620, to detect and optionally measure vertical movement or orientation of a user's torso. When tether 620 contacts a sensor 621a-n, this may be registered and used to detect a general vertical movement (that is, whether the tether is angled up or down). For more precise measurements, the specific hardware construction of a sensor 621a-n may be varied, for example using a pressure-sensing switch to detect how much force is applied and use this measurement to determine the corresponding angle (as may be possible given a tether 620 of known construction). It should be appreciated that various combinations of hardware may be used to provide a desired method or degree of angle detection or measurement, for example using a conductive tether 620 and a capacitive sensor 621a-n to detect contact, or using a mechanical or rubber-dome switch (as are commonly used in keyboard construction) to detect physical contact without a conductive tether 620.

The use of angle detection or measurement may expand interaction possibilities to encompass more detailed and natural movements of a user's body. For example, if a user crouches, then all tethers 410a-n may detect a downward angle simultaneously. Additionally, data precision or availability may be enhanced by combining input from multiple available sensors when possible (for example, utilizing adaptive software to collect data from any sensors that it detects, without requiring specific sensor types for operation), for example by combining data from tethers 410a-n and hardware sensors such as an accelerometer or gyroscope, enabling multiple methods of achieving similar or varied types or precision levels of position or movement detection. Similarly, when a user jumps then all tethers may detect an upward angle simultaneously. However, if a user leans in one direction, it may be appreciated that not all tethers 410a-n will detect the same angle. For example, tethers 410a-n in the direction the user is leaning may detect a downward angle, while those on the opposite side would detect an upward angle (due to the orientation of the user's torso and thus a worn torso harness 420). In this manner, more precise torso interaction may be facilitated through improved detection and recognition of orientation and movement. Additionally, it may be appreciated that sensors 621a-n may be utilized for other angle measurements, such as to detect horizontal angle. For example, if a user is wearing a non-rotating torso harness 420, when they twist their body a similar stress may be applied to all attached tethers 410a-n. Without angle detection the precise nature of this movement will be vague, but with horizontal angle detection it becomes possible to recognize that all tethers 410a-n are being strained in a similar direction (for example, in a clockwise pattern when viewed from above, as a user might view tethers 410a-n during use), and therefore interpret the interaction as a twisting motion (rather than, for example, a user squatting or kneeling, which might apply a similar stress to the tethers 410a-n but would have different angle measurements).

Figure 7:
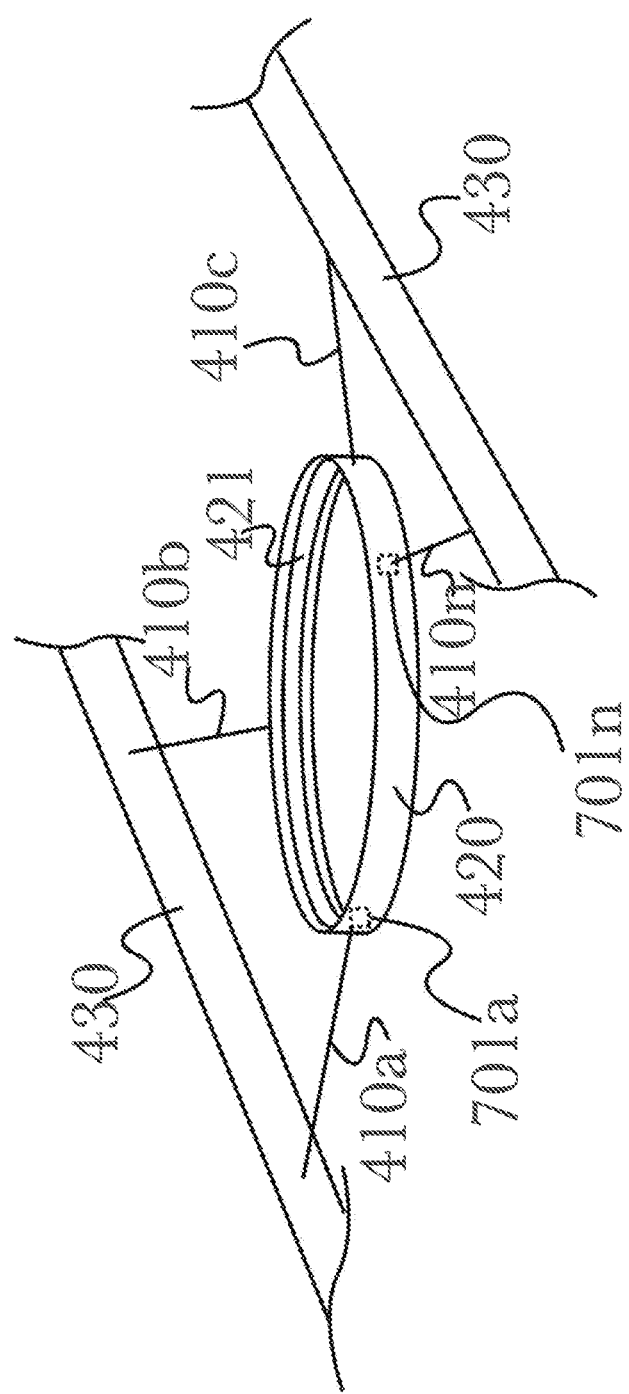
FIG. 7 is a diagram illustrating an exemplary apparatus for natural torso tracking and feedback for electronic interaction, illustrating the use of multiple tethers and a movable torso harness comprising a plurality of angle sensors positioned within the movable torso harness.

FIG. 7 is a diagram illustrating an exemplary hardware arrangement of an apparatus for natural torso tracking and feedback for electronic interaction according to an embodiment of the invention, illustrating the use of multiple tethers 410a-n and a movable torso harness 420 comprising a plurality of angle sensors 701a-n positioned within the movable torso harness 420. According to the embodiment, a plurality of tethers 410a-n may be affixed or integrally-formed as part of a handle or railing 430, such as handlebars found on exercise equipment such as a treadmill, elliptical trainer, stair-climbing machine, or the like. In alternate arrangements, specifically-designed equipment with affixed or integral tethers 410a-n may be used, but it may be appreciated that a modular design with tethers 410a-n that may be affixed and removed freely may be desirable for facilitating use with a variety of fitness equipment or structural elements of a building, according to a user's particular use case or circumstance as well as weight-holding strength of the tethers. Tethers 410a-n may then be affixed or integrally-formed to angle sensors 701a-n placed within or integrally-formed as a component of torso harness 420 (as illustrated in the form of a belt) that may be worn by a user such that movement of their body affects tethers 410a-n and applies detectable or measurable stress to tethers 410a-n and angular motion to angle sensors 701a-n. In this manner, it may be appreciated that angle sensors 701a-n may be utilized as integral or removable components of a torso harness 420, as an alternative arrangement to utilizing angle sensors 701a-n placed or formed within railings 430 or other equipment components connected to distal ends of tethers 410a-n (with respect to the user's torso). According to various embodiments, sensors may be placed optionally on a belt, vest, harness, or saddle-like surface or at attachment points on safety railings, or indeed both.

Figure 9:
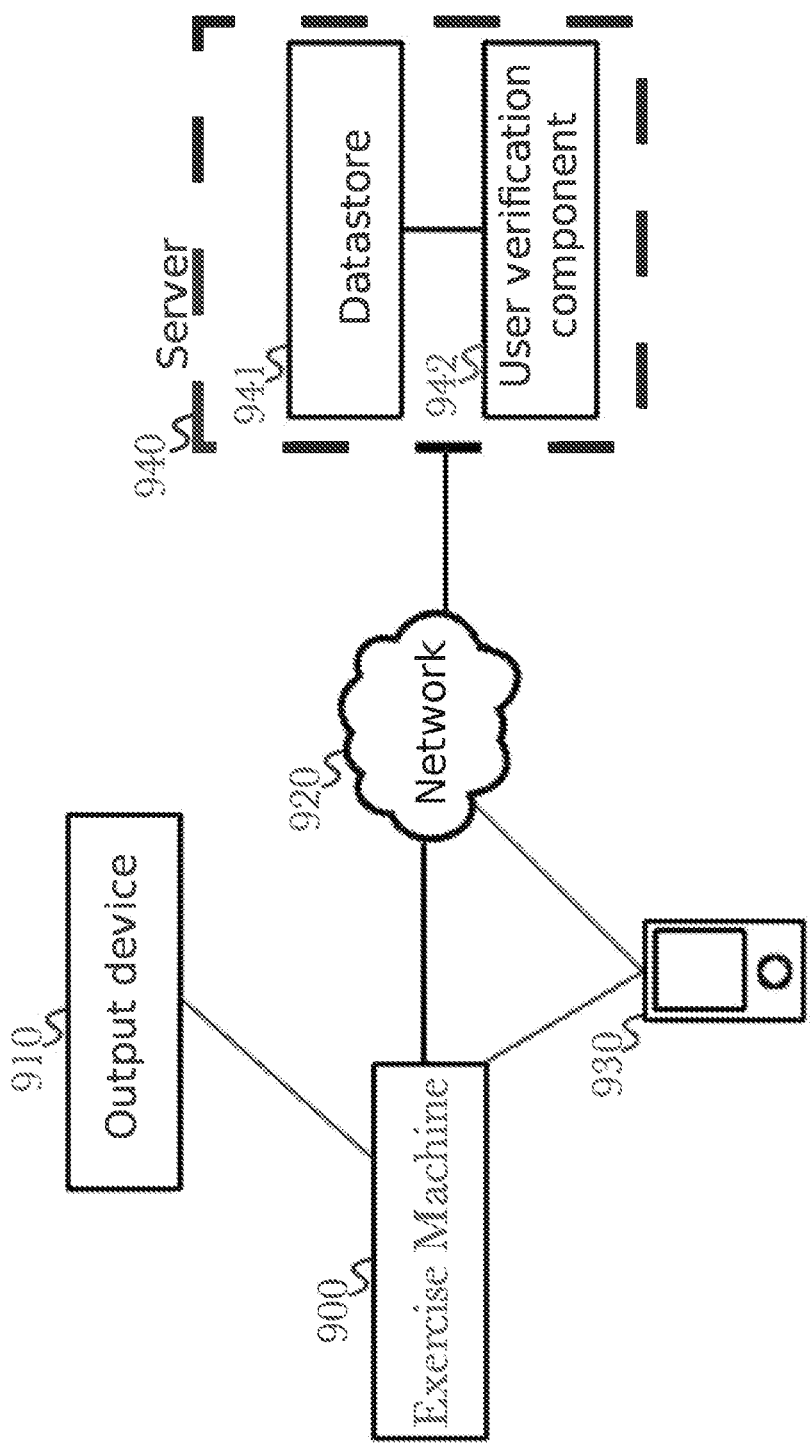
FIG. 9 is a block diagram of an exemplary system architecture for a stationary exercise bicycle being connected over local connections to a smartphone, an output device other than a phone, and a server over a network, according to an aspect.

FIG. 9 is a block diagram of an exemplary system architecture of an exercise machine 900 being connected over local connections to a smartphone or computing device 930, an output device other than a phone 910, and a server 940 over a network 920, according to a preferred aspect. An exercise machine 100 may connect over a network 920, which may be the Internet, a local area connection, or some other network used for digital communication between devices, to a server 940. Such connection may allow for two-way communication between a server 940 and an exercise machine 800. An exercise machine 100 may also be connected over a network 920 to a smartphone or computing device 930, or may be connected directly to a smartphone or computing device 930 either physically or wirelessly such as with Bluetooth connections. An exercise machine 100 also may be connected to an output device 910 which may display graphical output from software executed on an exercise machine 100, including Mixed or virtual reality software, and this device may be different from a smartphone or computing device 930 or in some implementations may in fact be a smartphone or computing device 930. A remote server 940 may contain a data store 941, and a user verification component 942, which may contain typical components in the art used for verifying a user's identity from a phone connection or device connection, such as device ID from a smartphone or computing device or logging in with a user's social media account.

Figure 10:
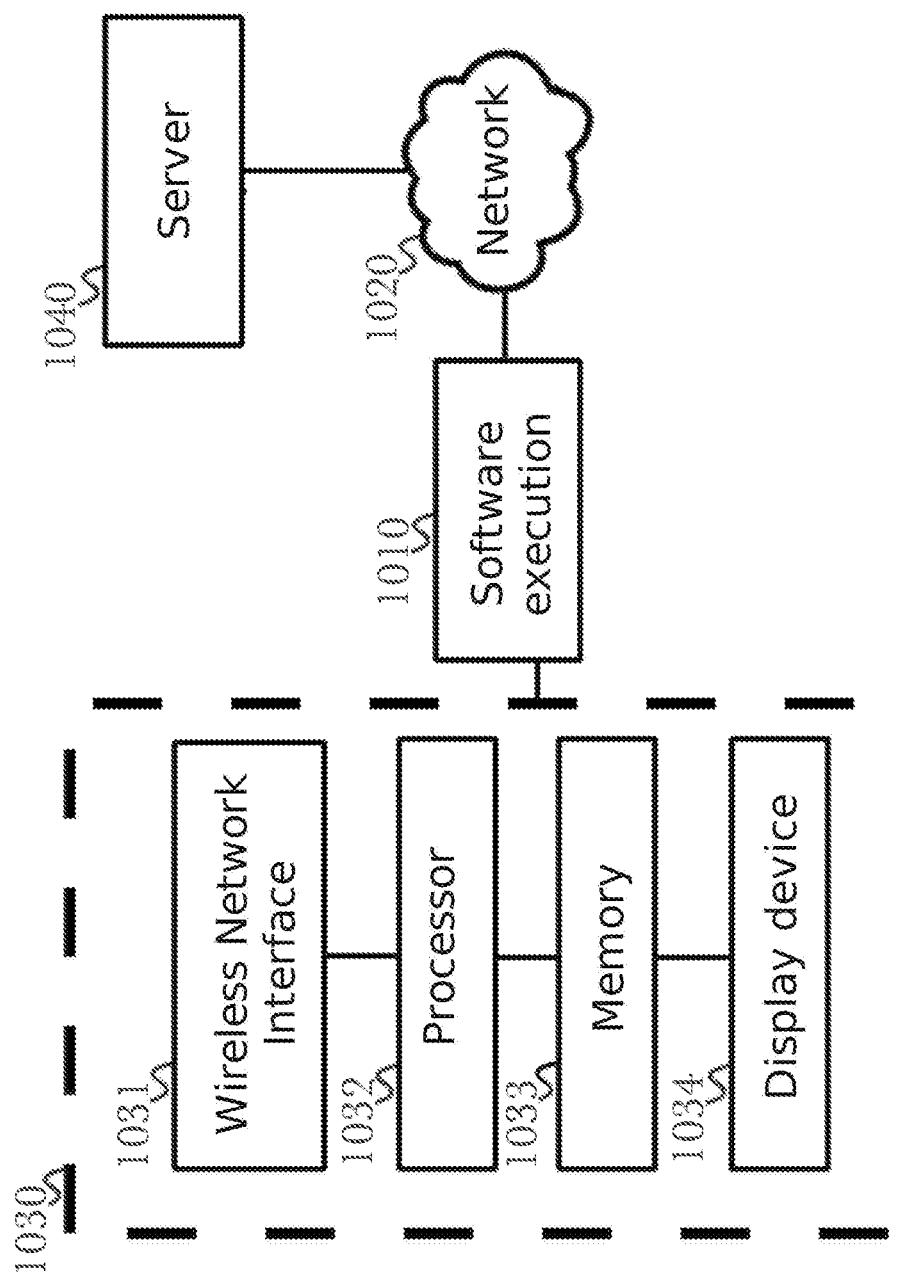
FIG. 10 is a diagram of an exemplary hardware arrangement of a smart phone or computing device running a user identification component and communicating over a network, according to an aspect.

FIG. 10 is a diagram of an exemplary hardware arrangement of a smart phone or computing device 1030 executing software 1010 and communicating over a network 1020, according to a preferred aspect. In an exemplary smart phone or computing device 1030, key components include a wireless network interface 1031, which may allow connection to one or a variety of wireless networks including Wi-Fi and Bluetooth; a processor 1032, which is capable of communicating with other physical hardware components in the computing device 1030 and running instructions and software as needed; system memory 1033, which stores temporary instructions or data in volatile physical memory for recall by the system processor 1032 during software execution; and a display device 1034, such as a Liquid Crystal Display (LCD) screen or similar, with which a user may visually comprehend what the computing device 1030 is doing and how to interact with it. It may or may not be a touch enabled display, and there may be more components in a computing device 1030, beyond what are crucially necessary to operate such a device at all. Software 1010 operating on a processor 1033 may include a mixed or virtual reality application, a user verification system, or other software which may communicate with a network-enabled server 1040 and exercise machine 100 software for the purposes of enhanced mixed or virtual reality.

Figure 11:
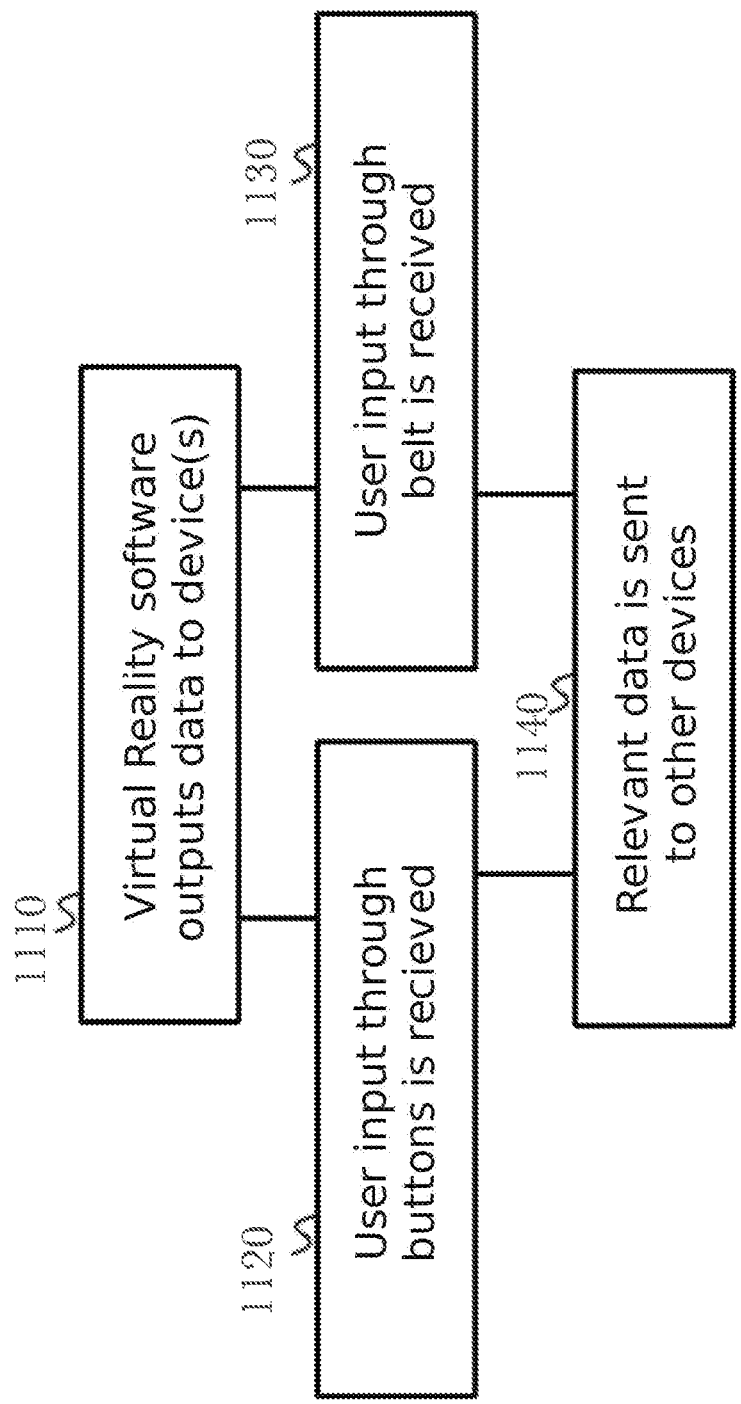
FIG. 11 is a block diagram of a method of mixed or virtual reality software operating to receive input through different sources, and send output to devices, according to an aspect.

FIG. 11 is a block diagram of a method of mixed or virtual reality software operating to receive input through different sources, and send output to devices, according to a preferred aspect. Mixed or virtual reality software which may be run on a phone or computing device 1030 or another device, outputs data to a visual device for the purpose of graphically showing a user what they are doing in the software 1110. Such display may be a phone display 1034, or a separate display device such as a screen built into an exercise machine 100 or connected some other way to the system, or both display devices. During software execution, user input may be received either through buttons 1130 on the exercise machine 100, 1120, or through input from a belt-like harness 420, such as user orientation or movements. Such received data may be sent 1140 to either a mobile smart phone or computing device 1030, or to a server 1040 over a network 1020, or both, for processing, storage, or both. Data may be stored on a server with a data store device 1041 and may be processed for numerous uses including user verification with a user verification component 1042. Data may be processed either by software running on an exercise machine 100, a smart phone or computing device 1030, or some other connected device which may be running mixed or virtual reality software, when input is received from a user using either buttons on an exercise machine 100, a belt-like harness 420, or both, and optionally using hardware features of an exercise machine 100 such as handlebars, pedals, or other features in mixed or virtual reality software for tasks such as representing movement in a simulation.

Figure 17:
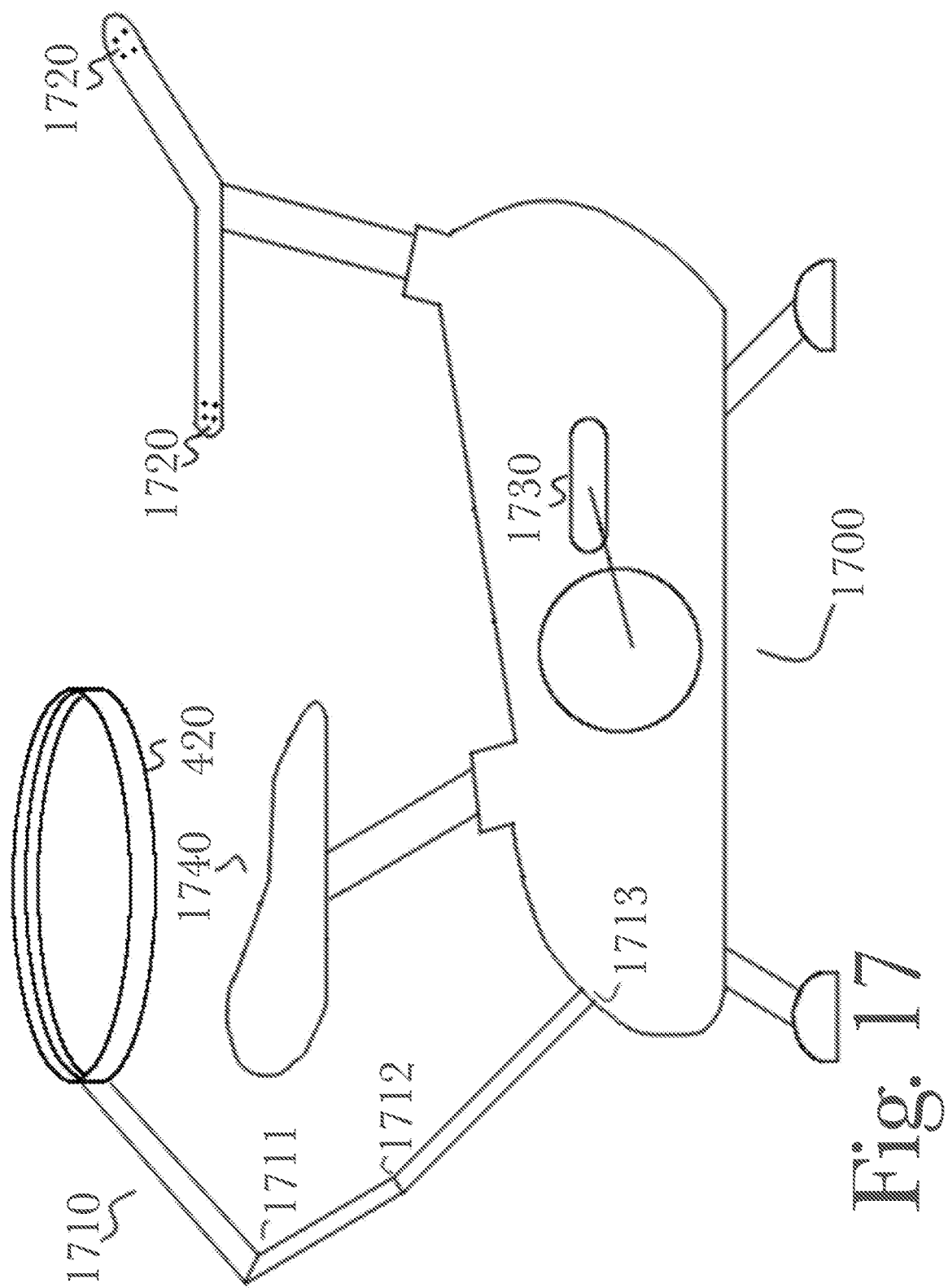
FIG. 17 is a block diagram of an exemplary virtual reality or mixed reality enhanced exercise machine, illustrating the use of a stationary bicycle with hand controls on the handles, and a belt-like harness attachment.

FIG. 17 is a block diagram of an exemplary virtual reality or mixed reality enhanced exercise machine, illustrating the use of a stationary bicycle 1700 with hand controls on the handles 1720, and a belt-like harness attachment 420. A stationary exercise bicycle device 1700, which may be of any particular design including a reclining, sitting, or even unicycle-like design, possesses two pedals 1730 as is common for stationary exercise bicycles of all designs. On handlebars of a stationary exercise bicycle may exist buttons and controls 1720 for interacting with a virtual reality or mixed reality augmented piece of software, allowing a user to press buttons in addition to or instead of pedaling, to interact with the software. A belt-like harness attachment 420 is attached via a mechanical arm 1710 to a stationary exercise bicycle 1700, which may monitor motion and movements from a user during the execution of virtual reality software. A mechanical arm 1710 may have an outer shell composed of any material, the composition of which is not claimed, but must have hinges 1711, 1712, 1713 which allow for dynamic movement in any position a user may find themselves in, and angular sensors inside of the arm at the hinge-points 1711, 1712, 1713 for measuring the movement in the joints and therefore movement of the user. A stationary bicycle device 1700 may also have a pressure sensor in a seat 1740, the sensor itself being of no particularly novel design necessarily, to measure pressure from a user and placement of said pressure, to detect movements such as leaning or sitting lop-sided rather than sitting evenly on the seat.

Figure 18:
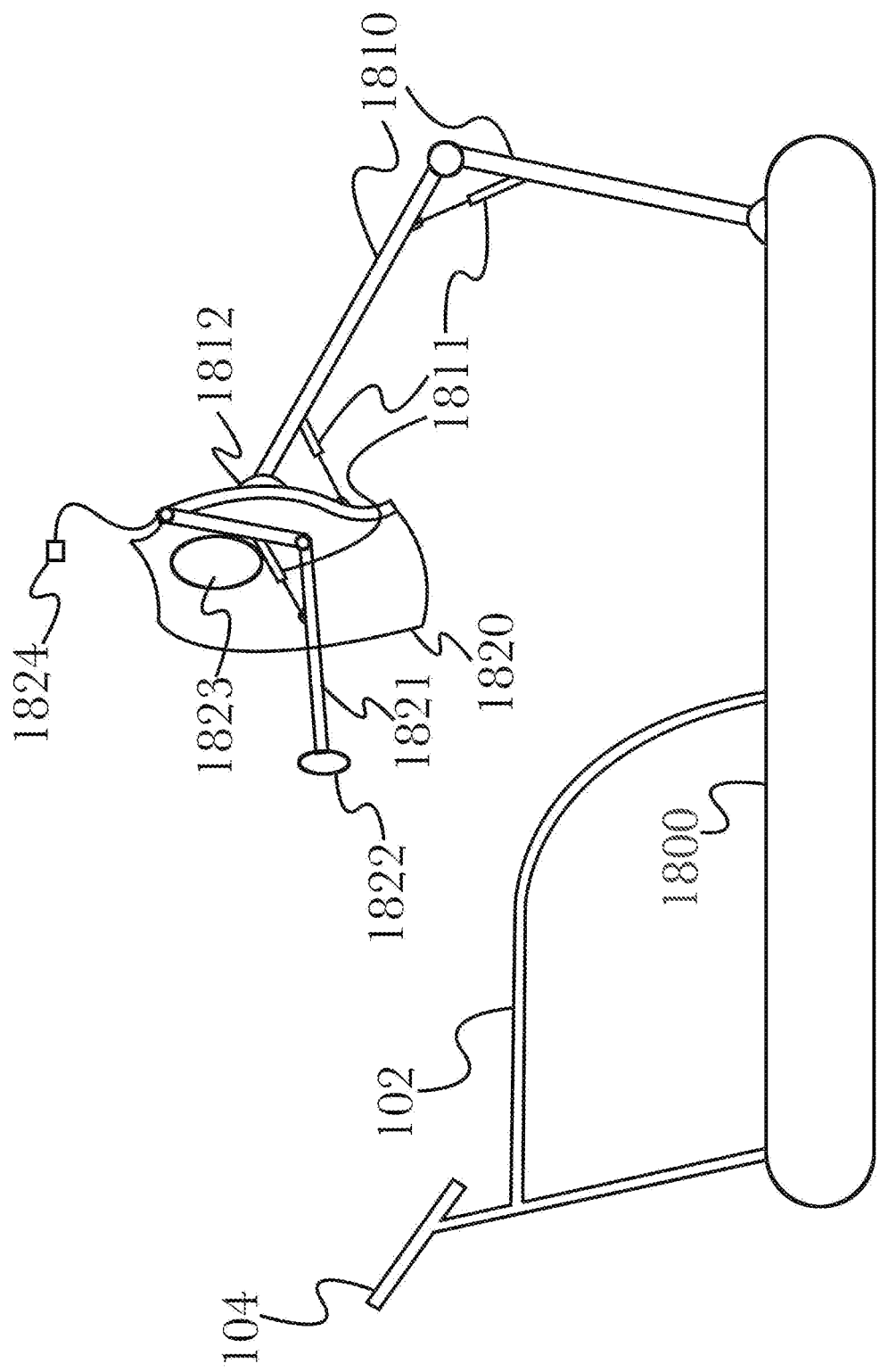
FIG. 18 is a diagram of another exemplary virtual reality or mixed reality enhanced exercise machine, illustrating the use of a treadmill exercise machine with a vest-type harness with a plurality of pistons to provide a hardware-based torso joystick with full-body tracking.

FIG. 18 is a diagram of another exemplary virtual reality or mixed reality enhanced exercise machine 1800, illustrating the use of a treadmill exercise machine 100 a vest-type harness 1820 with a plurality of pistons 1811 to provide a hardware-based torso joystick with full-body tracking. According to this embodiment, a treadmill or other exercise machine 100 may comprise a plurality of rigid side rails 102 for a user to grip for support as needed during use (for example, as a balance aid or to assist getting on the machine and setting up other equipment properly) as well as a rigid stand or mount 104 for a user's smartphone or other computing device, that may be used to operate a virtual reality or mixed reality software application. Exercise machine 100 may further comprise a jointed arm 1810 or similar assembly that may be integrally-formed or removably affixed to or installed upon exercise machine 100. Arm 1810 may utilize a plurality of pistons 1811 to provide for movement during use in order to follow the movements of a user's body, as well as to provide tension or resistance to motion when appropriate (for example, to resist a user's movements or to provide feedback) and motion detection of a user's movement during use, according to various aspects described previously (referring to FIGS. 3-7, for example) by measuring movement of a piston 1811 or arm 1810 and optionally applying tension or resistance to piston 1811 to retard movement of arm 1810 and constrain user movement or simulate specific forms of physical feedback. For example, if a user is moving an avatar in a virtual reality software application, when the avatar encounters an obstacle such as another avatar, object, or part of the environment, resistance may be applied to piston 1811 to prevent the user from moving further, so that their avatar is effectively prevented from moving through the obstacle and thereby facilitating the immersive experience of a solid object in a virtual environment. Additional arms may be used for a user's limbs 1821 and may incorporate straps 1822 to be affix about a user's arm, wrist, or other body part (for example, when placed through an appropriate arm or limb hole 1823 in vest harness 1820 while worn), to incorporate more detailed movement tracking of a user's arms and/or legs rather than just torso-based tracking. A vest-type harness 1820 may be affixed to jointed arm 1810 using a movable joint 1812 such as a ball joint (for example) and used in place of a belt 420, to allow for more natural movement or to provide greater area upon which to affix additional arms 1821, pistons 1811, or any of a variety of sensors, for example such as accelerometers or gyroscopes for detecting body orientation (not all optional sensors are shown for the sake of clarity). For example, a vest 1820 may have integrated feedback actuators for use in first-person software applications to simulate impacts or recoil, or it may incorporate heating or cooling elements to simulate different virtual environments while worn. Additionally, vest 1820 may incorporate electrical connectors 1824 for various peripheral devices such as controllers 305a-b or a headset 302, reducing the risk of tangles or injury by keeping cables short and close to the user so they cannot cause issues during movement or exercise.

Figure 19:
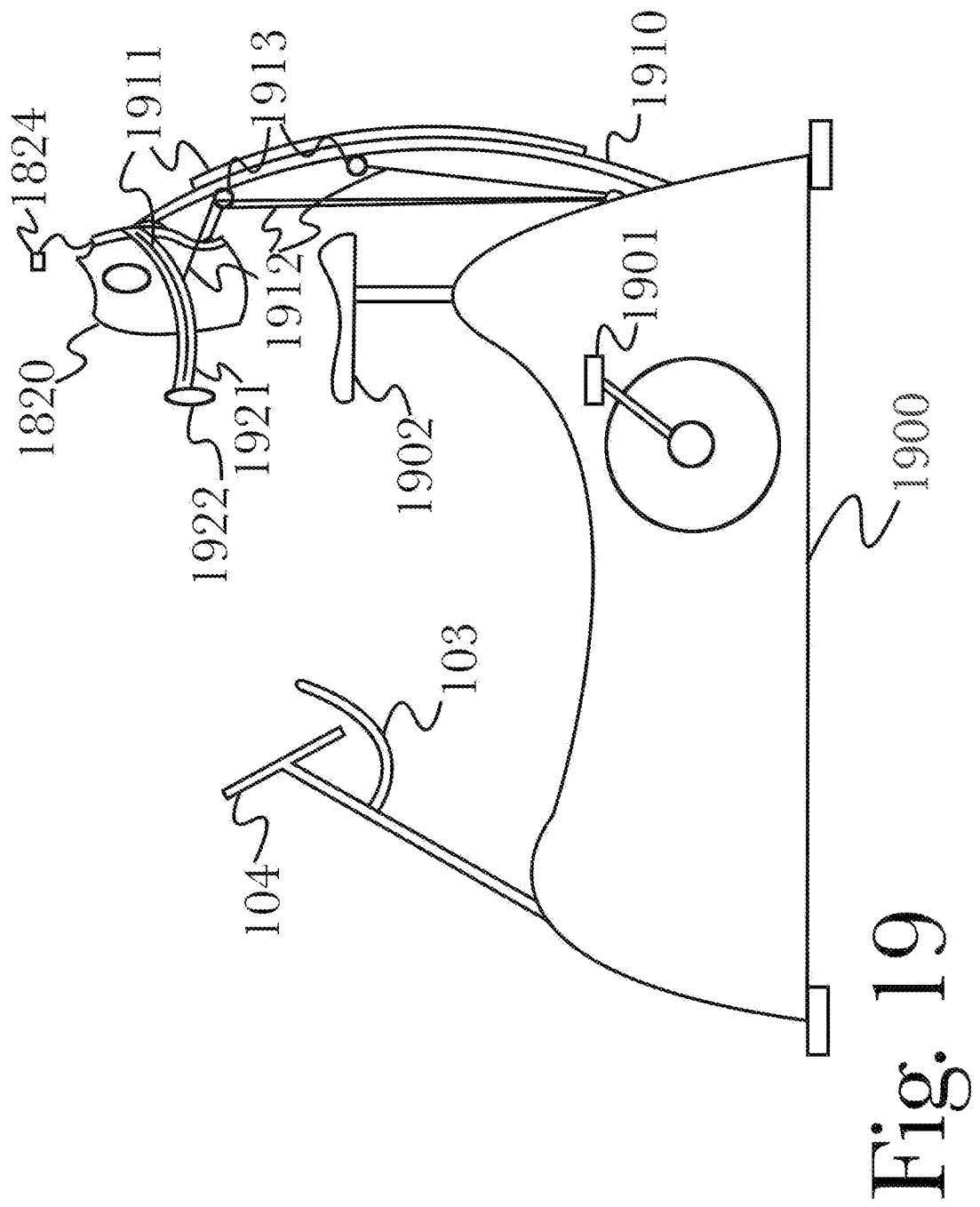
FIG. 19 is a diagram of another exemplary virtual reality or mixed reality enhanced exercise machine, illustrating the use of a stationary bicycle with a vest-type harness with a plurality of strain sensors and tethers.

FIG. 19 is a diagram of another exemplary virtual reality or mixed reality enhanced exercise machine, illustrating the use of a stationary bicycle 1900 with a vest-type harness 1820 with a plurality of strain sensors 1911 and tethers 1912, according to an aspect of the invention. According to this embodiment, rather than a jointed arm 1810 and pistons 1811, a solid flexible arm 1910 may be used to detect user movement while positioned on a seat 1902 to use exercise machine 100, for example while the user is seated to use pedals 1901 on a stationary bike or elliptical training machine. Through a plurality of strain gauges 1911 that detect the flexion or extension of the solid arm. Tethers 1912 may be used for either movement tracking or providing feedback to a user, or both, and may optionally be connected or routed through joints or interconnects 1913 to allow for a greater variety of attachment options as well more precise feedback (for example, by enabling multiple angles from which a tether 1912 may apply force, to precisely simulate different effects). Tethers may be operated by means of actuators such as motors, solenoids, pistons, or any other means of placing or releasing tension on the tether. For example, an end of the tether may be attached to a lever arm operated by a piston-type actuator, or may be attached to a reel operated by a motor-type actuator. Additional arms may be used for a user's limbs 1921 and may incorporate straps 1922 to be affix about a user's arm, wrist, or other body part, to incorporate more detailed movement tracking of a user's arms and/or legs rather than just torso-based tracking. Additional arms 1921 may also incorporate additional tethers 1912 and strain sensors 1911 to track movement and apply feedback to specific body parts during use, further increasing precision and user immersion. A vest-type harness 1820 may be used in place of a belt 420, to allow for more natural movement or to provide greater area upon which to affix additional arms 1921, tether 1912, or any of a variety of sensors, for example such as accelerometers or gyroscopes for detecting body orientation (not all optional sensors are shown for the sake of clarity). For example, a vest 1820 may have integrated feedback actuators for use in first-person software applications to simulate impacts or recoil, or it may incorporate heating or cooling elements to simulate different virtual environments while worn. Additionally, vest 1820 may incorporate electrical connectors 1914 for various peripheral devices such as controllers 305a-b or a headset 302, reducing the risk of tangles or injury by keeping cables short and close to the user so they cannot cause issues during movement or exercise.

Figure 20:
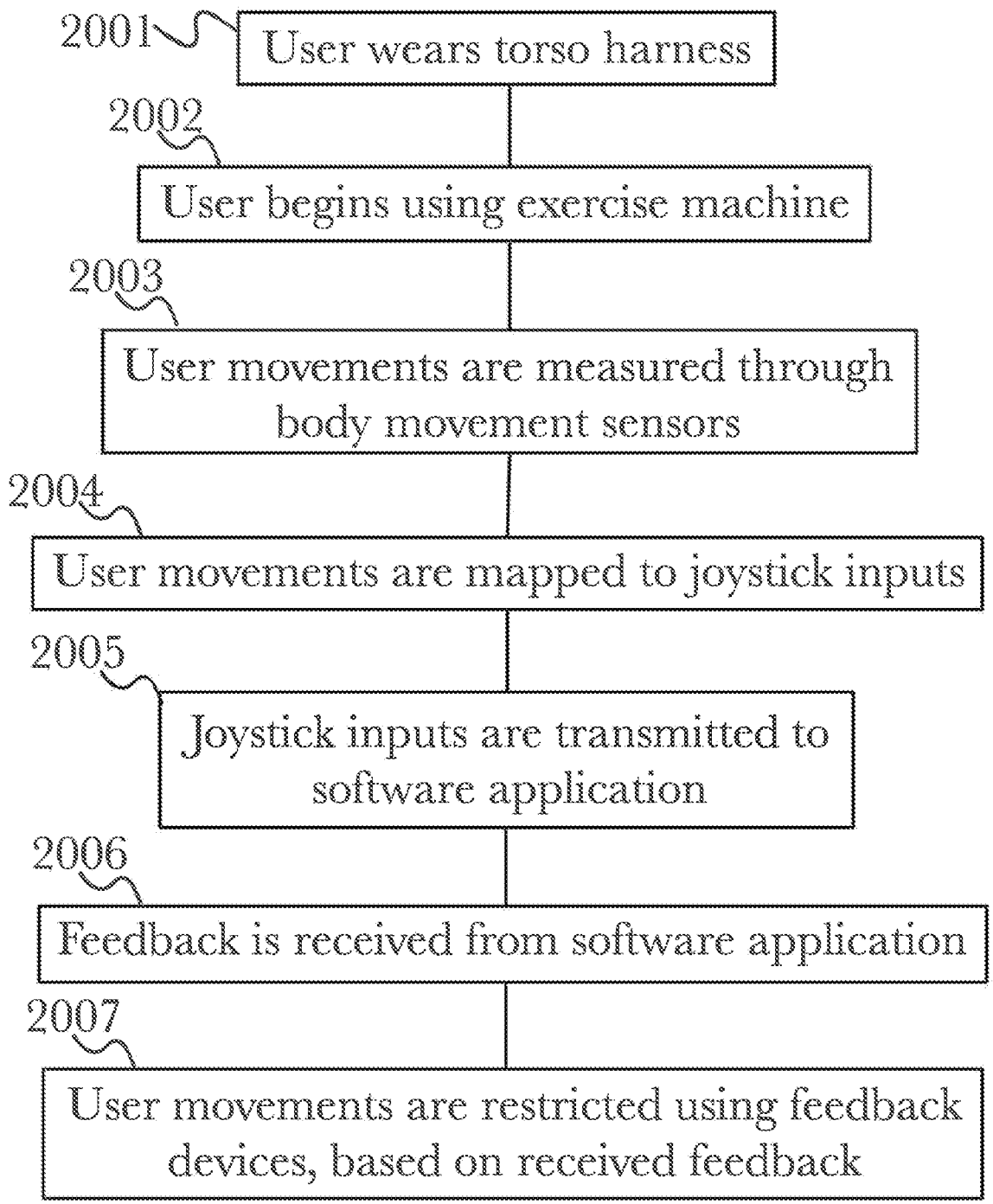
FIG. 20 is a flow diagram illustrating an exemplary method for operating a virtual and mixed-reality enhanced exercise machine.

FIG. 20 is a flow diagram illustrating an exemplary method 2000 for operating a virtual and mixed-reality enhanced exercise machine, according to one aspect. According to the aspect, a user may wear 2001 a torso harness such as a belt 420 or vest 1820 harness, while they engage in the use 2002 of an exercise machine 100. While using the exercise machine 100, the user's movements may be detected and measured 2003 through the use of a plurality of body movement sensors such as (for example, including but not limited to) strain sensors 1911, tethers 410a-c, 1912, pistons 1811, or optical sensors 1201a-n. These measured user movements may then be mapped by a composition server 801 to correspond to a plurality of movement inputs of a virtual joystick device 2004. These virtual joystick inputs may then be transmitted 2005 to a software application, for example a virtual reality or mixed reality application operating on a user device such as (for example, including but not limited to) a smartphone 930, personal computing device, or headset 302. Composition server 801 may then receive feedback from the software application 2006, and may direct the operation of a plurality of feedback devices such as tethers 410a-c, 1912 or pistons 1811 to resist or direct the user's movement 2007 to provide physical feedback to the user based on the received software feedback.

Figure 21:
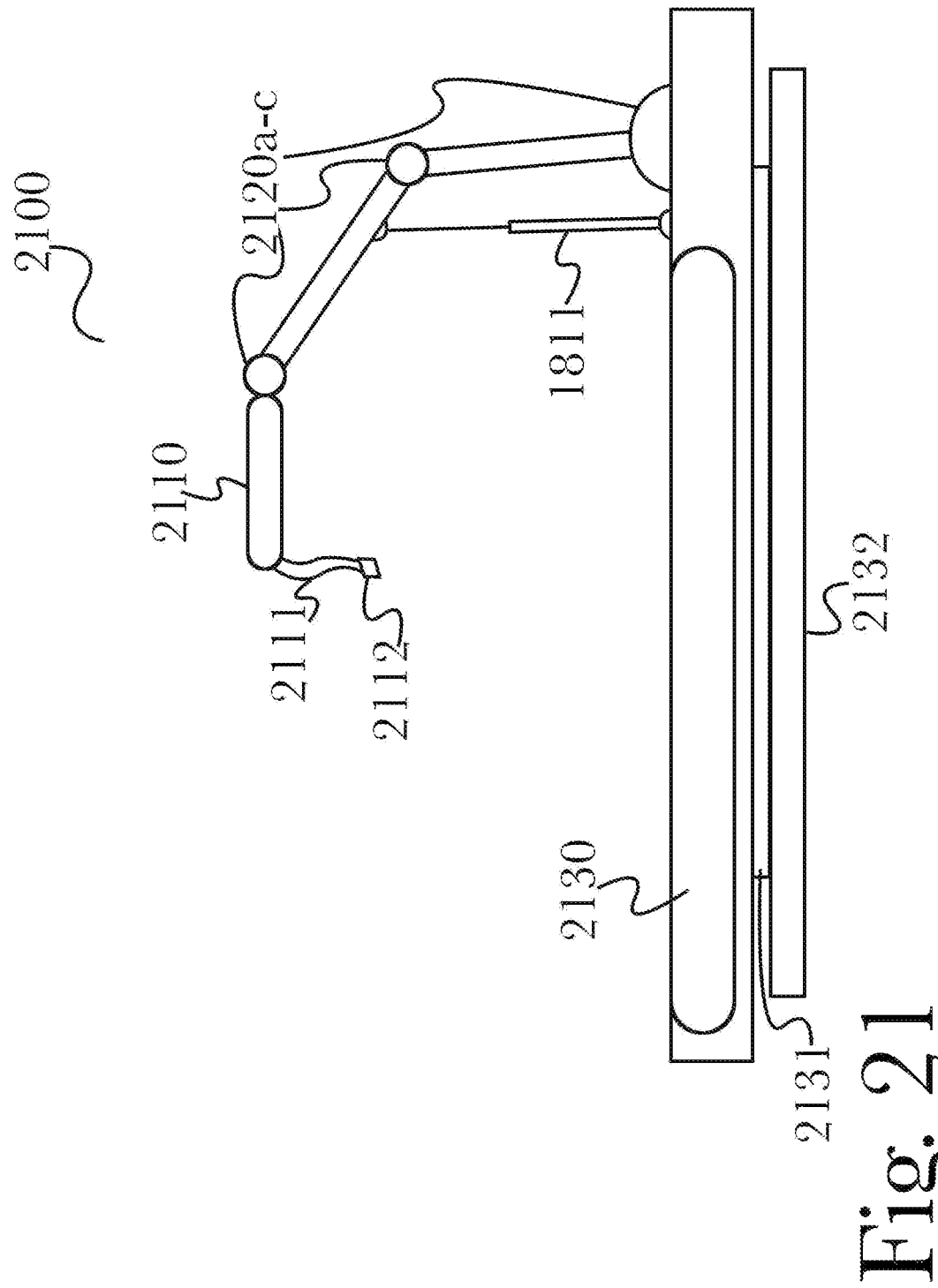
FIG. 21 is a diagram of another exemplary virtual reality or mixed reality enhanced exercise machine, illustrating the use of a rotating platform, a waist belt and joints providing full range of motion.

FIG. 21 is a diagram of another exemplary virtual reality or mixed reality enhanced exercise machine 2100, illustrating the use of a rotating platform, a waist belt 2110 and joints 2120a-c providing full range of motion. As shown in view 2, a virtual reality or mixed reality exercise machine 2100 may comprise an exercise machine such as (for example) a treadmill 2130 that has a movable or pivotable base 2132, for example via a turnstile 2131 or similar joint for allowing movement of the entire exercise machine 2100 while base 2132 remains stationary or fixed to the floor. A waist belt 2110 such as a padded hip belt or a support belt (such as those used for weightlifting or other physical activities, or those used for physical therapy or other medical uses) may be utilized with belt straps 2111 and buckle 2112 to fasten about a user's waist. Waist belt 2110 may be attached to exercise machine 2100 using a plurality of ball or similar joints 2120a-c configured to allow for full range of motion, enabling complex user movements and posture and allowing the use of full freedom of movement when interacting with software applications. A plurality of pistons 1811 or other means may be used, as described previously, to restrict or direct user movement or to provide feedback, enabling a variety of interaction and feedback options as well as providing a means to control and manipulate user movement both for immersion in virtual or mixed reality applications as well as for a variety of medical or therapeutic uses, such as preventing users from exceeding recommended range of motion during physical therapy or preventing movement past safety parameters.

Figure 22:
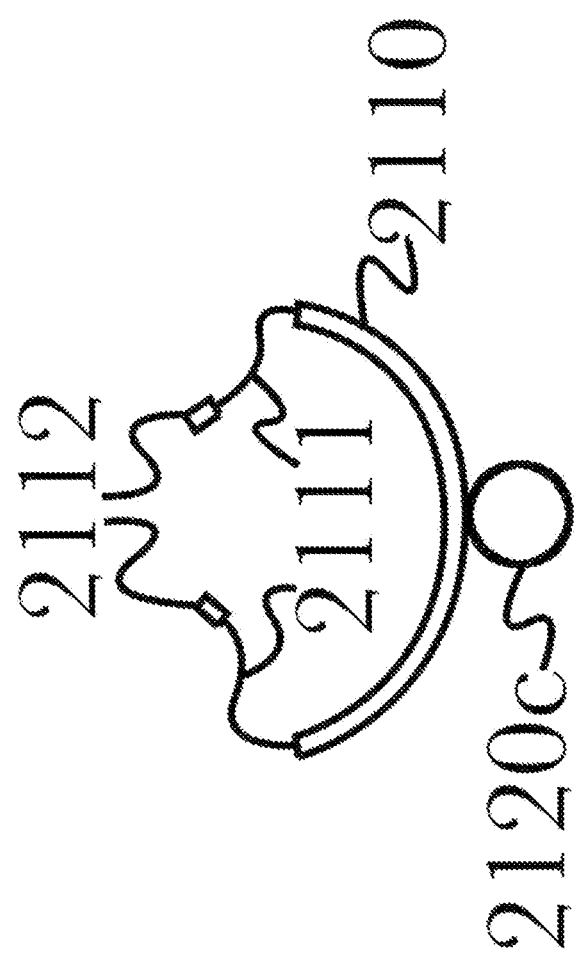
FIG. 22 is a diagram illustrating a top view of a waist belt with straps, buckle, and ball joint providing full range of motion.

FIG. 22 is a diagram illustrating a top view of a waist belt with straps, buckle, and ball joint providing full range of motion. A waist belt 2110 such as a padded hip belt or a support belt (such as those used for weightlifting or other physical activities, or those used for physical therapy or other medical uses) may be utilized with belt straps 2111 and buckle 2112 to fasten about a user's waist. Waist belt 2110 may be attached to exercise machine 2100 using a ball or similar joint 2120c configured to allow for full range of motion, enabling complex user movements and posture and allowing the use of full freedom of movement when interacting with software applications.

Figure 23:
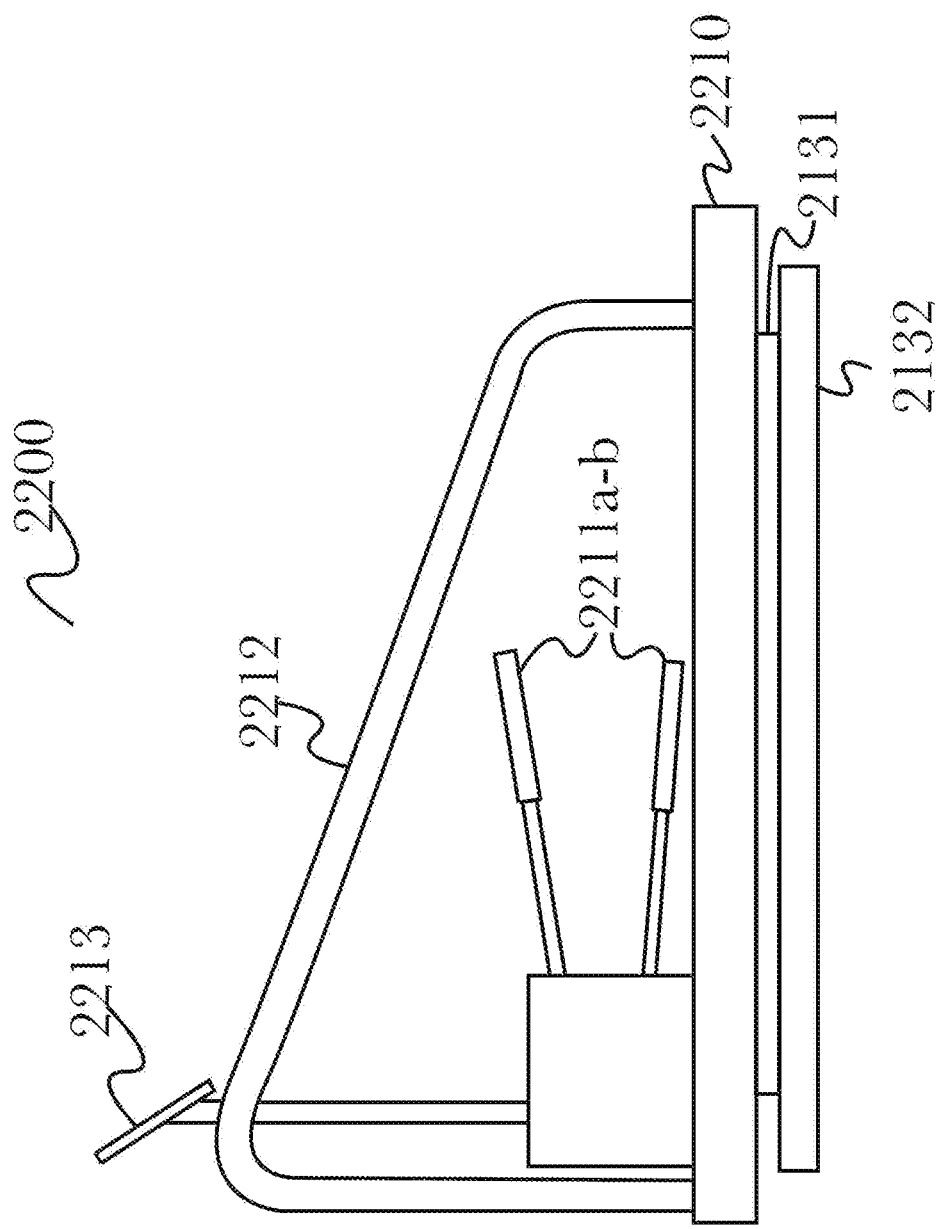
FIG. 23 is a diagram of another exemplary virtual reality or mixed reality enhanced exercise machine, illustrating the use of a movable exercise machine with a rotating platform.

FIG. 23 is a diagram of another exemplary virtual reality or mixed reality enhanced exercise machine 2200, illustrating the use of a movable exercise machine 2200 with a rotating platform. A virtual reality or mixed reality exercise machine 2200 may comprise an exercise machine such as (for example) a stepping machine 2210 that has movable foot pedals 2211a-b for simulating stairs or other vertical movement, railing 2212 for a user to grip for safety and support, and a screen or control interface 2213 for directing the operation of stepping machine 2210 or interacting with software applications (such as, for example, virtual reality or mixed reality applications). Exercise machine 2200 may further comprise a movable or pivotable base 2132, for example via a rotating platform 2131 or similar joint for allowing movement of the entire exercise machine 2210 while base 2132 remains stationary or fixed to the floor. This enables a user to continue using exercise machine 2200 while being able to adjust the orientation of the machine (for example, to gradually adjust to accommodate changes in lighting or other environmental features, or to move the machine manually to face toward or away from other items in the area such as a TV, speakers, or other users using other exercise equipment). This also provides a means for exercise machine 2200 to be moved during the use of virtual or mixed reality software applications, for example as a form of interaction or immersion by moving the user during a game or providing feedback in the form of small movements to simulate changes in a virtual environment.

Figure 24:
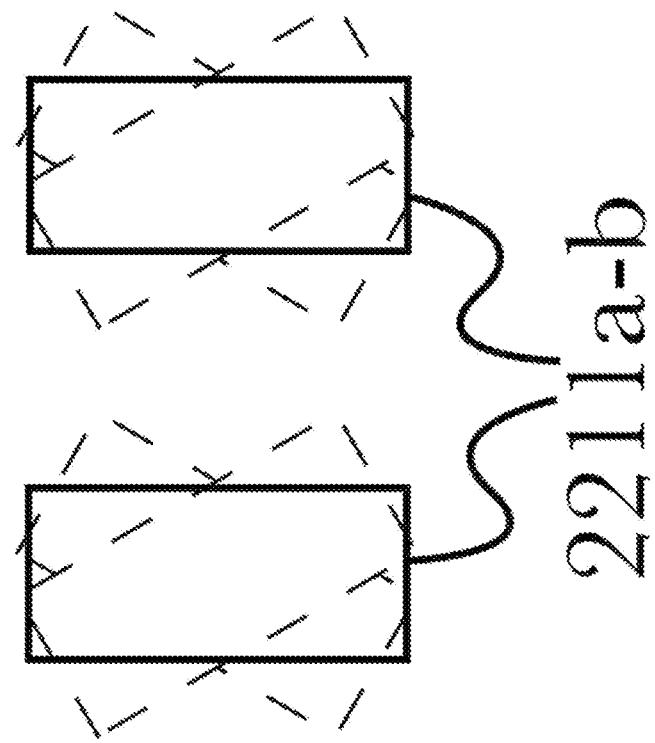
FIG. 24 is a diagram illustrating a top view of pivoting footsteps.

FIG. 24 is a diagram illustrating a top view of pivoting foot pedals 2211a-b. Foot pedals 2211a-b may be pivotable or otherwise movable, to provide additional degrees of motion for user adjustment, immersion, and feedback. For example, a user may continue to face in the same direction while rotating platform 2131 and foot pedals 2211a-b pivot, changing the angle of resistance as the user continues to step on pedals 2211a-b, such as to simulate walking up an inclined floor or staircase. Small movements of rotating platform 2131 and foot pedals 2211a-b may be used to simulate features such as rough or uneven terrain or small obstacles, or to provide feedback to the user such as to simulate an earthquake, the pitching deck of a ship, a moving floor, or other simulate stimuli.

Figure 25:
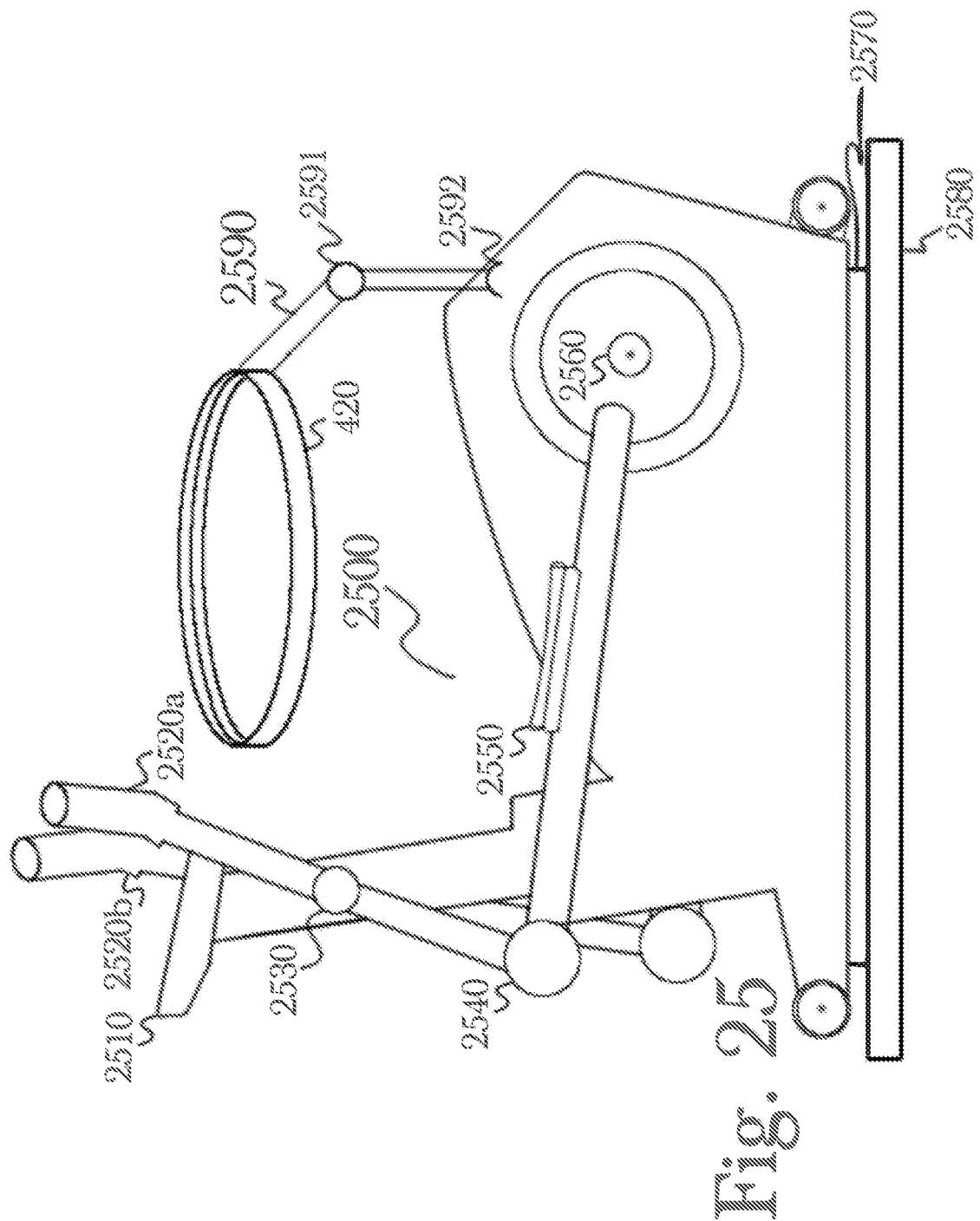
FIG. 25 is a diagram of an elliptical training machine, typically used for low-impact aerobic exercise, according to a preferred embodiment.

FIG. 25 is a diagram of an elliptical training machine 2500, typically used for low-impact aerobic exercise, according to a preferred embodiment. An elliptical exercise trainer exists which possesses a computer display 2510, which a user can utilize to alter resistance and exercise programming, or to see their speed and progress, during exercise. Exercising is accomplished for the lower and upper body areas with two handles 2520a-b, connected to a stationary joint 2530 and swinging joint 2540, which move as a user utilizes foot pedals 2550 to spin an elliptical-shaped motor 2560 for which the device is named. A motor 2560 may have machinery inside which works in tandem with a computer 2510 program which determines the amount of resistance it applies during use, or the resistance may be pre-set. A floating joint 2540 may move as foot pedals 2550 are used to spin a motor 2560, causing handles 2520a-b to move forward and back, with a fixed-position joint 2530 being the balance point for the movement, allowing for both upper and lower body workouts. Peripheral devices may be used with an elliptical exercise trainer 2500, including a belt-like harness 303 for motion detection, and a computer monitor 2510 may be connected to a computing device which is capable of running or communicating with virtual or enhanced reality software. Elliptical machine 2500 may further comprise a movable or pivotable base 2580, for example via a rotating platform 2570 or similar joint for allowing movement of the entire exercise machine 2500 while base 2580 remains stationary or fixed to the floor. This enables a user to continue using exercise machine 2500 while being able to adjust the orientation of the machine (for example, to gradually adjust to accommodate changes in lighting or other environmental features, or to move the machine manually to face toward or away from other items in the area such as a TV, speakers, or other users using other exercise equipment). This also provides a means for exercise machine 2500 to be moved during the use of virtual or mixed reality software applications, for example as a form of interaction or immersion by moving the user during a game or providing feedback in the form of small movements to simulate changes in a virtual environment. Attached to an elliptical training device 2500 is a human joystick component 2590, attached to an elliptical machine at a joint 2592, and with at least one other joint on an inflexible arm 2591, or the arm itself 2590 may be made of a flexible material. Attached to this apparatus is a belt-like harness 420 which may detect motion and location of a user, for increased accuracy and realism during a virtual or enhanced reality simulation.

Figure 26:
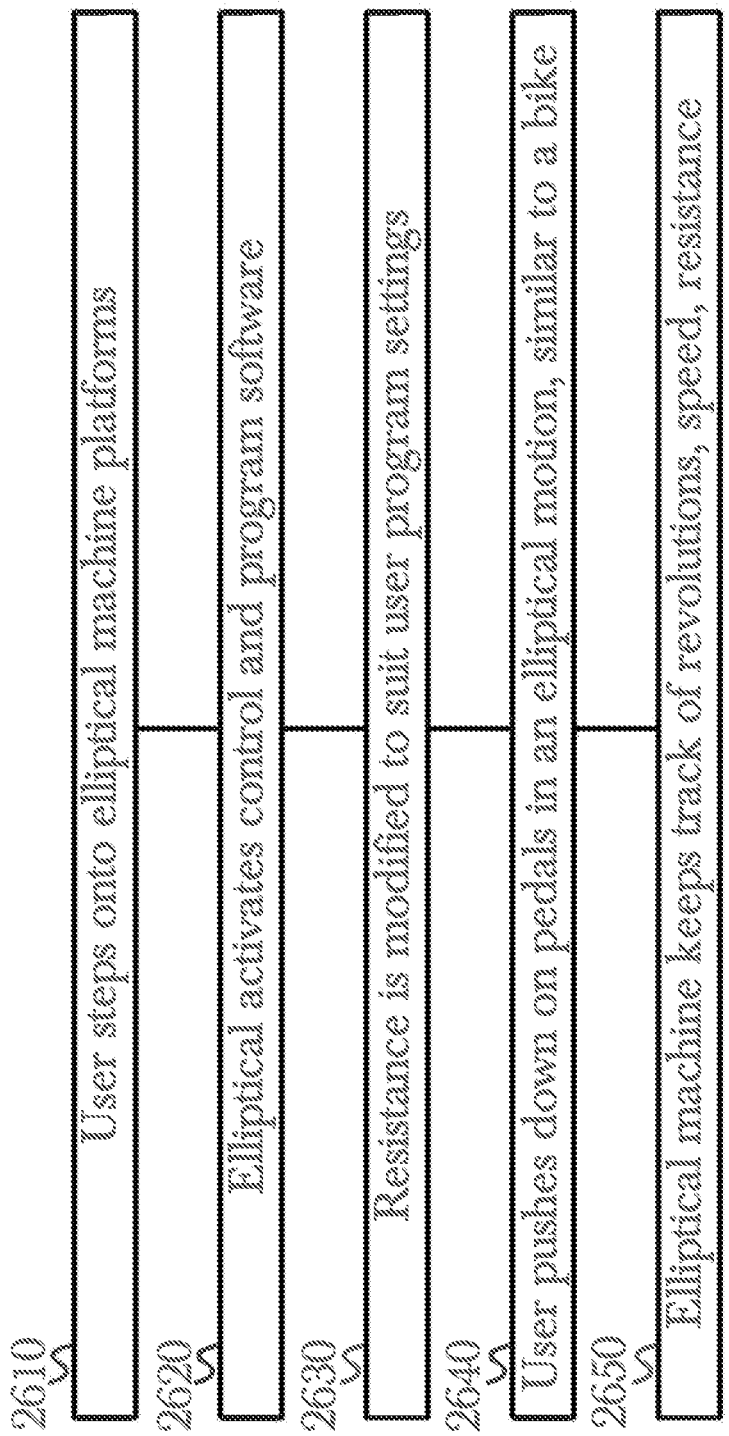
FIG. 26 is a method diagram of the process of an elliptical training machine being used for exercise, according to a preferred embodiment.

FIG. 26 is a method diagram of the process of an elliptical training machine being used for exercise, according to a preferred embodiment. First, a user must step onto an elliptical exercise trainer's foot pedals 2550, 2610, to begin use. A user may activate a computer display 2510 and associate programming, allowing for a variety of exercise routines and resistances to be used, and allowing for virtual or enhanced reality software to operate on the computer, allowing a user to engage with the controls of the device 2620. It is possible for such a display to communicate with a more powerful computer across a network, to run such enhanced reality software and associated simulations, or it may be possible to run it on a computer directly embedded in the elliptical exercise trainer itself. Motor 2560 resistance may be altered or dynamic, according to program settings 2630, however resistance during exercise may also be pre-set and unchanging. It is not required for resistance to change during or before exercise, and such resistance may be physically incapable of change in certain motor designs, depending on elliptical exercise trainer models. A user may push down on foot pedals 2550 in a similar motion to bike pedals 2640, but without sitting down typically, allowing for low-impact or no-impact aerobic exercise similar to running, also allowing them to use handles 2520a-b for upper body exercises as desired. Common elliptical exercise trainer computer 2510 capabilities include keeping track of revolutions per minute, comparable speed of an individual if they were running, the resistance the motor is set to (if applicable), and more 2650, sometimes also including a user's heart rate if they have heart rate sensors built into the trainer. This computer 2510 may also be able to execute virtual or enhanced reality software and simulations, or may communicate with a computer system across a network which is otherwise capable of performing such simulations, as necessary. Other diagrams and embodiments herein show enhanced reality systems and haptic feedback systems, and user tracking systems, which will be shown separate from an elliptical exercise trainer, but can obviously be utilized with an elliptical exercise trainer's computer or with a new computer embedded into an elliptical exercise trainer, as necessary, which would be obvious to any person with ordinary skill in the art.

Figure 27:
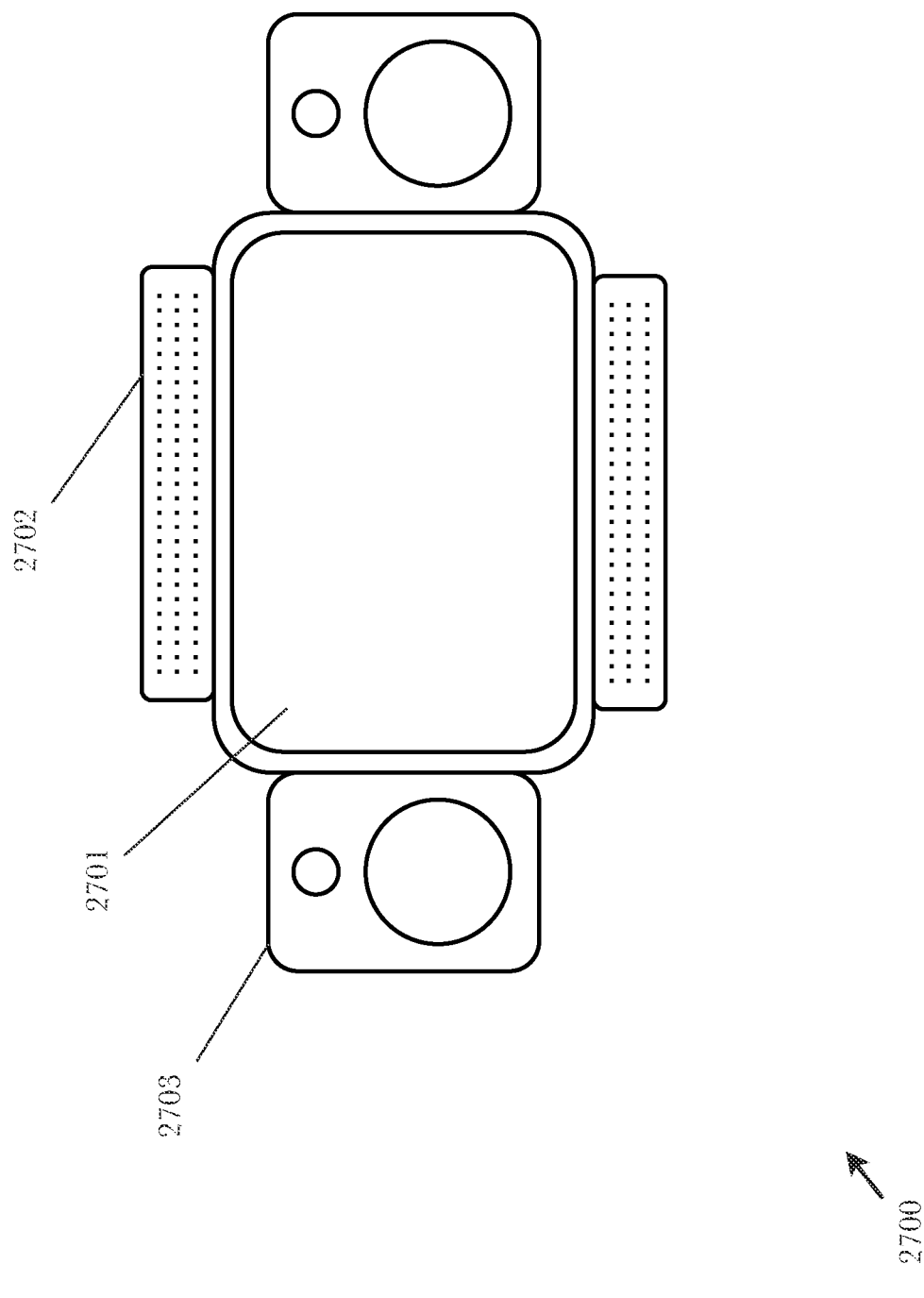
FIG. 27 is a diagram of an exemplary brainwave entrainment therapy device that can be attached to an exercise machine for targeted brainwave entrainment therapy with light and/or sound using dual-tasking methodologies.

FIG. 27 is a diagram of an exemplary brainwave entrainment therapy device that can be attached to an exercise machine for targeted brainwave entrainment therapy with light and/or sound using dual-tasking methodologies. In this embodiment, the brainwave entrainment therapy device comprises a screen 2701, one or more lights 2702, and one or more speakers or headphones 2703. The screen 2701 is used for display of activities designed to engage the user in one or more mental tasks associated with particular brain functionality. The lights 2702, shown here as light bars comprising multiple light-emitting diodes (LEDs) can be programmed to emit a visible stimulus (e.g., flashes, on/off cycles, etc.) at frequencies appropriate for brainwave entrainment. The speakers 2703 can be programmed to emit an audible stimulus (e.g., rectangular wave sound pulses, sine wave sound oscillations, etc.) at frequencies appropriate for brainwave entrainment. In some configurations, both light and sound may be used as stimuli. The stimuli need not be from the same source (e.g., two light sources each at 20 Hz could be synchronized to produce a 40 Hz stimulus) or from the same modality (e.g., a sound source at 15 Hz and a light source at 15 Hz could be synchronized to produce a 30 Hz stimulus)

The device of this embodiment is designed such that is can be mounted on an exercise machine (that may or may not be otherwise equipped for dual task stimulation purposes), whereby it can be used to provide dual task stimulation. The combination of the dual task stimulation with brainwave entrainment allows for stimulation of certain portions of the brain associated with certain neurological functions, and allows for targeted brainwave entrainment by enhancing and concentrating the effect of the brainwave entrainment on the stimulated areas of the brain. As one example, a person with memory loss may be provided dual task stimulation such as walking on a treadmill (physical task) while playing a memory-based card matching or tile matching game (associated mental activity). While the person is engaged in the dual task stimulation, brainwave entrainment is applied via the lights 2702 (or via the screen in some applications) and/or the speakers 2703. As the neurological functions in the brain associated with memory are being stimulated), the neurons in the brain associated with those functions are in an already-stimulated state, and the brainwave entrainment's stimulation of oscillations in the electrochemical state of neurons in those already-stimulated areas will have a more pronounced effect than on other areas of the brain. In this way, the already-stimulated areas of the brain will experience a greater reduction in degenerative conditions (i.e., reductions in amyloid plaques and tau phosphorylation) and greater increases in synaptic density.

Figure 28:
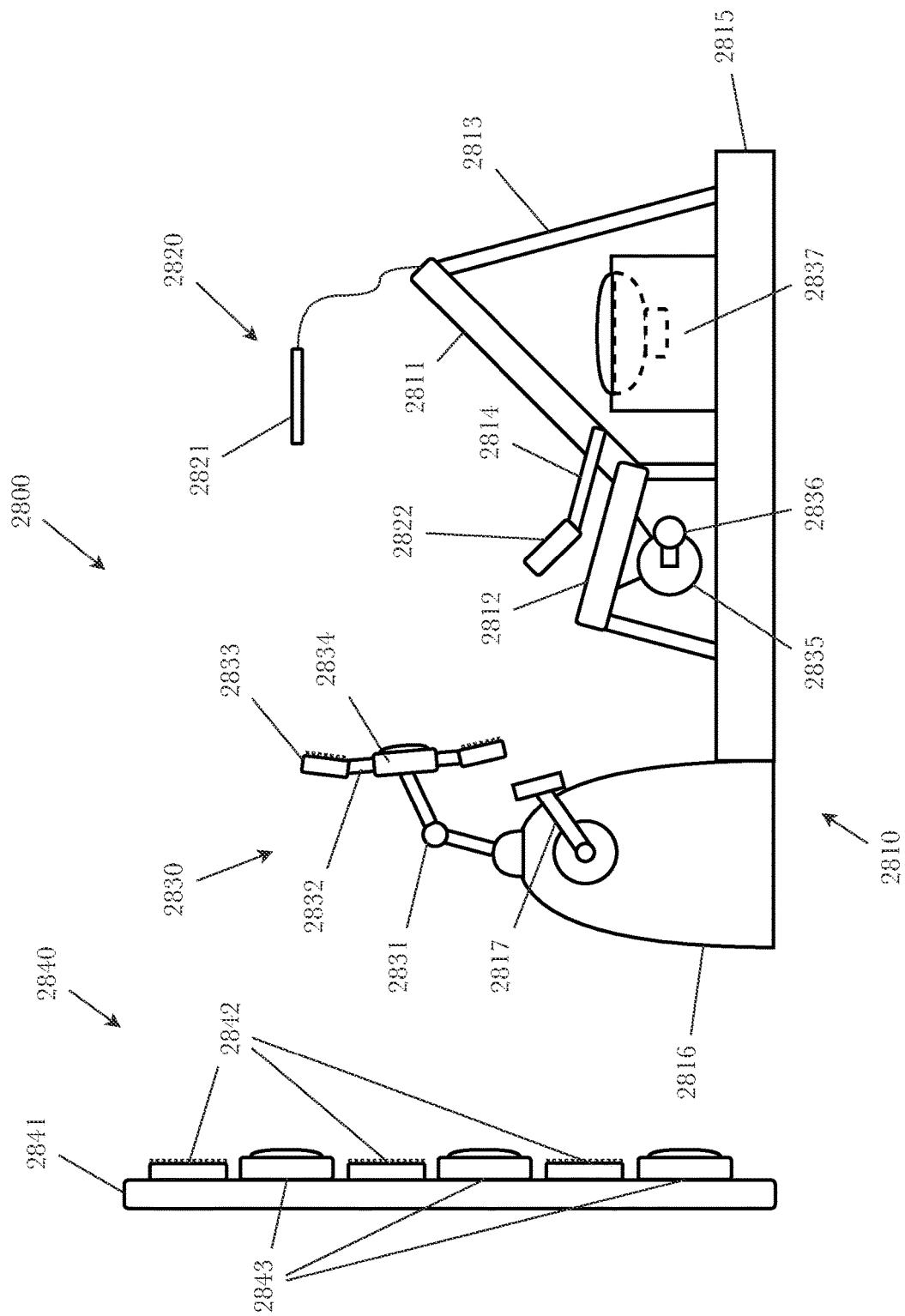
FIG. 28 is a diagram of an exemplary brainwave entrainment therapy system for targeted brainwave entrainment therapy that allows for multi-modal, multi-intensity treatment using dual-tasking methodologies.

FIG. 28 is a diagram of an exemplary brainwave entrainment therapy system for targeted brainwave entrainment therapy that allows for multi-modal, multi-intensity treatment using dual-tasking methodologies. The system 2800 of this embodiment comprises a stationary recumbent bicycle 2810, and three different scales of brainwave entrainment stimulators: localized and/or individual stimulation transducers 2820, small area stimulation transducers 2830, and large area stimulation transducers 2840.

The stationary recumbent bicycle 2810 comprises a base 2815, a chair back 2811, a seat 2812, arm rests 2814, a plurality of supports 2813 connecting the chair back 2811 and seat 2812 to the base 2815, a resistance mechanism 2816 allowing for resistance to a pedaling motion of the user, and a pedal system 2817 for the user to pedal in a cycling motion. The stationary recumbent bicycle 2810 thus provides the means for the user to engage in a physical task for dual task stimulation (and/or dual task assessment).

The localized and/or individual stimulation transducers 2820 of this embodiment are a headband 2821 with vibratory stimulation and hand grips 2822 which provide electrical stimulation. These provide localized stimulation which can only be perceived by the user, which also makes them individual stimulation transducers (as opposed to the other scales, which can be perceived by others, and which could be used to provide brainwave entrainment to more than one person using the same transducer(s)). The headband may produce simple vibratory (i.e., tactile) stimulation to the head, or may be configured to produce vibrations at certain locations on the head and at certain intensities so as to be perceptible by the middle and inner ear, which causes the stimulation to be both tactile and auditory in nature. This double stimulation (tactile and auditory) amplifies the effect of a single type of transducer, increasing the efficiency of brainwave entrainment from applications of that transducer.

The small area stimulation transducers 2830 of this embodiment are devices attached to the exercise machine 2810, but not directly attached to or in contact with the user. For example, a console comprising a screen 2832, light bars 2833, and speakers 2834 similar to that of the device of FIG. 27 may be used. The console may be attached to the exercise machine using an adjustable arm 2831 that allows for optimal positioning of the console for viewing and/or interaction by the user. Other small area stimulation transducers include a large electric motor 2835 with an offset weight 2836 attached to the seat 2812 that allows for full-body vibratory stimulation to be applied, and a subwoofer 2837 under the chair back 2811 that allows for both audible (regular sound) and inaudible (infrasound) stimulation to be applied. Small area stimulation transducers are particularly useful in situations where direct contact with a user is not desirable, or when multiple users will be using the device sequentially, or when brainwave entrainment will be applied to a small number of users (e.g., those directly in front of the stimulation transducers).

The large area stimulation transducers 2840 of this embodiment are devices that can be used over a large area and potentially a large number of persons such as a room or auditorium. In this embodiment, The large area stimulation transducers are large LED light bars 2842 and large speakers 2843 attached to a wall 2841 of the room in which the stimulation will be applied. The large area stimulators such as the LED light bars 2842 and large speakers 2843 on the wall 2841 can be used to fully immerse the user in intense brainwave entrainment with large areas of bright light and loud, booming sounds. The immersion and intensity can be enhanced, for example, by surrounding the user with large area stimulators on walls on all sides (and possibly ceilings and floors) covering the user's entire visual area, so that the user receives visual stimulation no matter in which direction the user looks an auditory stimulation no matter where the user is located. Higher immersion and intensity may provide greater beneficial effects from brainwave entrainment.

It is important to note that any type of transducer can be applied at any scale. For example, light stimulation can be configured such that it is seen only by one person (e.g., in glasses or goggles), or is seen by a small number of persons (e.g., a single LED light bar), or is seen by many people (e.g. room lights, stadium lights, etc.). Further, the intensity of stimulation can be largely varied separately from the scale of stimulation. However, depending on the circumstances and application, brainwave entrainment at certain scales and/or intensities may be more useful or effective than at others.

The different scales of stimulation transducers allow for a choice of the level of immersion the user experiences with respect to the brainwave entrainment, and to some degree, the level of intensity of the brainwave entrainment. Immersion is the quality of being surrounded by or absorbed in an experience. Intensity is the magnitude of the experience. They are separate qualities (e.g., a localized electric stimulation can be intense, but not immersive), but there can be an increase in intensity with an increase in scale (for example, if light stimulation comes from all directions, it will tend to be both more immersive and more intense, although the intensity of the lights can be reduced to offset this tendency). For example, a localized, subtle electrical stimulation through electrically-conducting hand grips 2822 provides minimal immersion of the user in the brainwave entrainment. This may be useful, for example, where intense concentration on the dual task stimulation is necessary. Small area stimulation transducers such as the LED light bars 2833 on the screen console are useful for mid-level immersion and mid-level intensity of brainwave entrainment. The LED light bars 2833 cover a small, but significant, area of the user's view, and the speakers 2834 are large enough to provide a substantial auditory stimulus. The large area stimulators such as the LED light bars 2842 and large speakers 2843 on the wall 2841 can be used to fully immerse the user in intense brainwave entrainment with large areas of bright light and loud, booming sounds. The immersion and intensity can be enhanced, for example, by surrounding the user with large area stimulators on walls on all sides (and possibly ceilings and floors) covering the user's entire visual area, so that the user receives visual stimulation no matter in which direction the user looks an auditory stimulation no matter where the user is located. Higher immersion and intensity may provide greater beneficial effects from brainwave entrainment.

Further, it is important to note that the modalities (types of stimulation), scales, and intensities allows for tremendous flexibility in selecting suitable therapies regimens for different situations. For high-immersion scenarios (e.g., maximum brainwave entrainment with fewer cognitive demands such as listening to music), multiple modalities, scales, and intensities may be used at the same time. For example, while a user is listening to classical music, localized electrical stimulation may be applied to the wrist, small area visual stimulation may be applied using a single LED light bar, and large area tactile stimulation may be applied using subwoofers which produce sounds (infrasounds) which are inaudible to the human ear but can be perceived through the sense of touch (e.g., as oscillating pressure on the torso).

Further, modalities can be chosen to either amplify certain tasks or activities or to supplement them. For amplification, treatment modalities are chosen to include those corresponding to a given task or activity in dual task stimulation. As an example, if a dual task stimulation activity assigned to a user is listening to music, a 40 Hz auditory signal can be used as gamma entrainment therapy. As the user is already focused on listening, the user is focusing more intensely on auditory activities (and the brain areas and functions associated with auditory activities are stimulated), enhancing the effect of the auditory gamma entrainment modality. For supplementation, treatment modalities are chosen to exclude those corresponding to a given task or activity in dual task stimulation. As an example, if a dual task stimulation activity assigned to a user is listening to specific songbirds for the purpose of identifying or counting them, adding a 40 Hz auditory signal may interfere with the listening process, thus either disrupting the dual task stimulation or causing the gamma entrainment to be ineffective. In such circumstances, a non-conflicting modality may be chosen such as light therapy or vibratory therapy.

Figure 29:
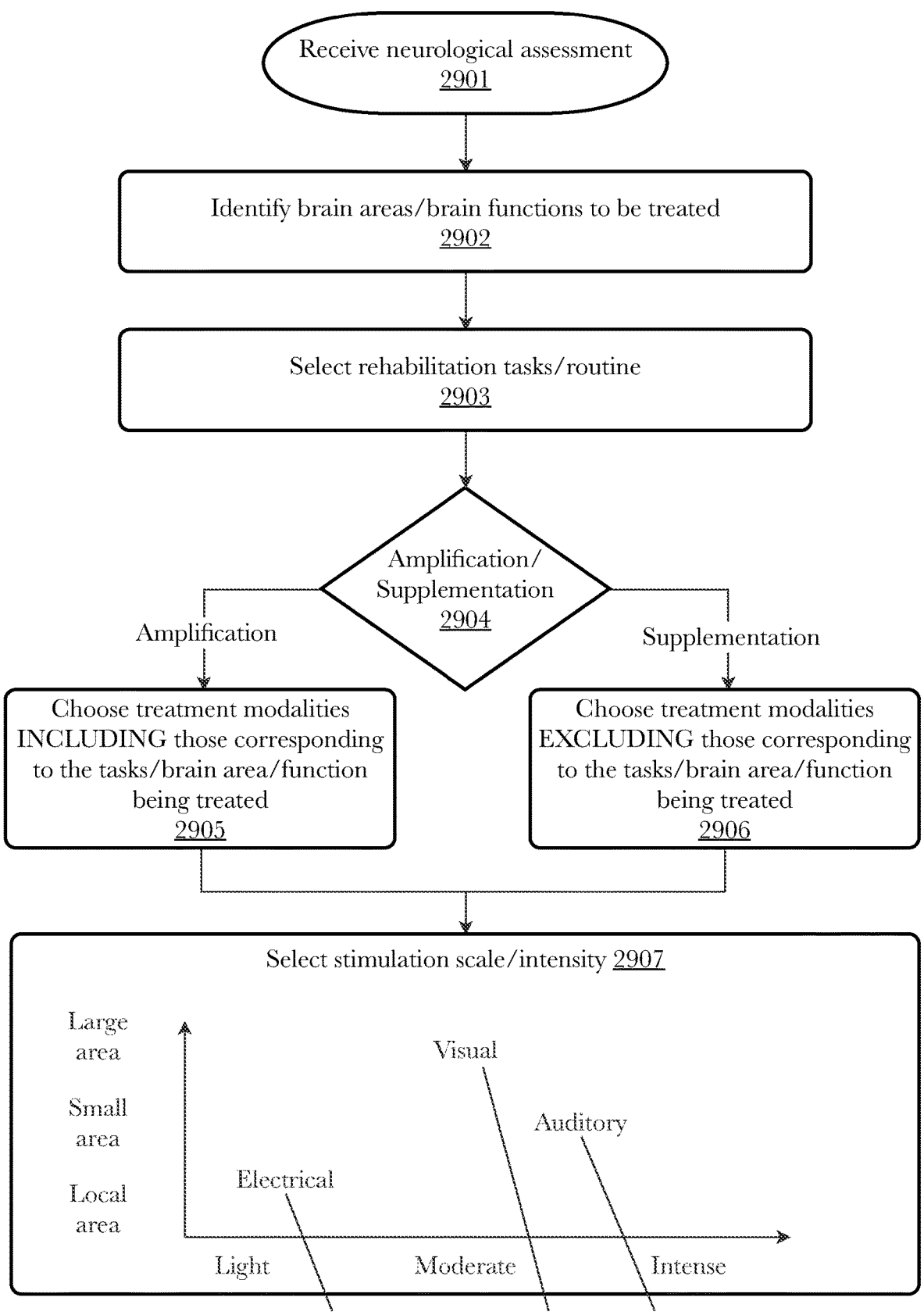
FIG. 29 is a flow diagram showing an algorithm for selection of modalities and routines for targeted brainwave entrainment therapy using dual-tasking methodologies.

FIG. 29 is a flow diagram showing an algorithm for selection of modalities and routines for targeted brainwave entrainment therapy using dual-tasking methodologies. As a first step, a neurological assessment is received 2901, comprising an evaluation of neurological function of at least one aspect of an individual. The neurological assessment may be in any number of different forms. One possible form is a report of a physician or other health professional identifying a deficiency in neurological function such as a cognitive or motor-physical decline associated with neurological disease or degradation. Another possible form is a report from a coach or other sports professional recommending an improvement in some area of training or physical performance. Another possible form is the results of a dual task assessment. After the neurological assessment is received, the areas of the brain or neurological functions to be treated are identified 2902. Where the neurological assessment is a dual task assessment or obvious neurological deficiency (i.e., disease or degradation), the deficient neurological functions will be known and brain areas associated with those neurological functions may also be known. Where the neurological assessment is a training or physical performance improvement recommendation, a neurological function may be selected which is believed to be associated in some form with that recommended improvement.

A treatment regimen is then created by selecting appropriate dual task stimulation to stimulate the areas of the brain to be treated 2903, selecting amplification or supplementation 2904 as appropriate for the dual task stimulation, choosing appropriate treatment modalities (e.g., light therapy, sound therapy, vibrational therapy, electrical therapy, or combinations of such modalities) either for amplification 2905 (treatments including those corresponding to the tasks, activities, or neurological function) or for supplementation 2906 (treatments including those corresponding to the tasks, activities, or neurological function), and selecting a stimulation scale and intensity 2907 for each modality appropriate for the treatment goals. In this example, three modalities are shown with different scales and intensities, localized electrical stimulation at a light intensity 2907a, large area visual stimulation at a moderate intensity 2907b, and small area auditory stimulation at a moderately intense intensity 2907c. Brainwave entrainment is then applied using the chosen regimen, providing targeted treatment of particular areas of the brain and/or particular neurological functions via stimulation of those areas or functions using dual task stimulation.

Figure 30:
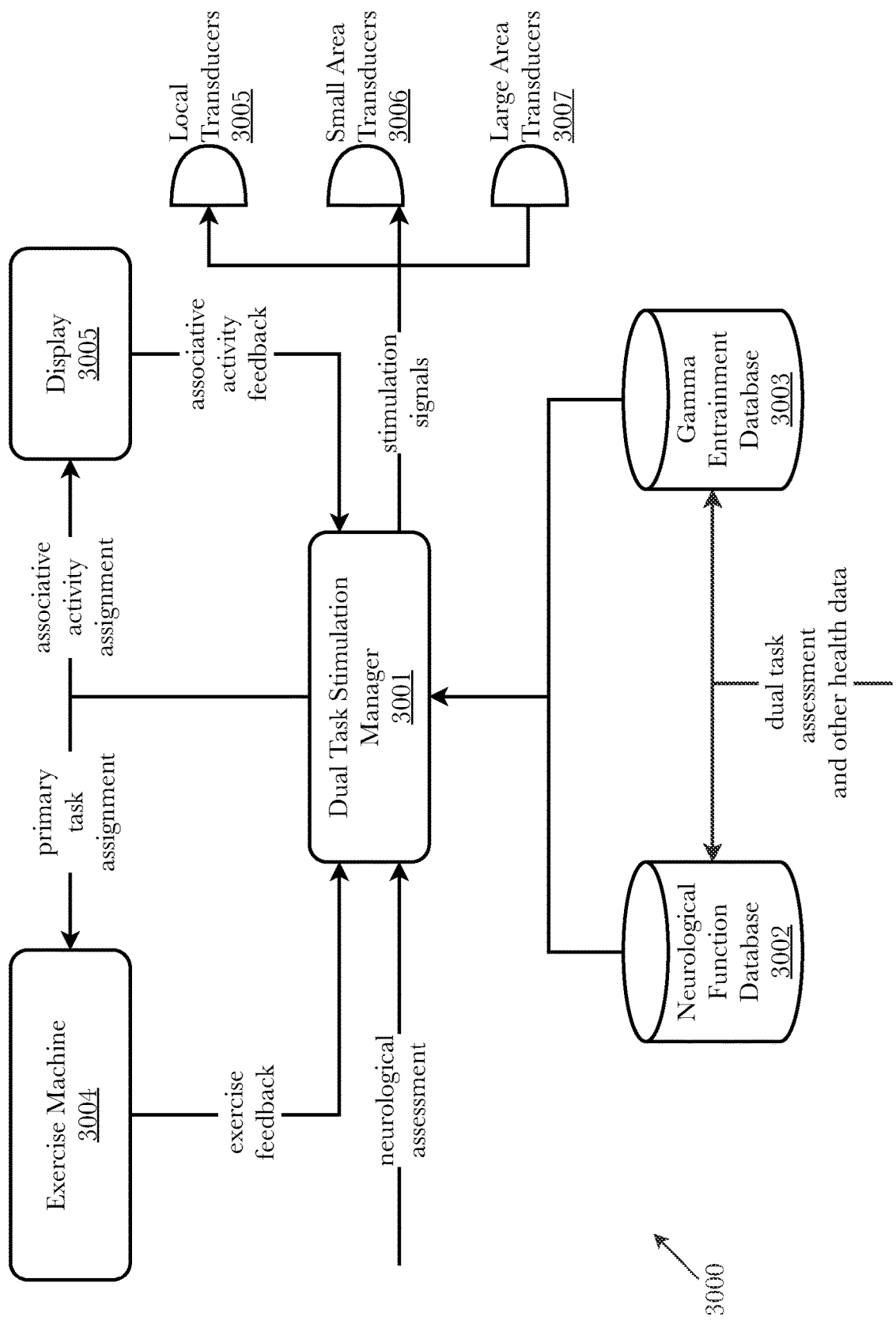
FIG. 30 is a diagram showing an exemplary system architecture diagram for targeted brainwave entrainment therapy using dual-tasking methodologies.

FIG. 30 is a diagram showing an exemplary system architecture diagram for targeted brainwave entrainment therapy using dual-tasking methodologies. In this embodiment, the system architecture 3000 comprises a dual task stimulation manager 3001, a neurological function database, a brainwave entrainment database, an exercise machine 3004, and three scales of transducers, localized stimulation transducers 3005, small area stimulation transducers 3006 and large area stimulation transducers 3007.

The dual task stimulation manager 3001 is responsible for receiving neurological assessments, each comprising a neurological condition to be treated, and creating therapy regimens to treat the neurological condition. The neurological assessment may be in any number of different forms. One possible form is a report of a physician or other health professional identifying a deficiency in neurological function such as a cognitive or motor-physical decline associated with neurological disease or degradation. Another possible form is a report from a coach or other sports professional recommending an improvement in some area of training or physical performance. Another possible form is the results of a dual task assessment. It is important to note that a neurological assessment does not necessarily mean an assessment of a deficiency. It may note normal function, but indicate a neurological condition for improvement. The dual task manager 3001 creates a therapy regimen based on the neurological condition by consulting the neurological database 3002 and the brainwave entrainment database.

The neurological database 3002 is a database containing information that associates neurological conditions with primary tasks and associative activities (i.e., dual tasking tasks and their associated activities). This database may be developed from pre-existing information or may be built up over time from dual task assessments. The brainwave entrainment database 3003 is a database of information about brainwave entrainment therapies (i.e., modalities, immersion, intensity, and stimulation frequencies) tending to be more or less effective under certain conditions and in certain situations, including conditions and situations associated with dual task stimulation. The brainwave entrainment database may likewise be developed from pre-existing information or may be built up over time from dual task assessments. Importantly, both the neurological database 3002 and the brainwave entrainment database may store neurological assessment data for particular individuals over time, and use the results of the neurological assessments of each such individual to create therapy regimens for that individual. This provides concrete information about the effectiveness of created therapy regimens on a given individual, and allows for future therapy regimens to be adjusted to meet the needs of that individual.

Once a therapy regimen is created, the dual task stimulation manager assigns dual task stimulation to the individual undergoing treatment comprising a primary task and an associative task. In this case the primary task involves exercise on an exercise machine 3004, and the associative task involves solving puzzles on a display 3005. The exercise machine provides feedback to the dual task stimulation manager 3001 as to whether the primary task is being performed, and the display provides feedback as to whether the associative activity is being performed. While the dual task stimulation is being performed, the dual task stimulation manager sends signals to the appropriate transducers 3005-3007 to operate them according to the appropriate stimulation frequency.

Figure 31:
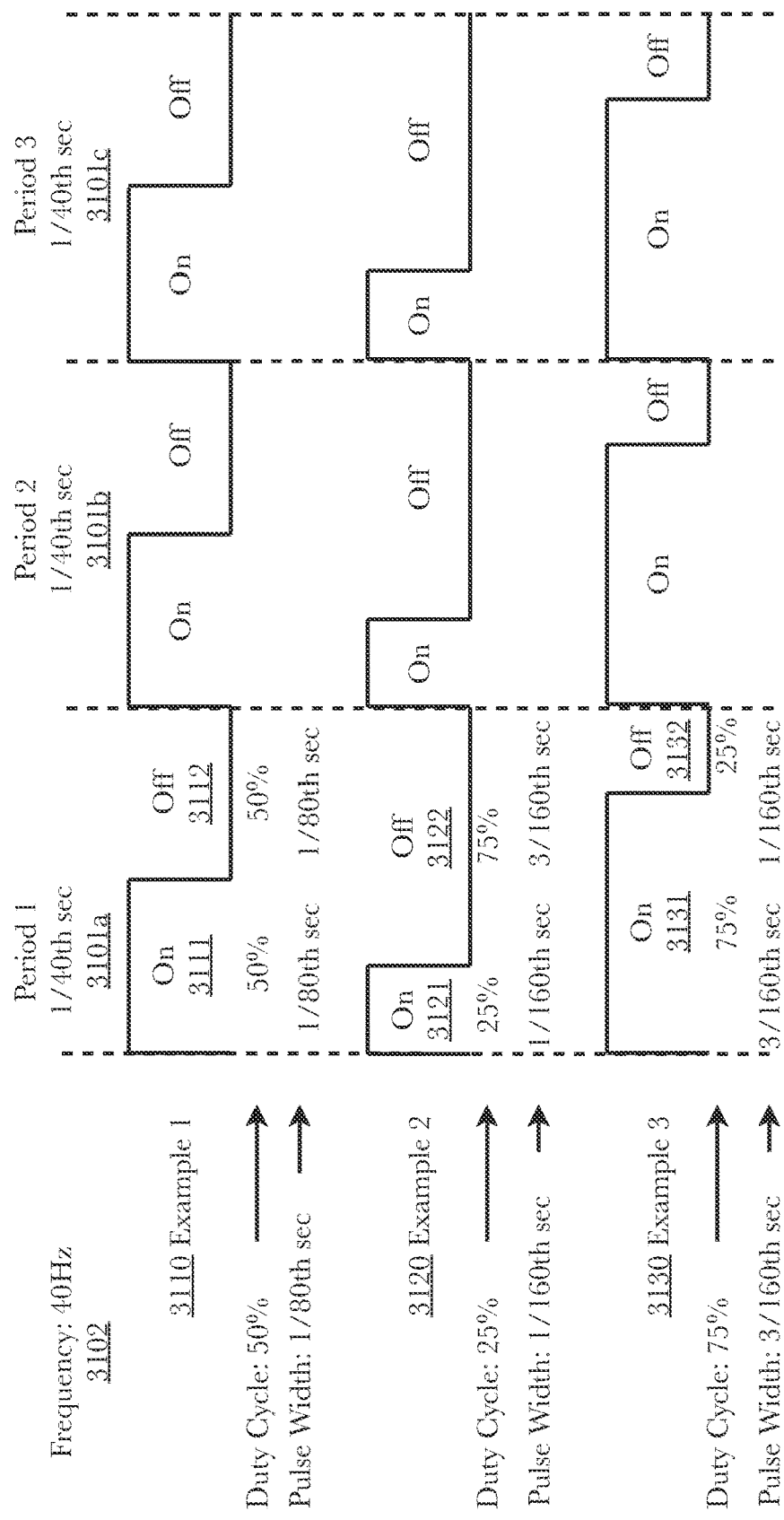
FIG. 31 is a diagram showing explaining the use of duty cycles and pulse width modulations in applying brainwave entrainment.

FIG. 31 is a diagram showing explaining the use of duty cycles and pulse width modulations in applying brainwave entrainment. Here, three examples 3110, 3120, and 3130 of duty cycles/pulse width modulation are shown. The frequency of stimulation 3102 in all three examples is 40 Hz (40 cycles per second), and the wave form of each example is a rectangular wave (i.e., instantaneous or near-instantaneous changes between on and off states). Three periods 3101a-c of the stimulation at the 40 Hz frequency 3102 are shown, each period corresponding to one full on/off cycle lasting $1/40^{th}$ of one second. In Example 1 3110, a duty cycle of 50% is shown in which the stimulation is in an on state 3111 for 50% of the period and in an off state 3112 for 50% of the period. For a 40 Hz frequency as shown here, this corresponds to a pulse width of $1/80^{th}$ of a second, wherein the stimulation is in an on state 3111 for $1/80^{th}$ of a second and in an off state 3112 for $1/80^{th}$ of a second. In Example 2 3120, a duty cycle of 25% is shown in which the stimulation is in an on state 3121 for 25% of the period and in an off state 3122 for 75% of the period. For a 40 Hz frequency as shown here, this corresponds to a pulse width of $1/160^{th}$ of a second, wherein the stimulation is in an on state 3121 for $1/160^{th}$ of a second and in an off state 3122 for $3/160^{th}$ of a second. In Example 3 3130, a duty cycle of 75% is shown in which the stimulation is in an on state 3131 for 75% of the period and in an off state 3132 for 25% of the period. For a 40 Hz frequency as shown here, this corresponds to a pulse width of $3/160^{th}$ of a second, wherein the stimulation is in an on state 3131 for $3/160^{th}$ of a second and in an off state 3132 for $1/160^{th}$ of a second.

Figure 32:
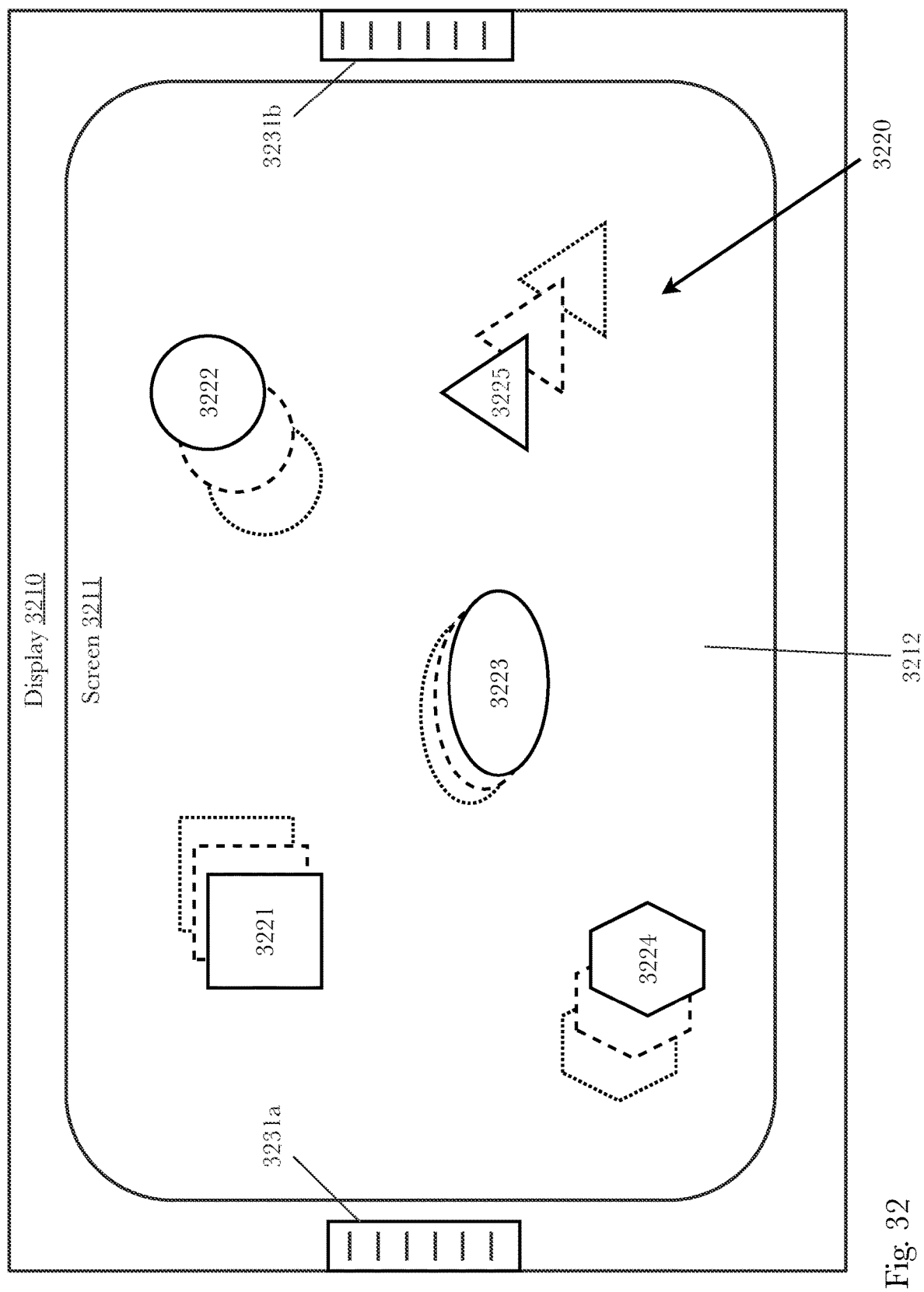
FIG. 32 is a diagram showing an embodiment in which on-screen elements of a display are used to apply brainwave entrainment.

FIG. 32 is a diagram showing an embodiment in which on-screen elements of a display are used to apply brainwave entrainment. In this example, brainwave entrainment is implemented using a display 3210, such as a television computer monitor, or tablet-based device, comprising a screen 3211 and in some configurations, built in speakers 3231a,b. In this embodiment, the screen is used to provide visual brainwave entrainment, either by flashing the background of the screen 3212 or one or more on-screen elements 3220. This embodiment enables the provision of brainwave entrainment without the use of (or in addition to) external devices such as lights and speakers. In this example, five on-screen elements are shown 3221-3225, each comprising a different shape and each moving independently on the screen 3211 as indicated by the dashed and dotted "movement shadows" associated with each on-screen element. The on-screen elements 3280 are generic shapes in this diagram, but may represent any type of on-screen element whether static or movable, permanent or transient. Depending on the configuration, the on-screen element may be any shape or color displayable on a screen, such as game elements, puzzle elements, background elements, regular or irregular portions of the screen. Many possible applications of this embodiment are possible. The built-in speakers, if any, may be used to provide auditory brainwave entrainment in addition to the visual on-screen brainwave entrainment.

For example, when paired with a camera and eye-tracking software, the on-screen elements might represent an eye muscle strengthening exercise combined with brainwave entrainment, wherein the user is asked to find a target on-screen element with a particular shape and follow the shape with his or her eyes. At the same time the target element may flash a particular color at a selected brainwave entrainment frequency, with the color changing as the user's eyes either follow the target on-screen element or stray from it. The target on-screen element may, for example, be a pleasant light-blue color while the user's eyes are following it, and change to a bright red to re-attract the user if the user's eyes start following a different on-screen element.

In another use case, the on-screen elements 3220 may represent a puzzle or game, and the brainwave entrainment may be provided by simply flashing the screen background 3212 at a selected brainwave entrainment frequency.

While not shown here, this example may be extended to virtual reality applications, wherein brainwave entrainment is provided by flashing in-game elements within the virtual reality environment.

Figure 33:
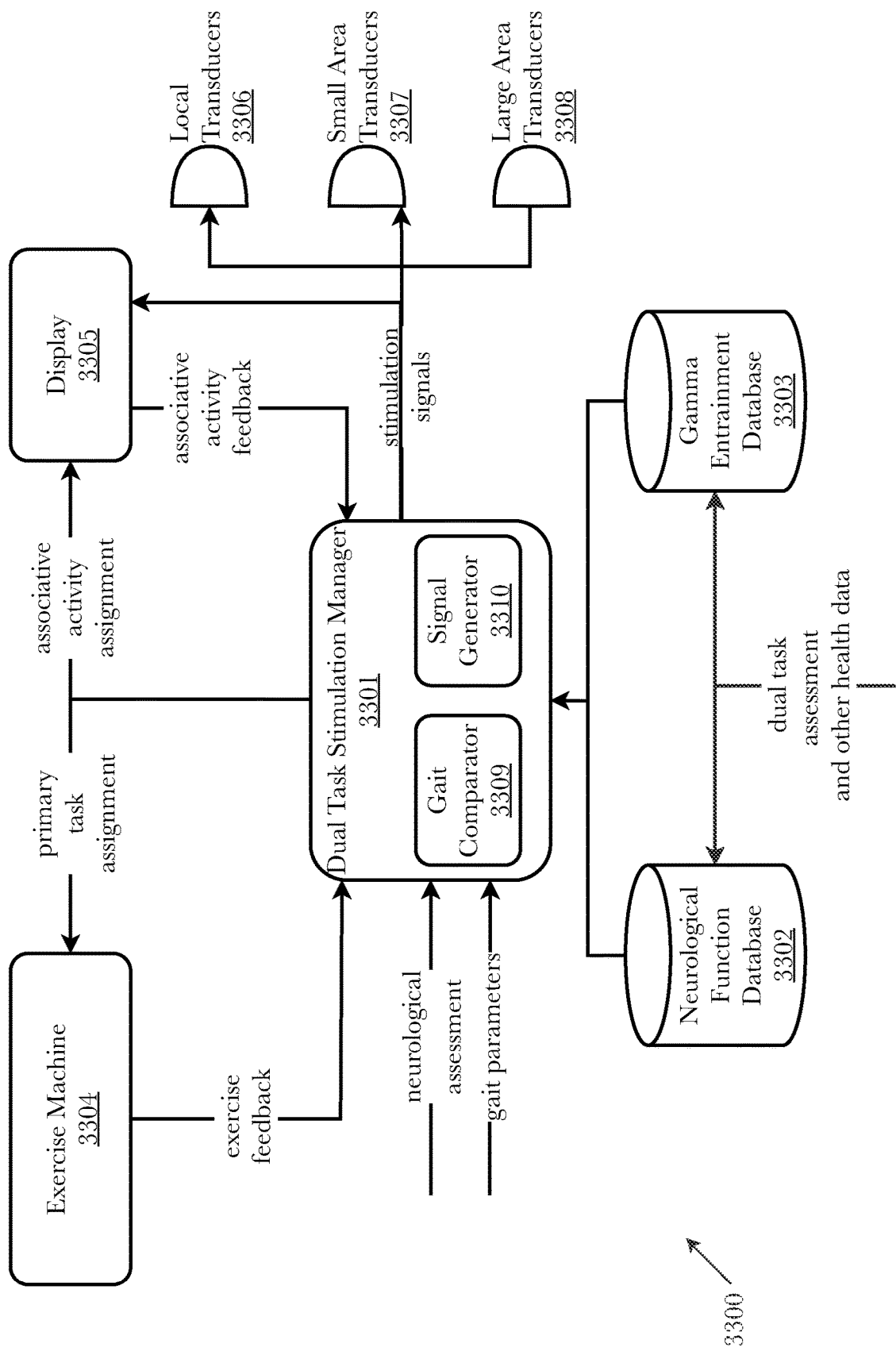
FIG. 33 is a diagram showing an exemplary system architecture diagram for targeted brainwave entrainment therapy with passive treatment of neurodegenerative conditions using dual-tasking methodologies.

FIG. 33 is a diagram showing an exemplary system architecture diagram for targeted brainwave entrainment therapy with passive treatment of neurodegenerative conditions using dual-tasking methodologies. In this embodiment, the system architecture 3300 comprises a dual task stimulation manager 3301, a neurological function database, a brainwave entrainment database, an exercise machine 3304, and three scales of transducers, localized stimulation transducers 3306, small area stimulation transducers 3307 and large area stimulation transducers 3308.

The dual task stimulation manager 3301 is responsible for receiving neurological assessments, each comprising a neurological condition to be treated, and creating therapy regimens to treat the neurological condition. The neurological assessment may be in any number of different forms. One possible form is a report of a physician or other health professional identifying a deficiency in neurological function such as a cognitive or motor-physical decline associated with neurological disease or degradation. Another possible form is a report from a coach or other sports professional recommending an improvement in some area of training or physical performance. Another possible form is the results of a dual task assessment. It is important to note that a neurological assessment does not necessarily mean an assessment of a deficiency. It may note normal function, but indicate a neurological condition for improvement. The dual task manager 3301 creates a therapy regimen based on the neurological condition by consulting the neurological database 3302 and the brainwave entrainment database.

Gait impairment is common in neurodegenerative disorders and conditions. Specifically, gait variability, the stride-to-stride fluctuations in distance and time, has been associated with neurodegeneration and cognitive impairment. Some examples of neurodegenerative disorders that may be associated with an impaired gait include Parkinson disease, mild cognitive impairment, Alzheimer's disease, dementia, Lewy body dementia, and frontotemporal dementia. The systems and methods disclosed within this specification may be well suited for providing gait detection and comparison detected gaits against a database of historical gait data related to the gaits of individuals who are known to be afflicted by a neurodegenerative conditions. Historical gait information may be stored in neurological function database 3302 and received, retrieved, or otherwise obtained by dual task stimulation manager 3301 in order to determine if an individual demonstrates signs of an onset degenerative condition. Historical gait information may include gait patterns, characteristics, or measurements, or each of these, and their associated degenerative condition. Furthermore, passive treatments associated with a degenerative condition may be stored in neurological function database 3302.

There is a wealth of supporting evidence that suggests that stimulating regions of the brain of individuals who have a neurodegenerative condition with a stimulus operating at a frequency between 30 Hz and 50 Hz (preferably 40 Hz) can induce gamma oscillations in the brain which can lead to a reduction of the effects of neurodegenerative disorders. System 3300 may be configured to assign a passive treatment to provide a stimulus operating at or near the 40 Hz frequency based on the comparison of received gait parameters and the associated neurodegenerative condition, if any. The treatment is considered passive because unlike the primary task (e.g., riding an exercise bike) and associative activity task (e.g., solving a puzzle), which both involve active participation from an individual, the individual can undergo the passive treatment without active participation. For example, passive treatment may comprise activating a transducer (e.g., light source, such as light emitting diode) at a frequency between 30 Hz and 50 Hz. As another example, the transducer may be a speaker which outputs a sound within a given frequency range. As yet another example, passive treatment may be implemented on a display 3305 which utilizes both a light source and speakers to emit both light and sound signals, respectively, simultaneously, or with each stimulus occurring individually. In this way, system 3300 can provide passive treatment separate from, or in conjunction with dual task entrainment therapy.

According to some embodiments, dual task stimulation manager 3301 may further comprise a gait comparator 3309 and a signal generator 3310. Gait comparator 3309 may receive, retrieve, or otherwise obtain gait parameter data related to an individual and compare the gait parameters with historical gait data stored in neurological function database 3302. Gait parameters may calculated based on an individual's interaction with an exercise machine 3303 while wearing a torso tracking and feedback belt as described above (referring to FIG. 4 and FIG. 7). The exercise machine 3303 may be the exercise machine described in FIG. 4 of U.S. patent application Ser. No. 16/951,281 which is included herein by reference, which leverages a plurality of sensors built into, or configured to interact with the exercise machine in order to gather a plurality of data that can be used as an input to determine an individual's gait and/or gait parameters. Additionally, the plurality of sensors built into the torso tracking and feedback belt may be used as another input to calculate an individual's gait and/or gait parameters. Calculation of an individual's gait and/or gait parameters may be conducted by analyzing the sensor data in a manner similar to that described in cross referenced applications (referring to FIG. 6 of U.S. patent application Ser. No. 16/951,281) to determine gait variability.

According to some embodiments, signal generator 3310 may allow for configuration of a passive treatment by generating a signal based on a plurality of treatment parameters. In some embodiments, signal generator 3310 may receive, retrieve, or otherwise obtain information about brainwave entrainment therapies and passive treatments and then configure signal generator 3310 to generate a signal based on the passive treatment information. In some embodiments, signal generator 3310 may be manually configured, such as, for example, by a doctor, trainer, or physical therapist, in real-time in order to adjust the passive treatment to the needs of the individual undergoing the treatment and/or therapy regimen. Signal parameters that may be configured include, but is not limited to, amplitude, frequency, phase, magnitude, duration, shape, polarization, period, modulation, level, and irradiance. Furthermore, signal components related to light signals (e.g., blinking light) may include, but are not limited to, wavelength range, color temperature, color, luminous intensity, and irradiance. For example, producing a light signal with a frequency of 40 Hz and a blue color may be used as passive treatment for dementia or other neurodegenerative conditions. Signal generator 3310 may receive a signal configuration and send the signal to a plurality of emitters such as transducers 3306-3308 and/or display 3305.

The neurological database 3302 is a database containing information that associates neurological conditions with primary tasks and associative activities (i.e., dual tasking tasks and their associated activities). This database may be developed from pre-existing information or may be built up over time from dual task assessments. The brainwave entrainment database 3303 is a database of information about brainwave entrainment therapies and passive treatments (i.e., modalities, immersion, intensity, and stimulation frequencies) tending to be more or less effective under certain conditions and in certain situations, including conditions and situations associated with dual task stimulation. The brainwave entrainment database may likewise be developed from pre-existing information or may be built up over time from dual task assessments. Importantly, both the neurological database 3302 and the brainwave entrainment database 3303 may store neurological assessment data for particular individuals over time, and use the results of the neurological assessments of each such individual to create therapy regimens for that individual. This provides concrete information about the effectiveness of created therapy regimens on a given individual, and allows for future therapy regimens to be adjusted to meet the needs of that individual. For example, an individual's gait parameters may be tracked over time to monitor and assess the efficacy of the therapy regimens and passive treatments.

Once a therapy regimen is created, the dual task stimulation manager assigns dual task stimulation, including passive treatment, to the individual undergoing treatment comprising a primary task and an associative task. In this case the primary task involves exercise on an exercise machine 3304, and the associative task involves solving puzzles on a display 3305. The exercise machine provides feedback to the dual task stimulation manager 3301 as to whether the primary task is being performed, and the display provides feedback as to whether the associative activity is being performed. While the dual task stimulation is being performed, the dual task stimulation manager sends signals to the appropriate transducers 3306-3308 to operate them according to the appropriate stimulation frequency.

Figure 34:
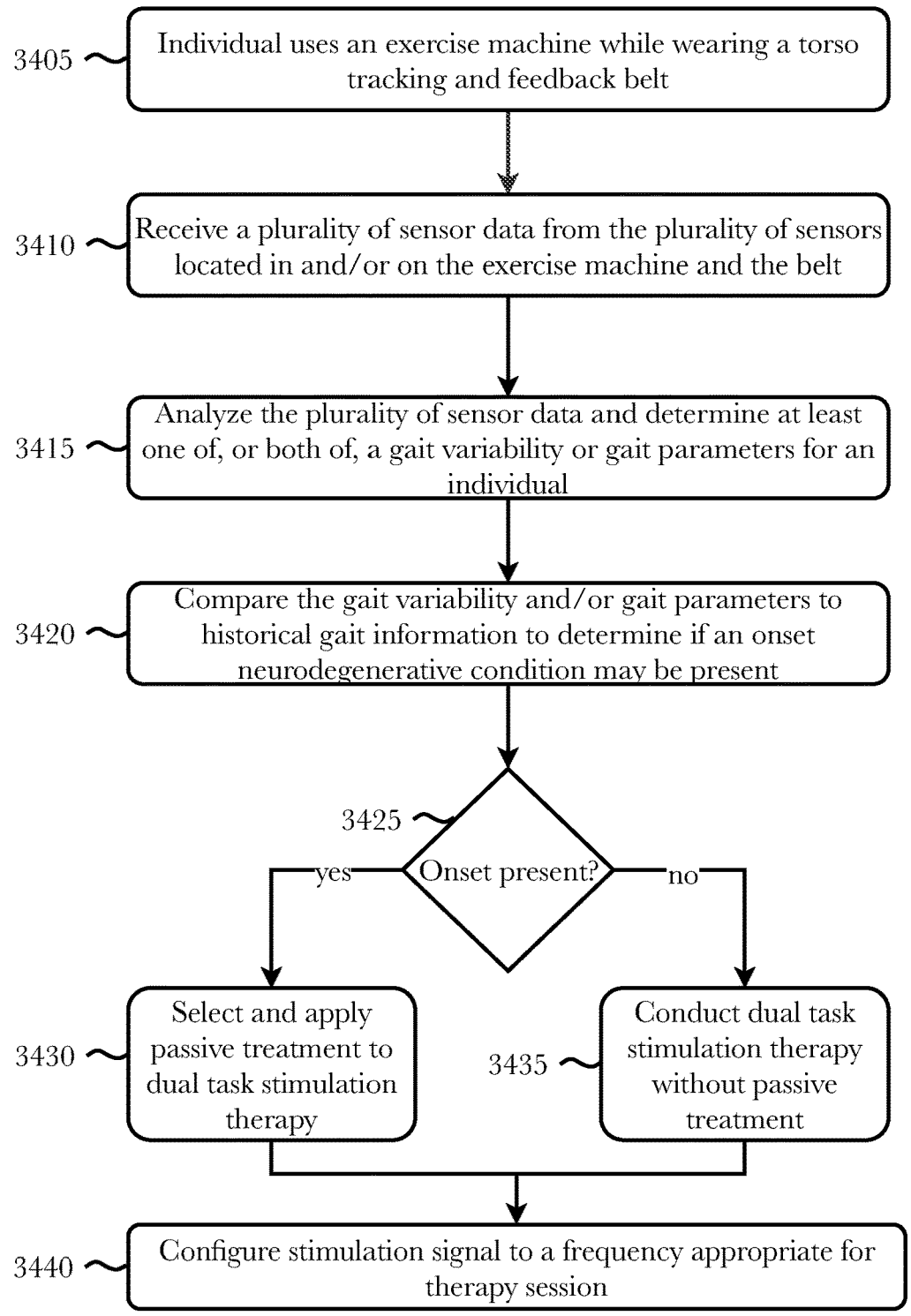
FIG. 34 is a flow diagram illustrating an exemplary method for determining passive treatment based on the analysis of an individual's gait parameters, according to some embodiments.

FIG. 34 is a flow diagram illustrating an exemplary method 3400 for determining passive treatment based on the analysis of an individual's gait parameters, according to some embodiments. According to some embodiments, the process begins 3405 when an individual use an exercise machine while wearing a torso tracking and feedback belt. The exercise machine and the torso tracking and feedback belt may comprise a plurality of sensors that provide multiple data points for the calculation and/or determination of an individual's gait, or the parameters and/or characteristics which describe an individual's gait. The plurality of sensor data from the plurality of sensors located in and/or on the exercise machine and the torso tracking and feedback belt is then received by a computing device 3410 which is configured 3415 to analyze the plurality of sensor and determine at least one or, or both of, a gait variability or gait parameters for the individual. The determined gait parameters may then be received, retrieved, or otherwise obtained by dual task stimulation manager 3301 or one of its components such as gait comparator 3309, and 3420 compared to historical gait information stored within neurological function database 3302 to determine if an onset neurodegenerative condition may be present in the individual. If the comparison of the individual's gait parameters with the historical gait data indicates that a neurodegenerative condition may be onset 3425, then a passive treatment may be selected from neurological function database 3302 applied to a dual task stimulation therapy session 3430 in order to provide passive treatment in conjunction with the primary task and associate activity. The passive treatment may be linked with known neurodegenerative conditions stored in database 3302. If instead, the comparison of the individual's gait indicates that a neurodegenerative condition may not be onset 3425, then no passive treatment is necessary and the dual task stimulation therapy may be conducted without the inclusion of passive treatment 3435. As a last step, 3440 the stimulation signal characteristics may be configured to be appropriate for the therapy session. For example, passive treatment may require that output signals to certain transducers, or a certain display, are at a certain frequency between 30 Hz and 50 Hz (preferably about 40 Hz) in the case of visual (e.g., blinking light) and/or audible stimulation. Furthermore, visual stimulation signal may be further configured to emit a certain spectral light color or wavelength, according to some embodiments.

Figure 35:
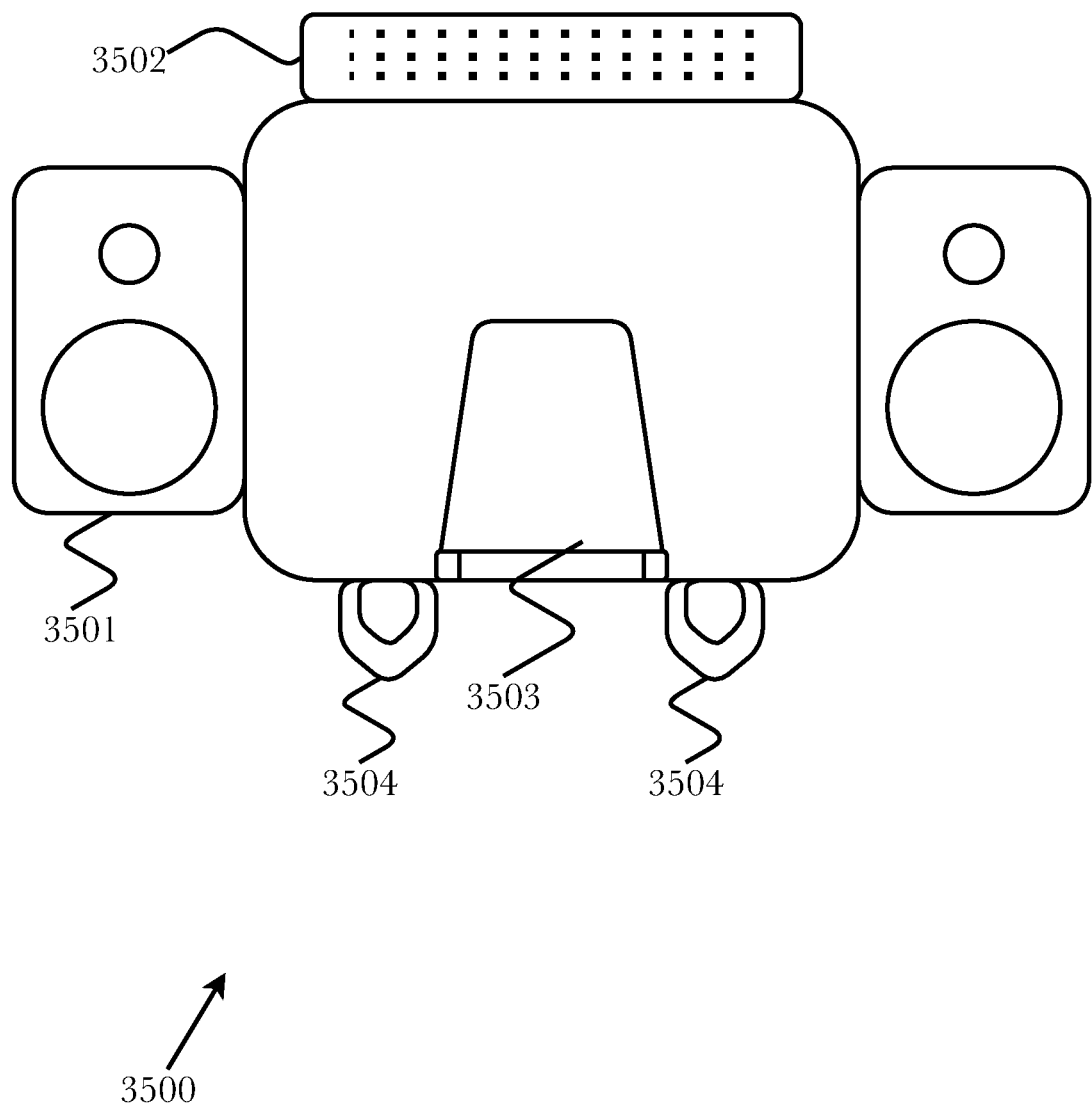
FIG. 35 is a diagram of an exemplary brainwave entrainment therapy device that can be attached to a plurality of exercise machines, according to some embodiments.

FIG. 35 is a diagram of an exemplary brainwave entrainment therapy device 3500 that can be attached to a plurality of exercise machines, according to some embodiments. In this embodiment, the brainwave entrainment therapy device 3500 comprises one or more lights 3502, one or more speakers 3501, a shelf or platform 3503 for safe placement of a smart device, and one or more adjustable clips or mounting hardware 3504 for affixing the brainwave entrainment device 3500 to a variable-resistance exercise machine 100. The lights 3502, shown here as light bars comprising multiple light-emitting diodes (LEDs) can be programmed to emit a visible stimulus (e.g., flashes, on/off cycles, etc.) at frequencies appropriate for brainwave entrainment. According to some embodiments, the one or more lights 3502 may comprise LEDs configured to emit a spectrum of wavelengths (e.g., different colors of light). The speakers 3501 can be programmed to emit an audible stimulus (e.g., rectangular wave sound pulses, sine wave sound oscillations, etc.) at frequencies appropriate for brainwave entrainment. In some configurations, both light and sound may be used as stimuli. The stimuli need not be from the same source (e.g., two light sources each at 20 Hz could be synchronized to produce 40 Hz stimulus) or from the same modality (e.g., a sound source at 15 Hz and a light source at 15 Hz could be synchronized to produce 30 Hz stimulus). The inclusion of one or more lights 3502 and one or more speakers 3501 in the brainwave entrainment therapy device 3500 allows for an exercise machine user the simultaneous use of their personal smart device for media playback purposes while also permitting brainwave entrainment via the device 3500. For example, an exercise machine user may be able to listen and/or view a podcast on their smart device while also receiving brainwave entrainment via flashing the lights 3502 in a periodic manner with a set frequency (e.g., 40 Hz).

The device of this embodiment is designed such that it can be mounted on an exercise machine, whereby it can be used to provide brainwave entrainment therapy. One or more adjustable clips 3504 may be present which allows for device 3500 to be mounted in different positions on the exercise machine. For example, brainwave entrainment therapy device 3500 may be mounted on a rigid handlebar 103 affixed or integrally-formed on one end of exercise machine 100 such that an exercise machine user may be facing the device 3500 when using the exercise machine 100. For example, brainwave entrainment therapy device 3500 may be mounted on formed or removable supports 106*a-b* and/or right 201*a* and left 201*b* handrails such that an exercise machine user may be facing the device when performing exercise actions where the user is facing a direction perpendicular to the variable-resistance exercise machine 100 treads 203*a-b*. In this way, variable-resistance exercise machine with network communication for smart device control and interactive software applications 100 may provide brainwave entrainment therapy via brainwave entrainment therapy device 3500 regardless of the exercise machine user's position. In some embodiments, device 3500 may be integrally formed and permanently mounted to rigid handlebar 103.

The brainwave entrainment therapy device 3500 may be communicatively coupled, via a network interface (e.g., WiFi, BLUETOOTH™, etc.), with a user smart device and/or a variable-resistance exercise machine 100 such that the lights 3502 and the speakers 3501 may produce brainwave entrainment therapy stimuli responsive to received inputs and/or outputs from at least one of the variable-resistance exercise machine 100, the network interface, or the user smart device. Interactive software applications, operating on the smart device, may be configured to control and provide stimulation signals to the one or more speakers 3501 and lights 3502 to provide brainwave entrainment therapy to users of a variable-resistance exercise machine with network communication for smart device control and interactive software applications 100. For example, a user may utilize their smart device to control the exercise machine 100 and to select one or more brainwave entrainment therapies from a plurality of pre-configured brainwave entrainment therapies stored in the interactive software application. In some embodiments, the user (or a coach, trainer, physical therapist, etc.) may configure their own brainwave therapy sessions. For example, a physical therapist may select the type of stimulus (e.g., audible, visual, etc.), the intensity, any possible neurodegenerative conditions or diseases the patient may have, and the duration that the stimulus is produced in conjunction with a physical therapy session including the variable-resistance exercise machine 100.

According to some embodiments, brainwave entrainment therapy device 3500 may be configured to provide stimulation in response to input from a user device. For example, a network interface may receive input from a user device, such as an interaction received via an interaction software application, and enable stimulation to be produced from the brainwave entrainment device 3500 based on the received input. For example, a user selects an auditory brainwave entrainment therapy session from an interactive software application operating on her smart device, the user's selection is received by the network interface, and the network interface communicates the therapy session configurations to entrainment device to enable stimulation via the one or more lights 3502 and/or the one or more speakers 3501, or other transducers. In some embodiments, the interactive software application may comprise a signal generator capable of producing a plurality of signals of varying wavelengths, amplitudes, frequencies, magnitudes, irradiance, phases, and offsets, in order to provide stimulation appropriate for the brainwave entrainment application. In some other embodiments, brainwave entrainment device 3500 may be configured to receive, via network interface, sensor output and produce stimulation responsive to the sensor output. For example, stimulation may only be produced if pressure sensors indicate that a user is currently on the exercise machine 100.

In some embodiments, the brainwave entrainment therapy device 3500 may comprise a plurality of transducers which may be configured to produce stimulating signals responsive to interaction input from a user smart device and/or output from a network interface. According to some embodiments, transducers may be configured to provide stimulation such as visual, auditory, vibratory, or electrical stimulation. According to some embodiments, the stimulation frequency may be between 0.5 Hz and 100 Hz.

According to some embodiments, two devices 3500 may be attached to exercise machine 100. In this embodiment, a device 3500 may be attached on the front of exercise machine 100 to a rigid handlebar 103 and on the side of the exercise machine to right 201*a* and left 201*b* handrails. According to this embodiment, sensors in the exercise machine 100 and/or in harness 820 may be used to determine the movement and position of a user of exercise machine 100. In this embodiment, network interface may receive the sensor data and may change which of the two attached devices 3500 to produce stimulations from. For example, a user is walking on the exercise machine 100 while facing forward and the network interface instructs the forward mounted device produce visual stimulation as part of brainwave entrainment, and when the user turns sideways and begins to do a side-shuffle exercise the sensors in the exercise machine 100 and/or the harness 820 may indicate the user has changed position and the network interface recognizes the change in position and instructs the side device to begin producing the visual stimulation.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
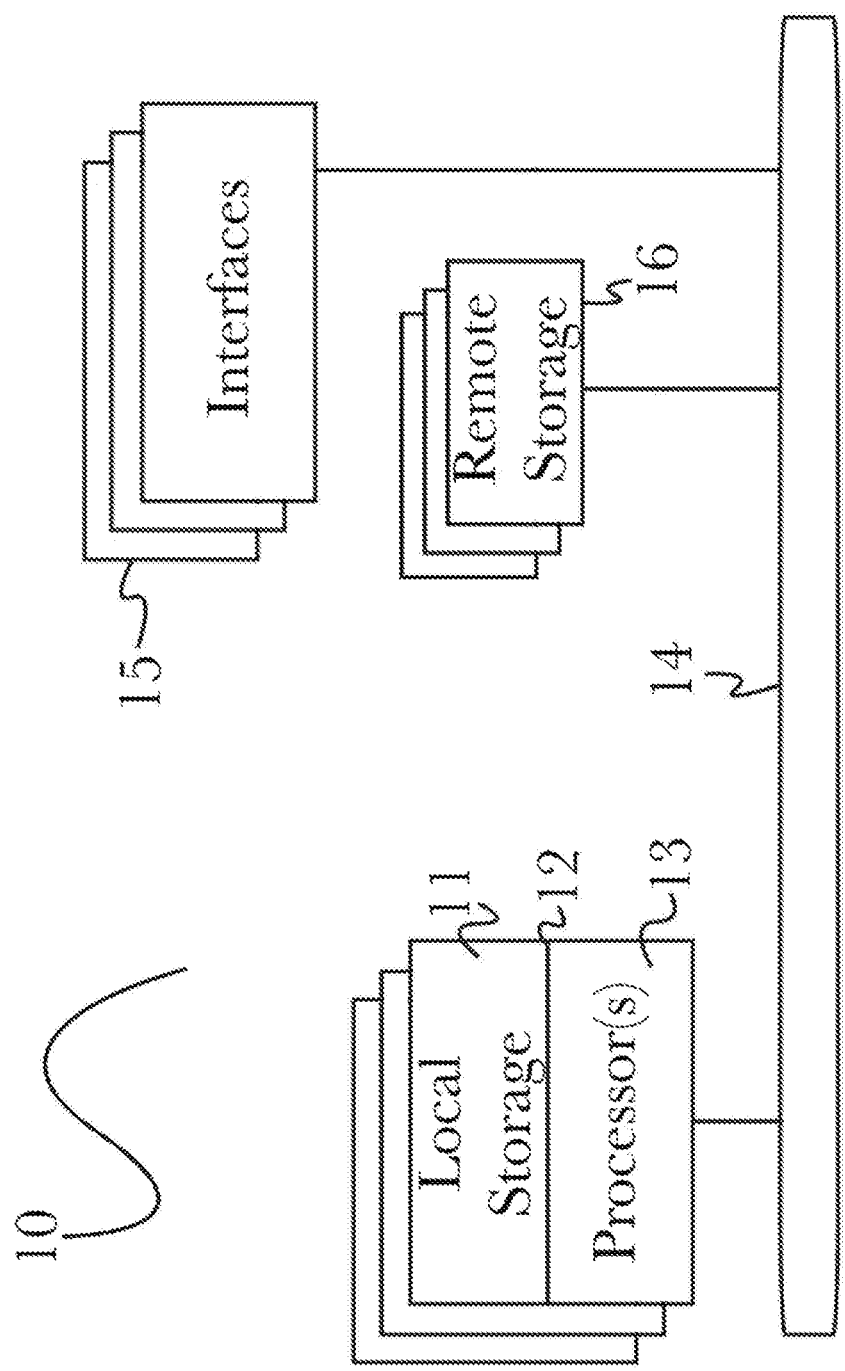
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 13 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
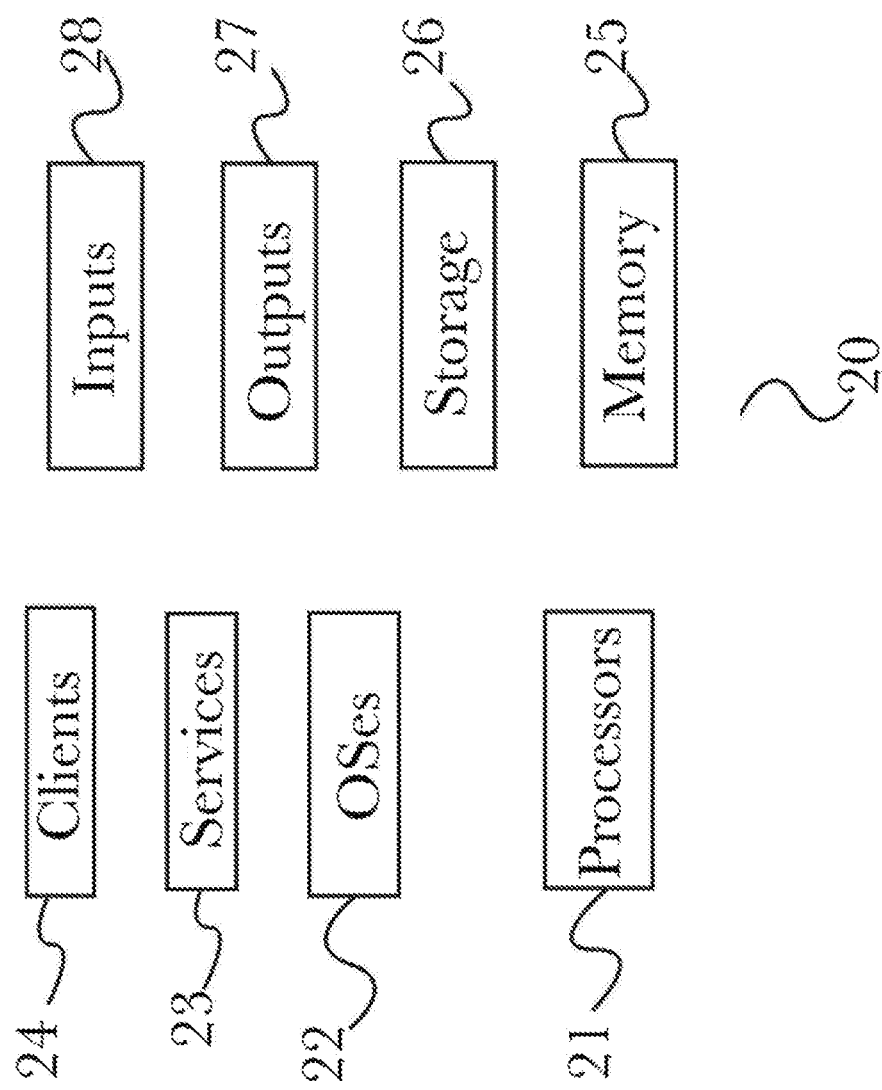
FIG. 14 is a block diagram illustrating an exemplary logical architecture for a client device.

In some embodiments, systems according to the present invention may be implemented on a standalone computing system. Referring now to FIG. 14, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
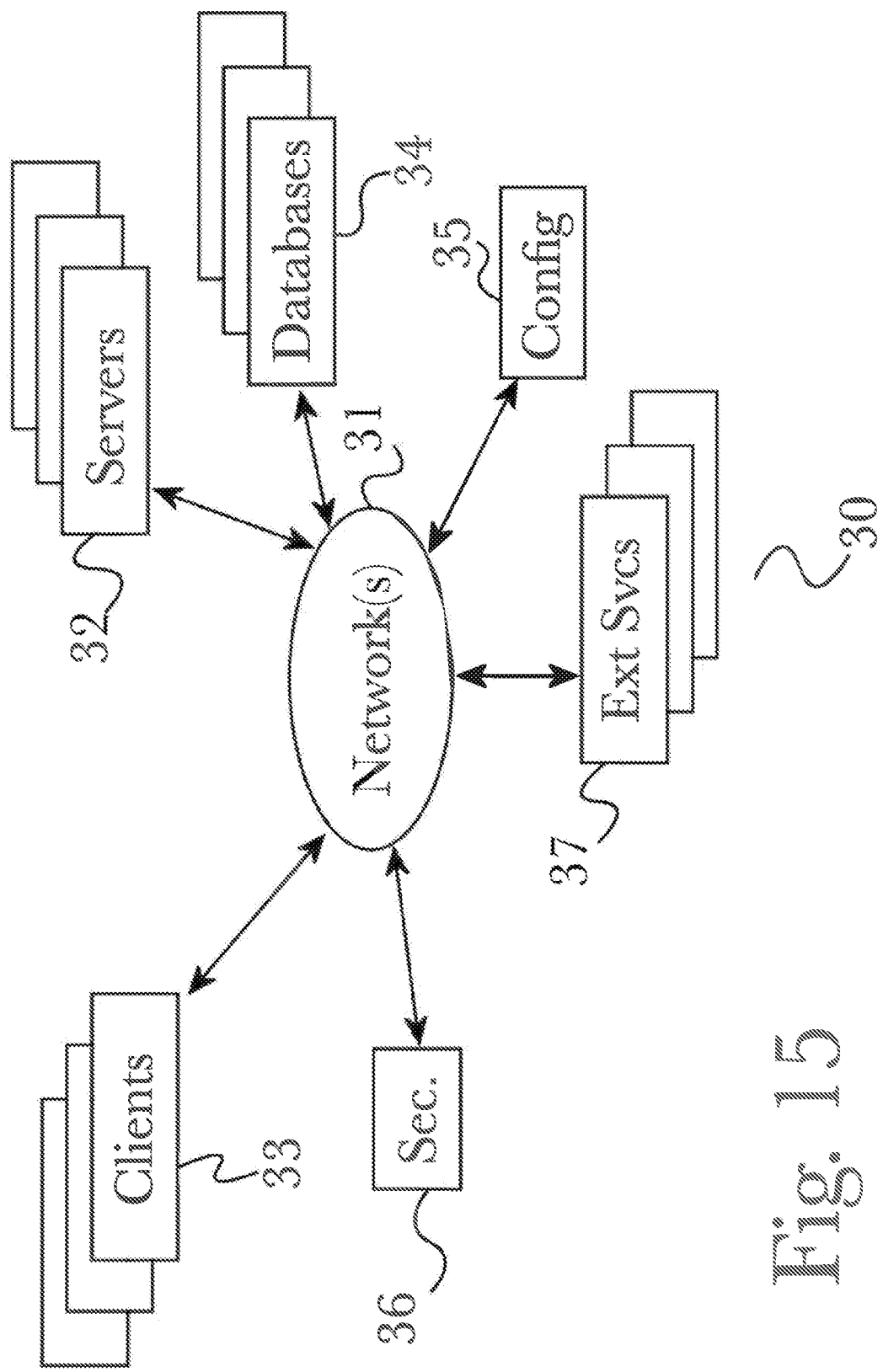
FIG. 15 is a block diagram showing an exemplary architectural arrangement of clients, servers, and external services.

In some embodiments, systems of the present invention may be implemented on a distributed computing network, such as one having any number of clients and/or servers. Referring now to FIG. 15, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 16:
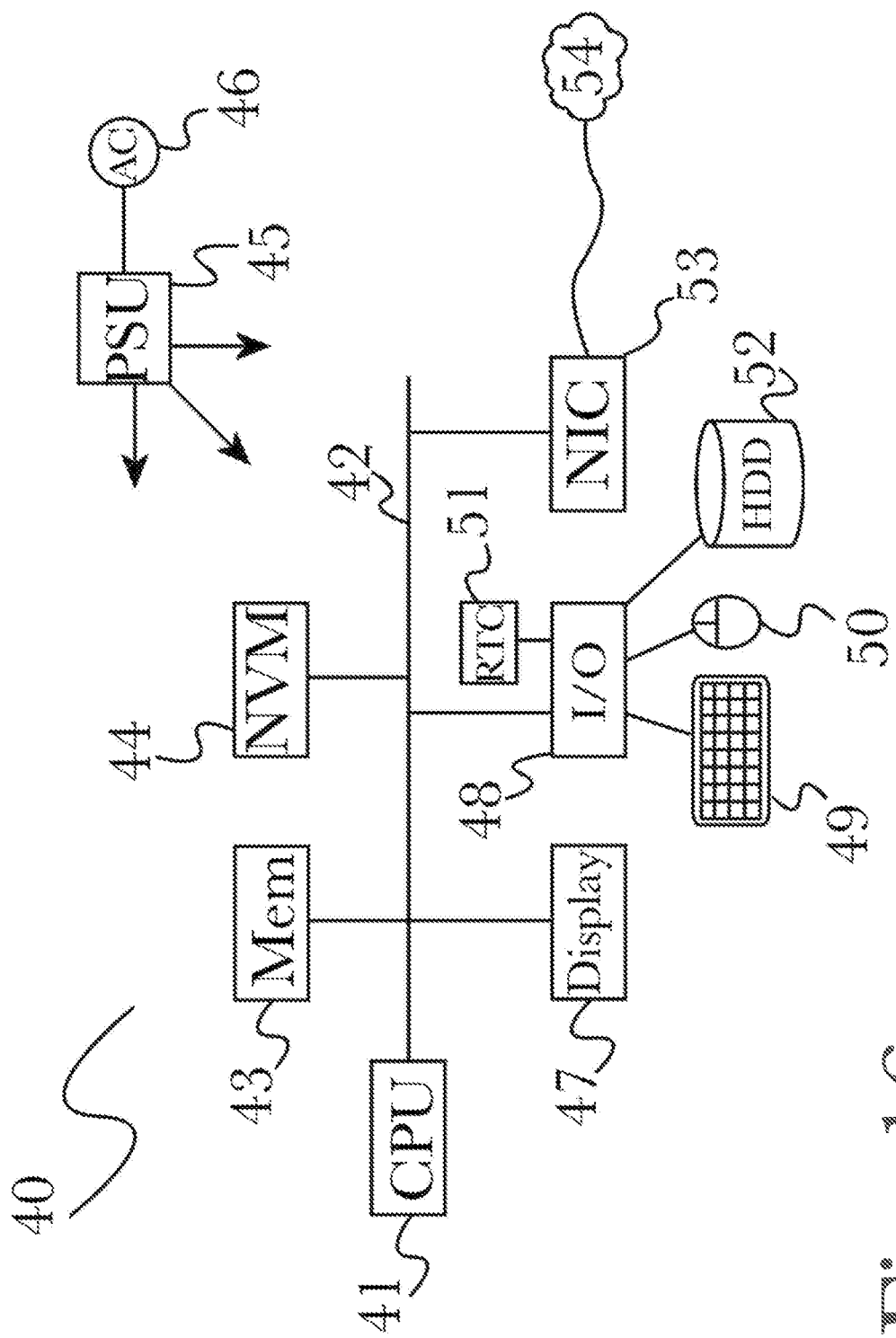
FIG. 16 is another block diagram illustrating an exemplary hardware architecture of a computing device.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for integration of body movement computer gaming control and brainwave entrainment, comprising:
    an attachment device configured to be attached to a portion of a user's body;
    a sensor attached to, or integrated into, the attachment device, and configured to detect movement of at least a portion of a user's body during use;
    one or more tethers attached to, or integrated into, the attachment device, and configured to resist a movement of the user during use, each of the one or more tethers being attached to an actuator configured to draw in or let out the corresponding tether;
    a stimulation transducer configured to provide stimulation to the user;
    a computing device comprising a memory and a processor;

a brainwave entrainment manager comprising a first plurality of programming instructions stored in the memory which, when operating on the processor, causes the computing device to:

receive movement data from the sensor of the attachment device;

select a brainwave entrainment therapy for application based on the received movement data, the therapy comprising a stimulation frequency;

operate the stimulation transducer at a stimulation frequency;

transmit the movement data to a virtual reality or mixed reality machine or software application;

receive data back from the virtual reality or mixed reality machine or software application based on the user's interactions within the virtual reality or mixed reality environment; and direct the operation of the actuator based on the received data.

2. The system of claim 1, wherein the attachment device comprises a strap, belt, vest, waist harness, or other device wearable on the human body.

3. The system of claim 1, wherein the tether is a flexible, metal cable.

4. The system of claim 1, wherein the actuator is a motor with a reel configured to reel in or let out the tether.

5. The system of claim 1, wherein the stimulation transducer is a transducer configured to provide either visual, auditory, vibratory, or electrical stimulation.

6. The system of claim 2, wherein the brainwave entrainment therapy comprises operating the stimulation transducer to provide either visual, auditory, vibratory, or electrical stimulation at a stimulation frequency between 0.5 Hz and 100 Hz.

7. A method for integration of body movement computer gaming control and brainwave entrainment, comprising the steps of:

measuring the movement of a user using a body joystick attached to the user's body, the body joystick comprising:

an attachment device configured to be attached to a portion of a user's body;

a sensor attached to, or integrated into, the attachment device, and configured to detect movement of at least a portion of the user's body during use;

one or more tethers attached to, or integrated into, the attachment device, and configured to resist a movement of the user during use, each of the one or more tethers being attached to an actuator configured to draw in or let out the corresponding tether; and a stimulation transducer configured to provide stimulation to the user;

receiving movement data from the sensor of the attachment device;

selecting a brainwave entrainment therapy for application based on the received movement data, the therapy comprising a stimulation frequency;

operating the stimulation transducer at a stimulation frequency;

transmitting the body joystick movement data to a virtual reality or mixed reality machine or software application;

receiving data back from the virtual reality or mixed reality machine or software application based on the user's interactions within the virtual reality or mixed reality environment; and directing the operation of the actuator based on the received data.

8. The method of claim 7, comprising the additional step of attaching the joystick to the user's body using a strap, belt, vest, waist harness, or other device wearable on the human body.

9. The method of claim 7, wherein the tether is a flexible, metal cable.

10. The system of claim 7, wherein the actuator is a motor with a reel configured to reel in or let out the tether.

11. The method of claim 7, wherein the stimulation transducer is a transducer configured to provide either visual, auditory, vibratory, or electrical stimulation.

12. The method of claim 7, wherein the brainwave entrainment therapy comprises operating the stimulation transducer to provide either visual, auditory, vibratory, or electrical stimulation at a stimulation frequency between 0.5 Hz and 100 Hz.

* * * * *